US006978262B2

(12) United States Patent
Tsai

(10) Patent No.: US 6,978,262 B2
(45) Date of Patent: Dec. 20, 2005

(54) DISTRIBUTED DATABASE SCHEMA

(76) Inventor: Daniel E. Tsai, 39 Bayberry Dr., Atkinson, NH (US) 03811

( * ) Notice: Subject to any disclaimer, the term of this patent is extended or adjusted under 35 U.S.C. 154(b) by 581 days.

(21) Appl. No.: 09/225,974

(22) Filed: Jan. 5, 1999

(65) Prior Publication Data

US 2002/0107838 A1 Aug. 8, 2002

(51) Int. Cl.[7] .............................................. G06F 17/30
(52) U.S. Cl. .......................................................... 707/3
(58) Field of Search .................. 707/1, 2, 10, 100–104, 707/200–206; 709/203; 705/54; 706/45; 345/354, 440

(56) References Cited

U.S. PATENT DOCUMENTS

| | | | | |
|---|---|---|---|---|
| 5,652,880 | A * | 7/1997 | Seagraves | 707/103 R |
| 5,664,177 | A | 9/1997 | Lowry | 395/611 |
| 5,701,400 | A * | 12/1997 | Amado | 706/45 |
| 5,710,917 | A * | 1/1998 | Musa et al. | 707/210 |
| 5,929,857 | A * | 7/1999 | Dinallo et al. | 345/954 |
| 5,978,577 | A * | 11/1999 | Rierden et al. | 707/10 |
| 5,982,891 | A * | 11/1999 | Ginter et al. | 705/54 |
| 5,999,192 | A * | 12/1999 | Selfridge et al. | 345/440 |
| 6,016,497 | A * | 1/2000 | Suver | 707/103 |
| 6,038,564 | A * | 3/2000 | Sameshima et al. | 707/10 |
| 6,038,590 | A * | 3/2000 | Gish | 709/203 |
| 6,052,711 | A * | 4/2000 | Gish | 709/203 |
| 6,122,627 | A * | 9/2000 | Carey et al. | 707/4 |
| 6,122,639 | A * | 9/2000 | Babu et al. | 707/103 R |
| 6,134,540 | A * | 10/2000 | Carey et al. | 707/2 |
| 6,138,119 | A * | 10/2000 | Hall et al. | 707/9 |
| 6,236,987 | B1 * | 5/2001 | Horowitz et al. | 707/3 |

* cited by examiner

*Primary Examiner*—Vincent Millin
*Assistant Examiner*—Ella Colbert
(74) *Attorney, Agent, or Firm*—Fish & Richardson P.C.

(57) ABSTRACT

A computer system and a method of searching for information to construct an information object includes querying a resource having information stored as bindable data elements and returning results of the query. The system and method includes a fragment base that stores the bindable data elements as fragments and/or primitives that may be used to satisfy the query. The computer based system and method can include a sense process that reads data referred to a client process and tests the data to determine whether the data can be bound to existing data or produces new data within the fragment database. Fragments and primitives represent information in small pieces that can have both generalized structure and particular data. As information changes and grows incrementally, fragments can be added to or modified within a fragment base to define a larger composite concept that is an information object.

59 Claims, 44 Drawing Sheets

```
550a  <FRAGMENT> <ORDER>SEQUENTIAL</ORDER>
550b  <OWNER> Dan@myschool.edu</OWNER>
550c  <LIFESPAN> 1/1/1998,1/1/1999,active </LIFESPAN>
550d  <BIND> allow,domain,myschool.edu </BIND>
550e  <BIND> allow,url,http://anothersite.org/books.html </BIND>
550f  <PRIMITIVE> <CLASSIFICATION> Book</CLASSIFICATION> </PRIMITIVE>
550g  <PRIMITIVE>
550h      <CLASSIFICATION> Health and Fitness </CLASSIFICATION> </PRIMITIVE>
550i  <PRIMITIVE>  <INSTANCE> Stretch Yourself!</INSTANCE > </PRIMITIVE>
550j  <PRIMITIVE>  <ATTRIBUTE> author </ATTRIBUTE > </PRIMITIVE>
550k  <PRIMITIVE>  <VALUE> "Suzi B. Fit" </VALUE > </PRIMITIVE>
550l  </FRAGMENT>
```

780

DISTRIBUTED DATABASE SCHEMA

BACKGROUND

This invention is related to databases and the manner in which information is represented and searched.

Computers are often used to store and maintain databases. Databases can be of many types. One type of database stores data in tabular form. One type of tabular form is the relational database that stores information in tables related to each other. Relational databases are defined by properties that are present in the table. The table holds data records, which conform to the properties that define the table. However, if one record presents a new piece of information a new table structure needs to be defined to hold that one record.

Other types of databases include hierarchical databases and flat-file structures that are similar to a table or a spreadsheet. Another type of database is the so-called object-oriented database. Object-oriented databases are also called "persistent objects." Persistent objects are defined in classes that have data structure and procedural function and at run time are instantiated to have actual values. The object database can persistently store that object so that it can be retrieved with the same run time state as when it was stored.

The world wide web stores information in resources that can be found through an address such as a uniform resource locator (URL). Initially, most resources on the world wide web were plain text or hypertext mark-up language (HTML) documents. Now there are more dynamic forms of resources available. A resource will use a database to provide information and display it as an HTML document.

A Web crawler is a software program used to search information on the web. A web crawler starts at a page or a set of pages and searches through documents by following links. The links lead from one document to another. The links only contain locational information, i.e., a uniform resource locator (URL) that gives an address or location of the resource, i.e., a server that contains the referenced page.

SUMMARY

According to an aspect of the invention, a method of searching for information to construct an information object includes querying a resource having information stored as bindable data elements and returning results from querying the resource to construct the information object.

According to an additional aspect of the invention, a computer-based system includes a search engine that produces a search query and a fragment base that stores data fragments and/or primitives that may be used to satisfy the query.

According to an additional aspect of the invention, a computer based system includes a fragment database and a sense process that reads data referred to a client process and tests the data to determine whether the data can be bound to existing data or produces new data within the fragment database.

According to an additional aspect of the invention, a data structure for a primitive data element resides on a computer readable medium. The data structure includes a type field that specifies the type of primitive element data structure, a binding field that defines how primitive data structure can connect to other primitive data structures to provide fragments and a content field that specifies a value associated with the type, said content field including a referral that specifies a location.

According to an additional aspect of the invention, a fragment data structure residing on a computer readable medium includes at least two primitive elements that have an binding relation to each other.

According to an additional aspect of the invention, a canonical, two primitive fragment data structure residing on a computer readable medium includes a primitive of a first primitive type bound to a primitive of a second type.

According to an additional aspect of the invention, a method of constructing an information object from primitives and/or fragments provided as a result of a query includes providing a set of focused primitives that correspond to a starting set of primitives that are related to the information object and linking primitives in accordance with binding fields of the primitives to produce the information object.

According to an additional aspect of the invention, a method of transforming a fragment of a first form into a second, different fragment of a second form includes applying a transformation function to the first fragment to produce the second, different fragment of a second form.

One or more the following advantages may be provided by aspects of the invention. A search request can allow for expansion of a search space beyond immediate contents of a fragment database. References to external resources may be obtained for the search process. The search process can respond to a direct request for information and the search process can also work in sense mode, in which the search process senses or is given information to read, in order to accumulate and alter information stored a fragment data base.

Fragments and primitives represent information in small pieces that can have both generalized structure and particular data. For example, a fragment can denote an instance of a classification, similar as an object is to a programmed class. However, classification as used with fragments is differentiated from programming class because a programming class is a well-defined, bounded whole, with predefined data structure and functionality. The "classification" on the other hand, is a more primitive starting point, as a label that forms a hierarchical structure. A loose form of search-based inheritance rules can be imposed on classifications, though not with the rigor of conventional programmed class inheritance. By defining fragments to be additive, the fragments do not have to be designed in an object oriented manner of predefined classes. Another distinction from conventional software objects, therefore, is that conventional software objects are quite rigidly defined prior to use, in both data structure and functionality. The addition of attributes to a class definition requires reprogramming. Conventional programmed 'objects' therefore have to be preconceived to a high degree of precision. This requirement often runs counter to how people naturally develop a gradual cumulative concept, i.e., information about a thing. In contrast, as information changes and grows incrementally, fragments can be added to or modified within the fragment base to define a larger composite concept of information objects.

A special form of assembly technique is the transformation of one fragment into another fragment based on a transformation function. Fragment transformations can be specified in terms of general fragment structure, i.e. a sequence of primitive-types, without regard to their primitive content. Transformations can be applied to the data in a fragment database to maintain consistency, check and remove identified structures, or change the way information is expressed structurally. Other advantages are disclosed herein.

BRIEF DESCRIPTION OF THE DRAWING

FIGS. 35–38 are diagrams that illustrate a plain text representation of fragment data.

DETAILED DESCRIPTION

Figure 1:
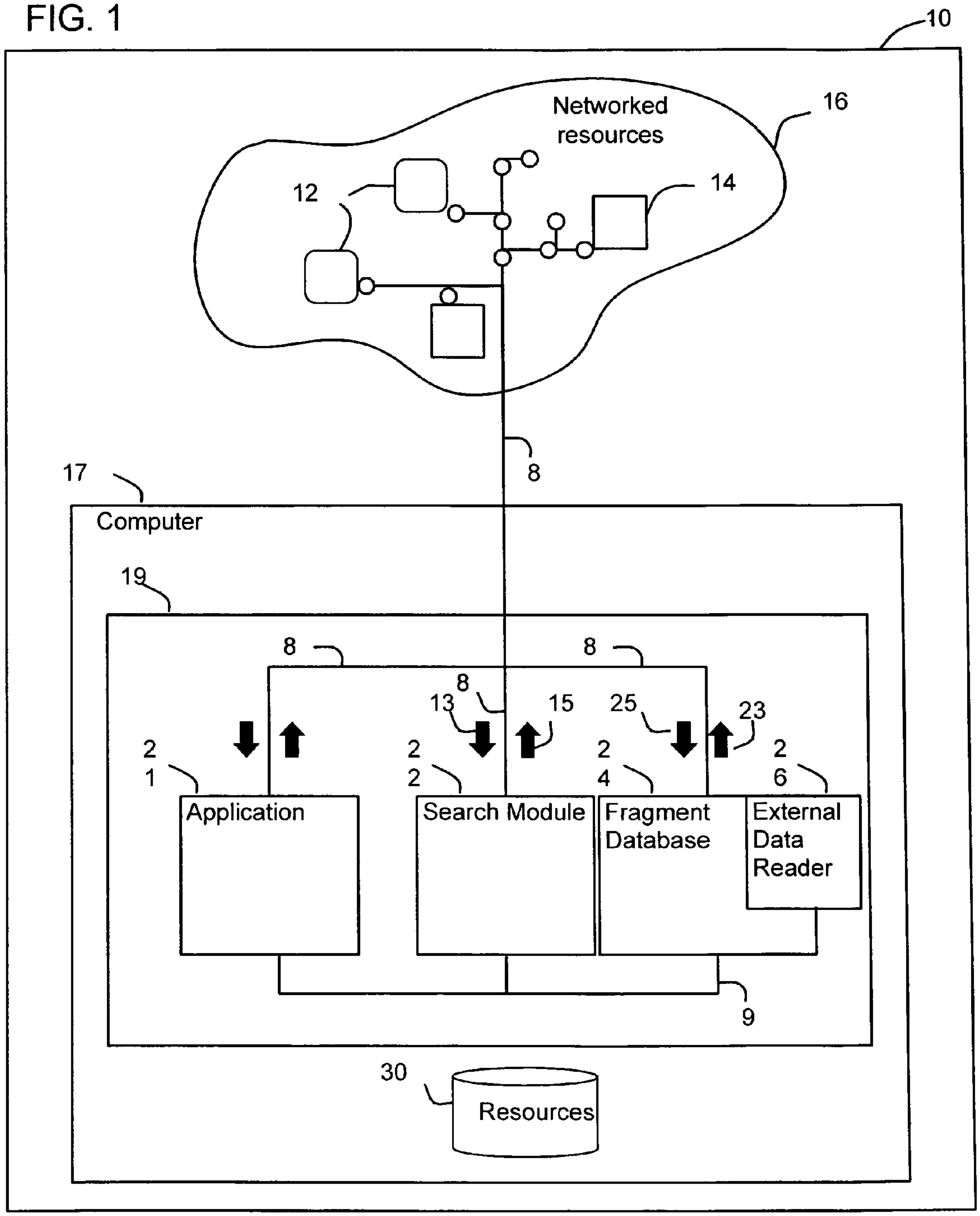
FIG. 1 is a block diagram of a network computer system including a server and clients.

Referring to FIG. 1, a networked computer system 10 includes clients 12 coupled to resources 14 existing on a network 16. Network 16 can be a local area or wide area network or the Internet, and so forth. The computer system 10 also includes a computer server 17 that executes a server process 19. The server process 19 executes processes including an application 21, search process 22, and maintains a fragment database 24. The server process 19 can be a remote process operating on a remote platform, as shown operating on server 17, or a local process (not shown) operating on a client. The networked system 10 also includes a network connection 8 between the computer server 17 and the rest of the network 16. Local resources 30 can also be available to the computer 17 and its processes.

The fragment database 24 can work without or in conjunction with application 21 and the search process 22. A communication pathway 9 exists between the fragment database 24 and the search process 22 and application 21. The communication pathway 9 can be a standard interprocess communication (IPC) mechanism such as a pipe or socket.

The fragment database 24 can respond to a request from a remote client 12, from the search process 22 or application 21. The request from the client can be for retrieving, adding, removing or manipulating information contained within or referenced by the fragment database 24.

Figure 2:
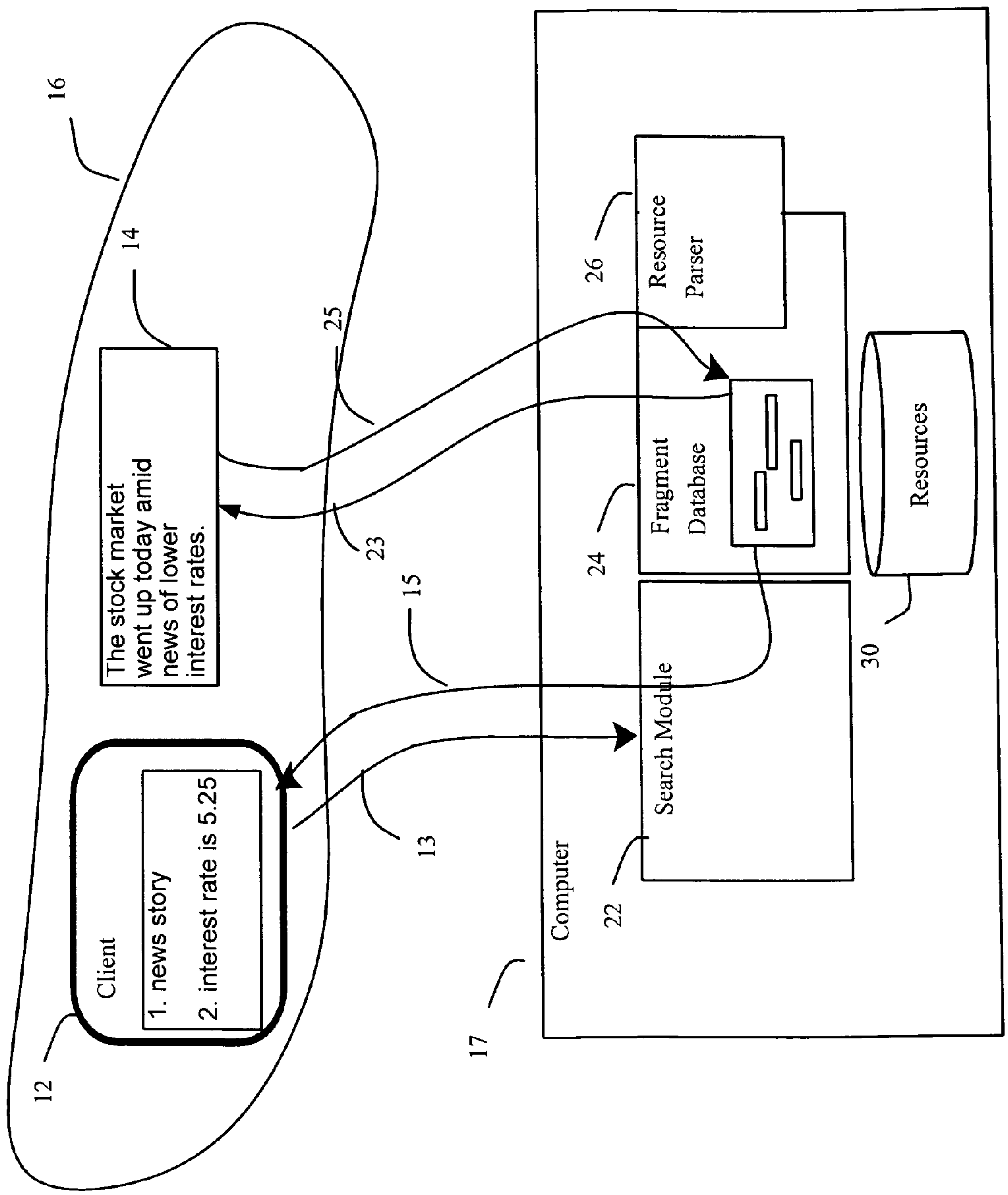
FIG. 2 is a block diagram of the system of FIG. 2 operating in a search mode.
Figure 3:
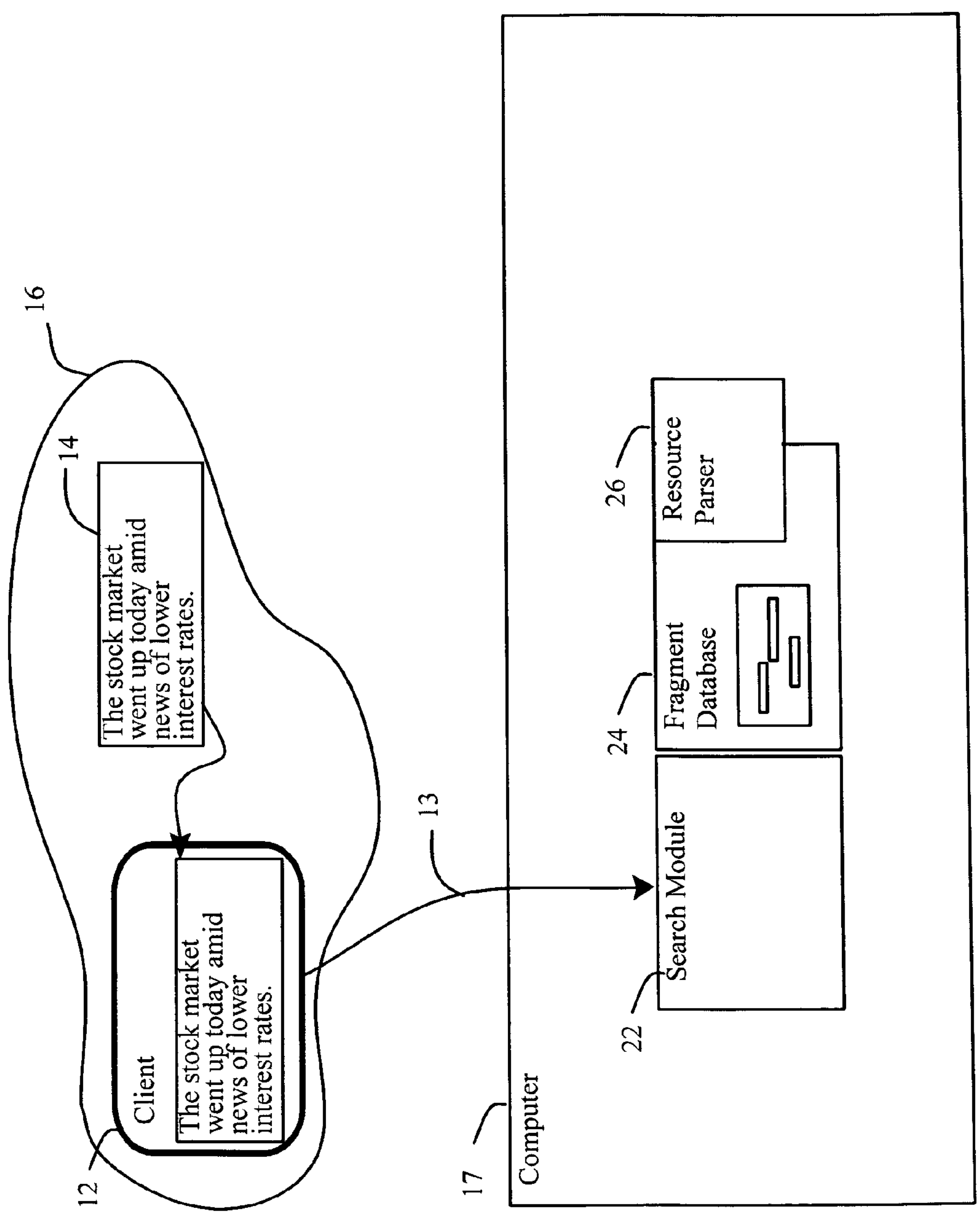
FIG. 3 is a block diagram of the system of FIG. 2 operating in a sense mode.

The search process 22 can operate in a response mode (FIG. 2) or sense mode (FIG. 3). In response mode, (FIG. 2), the search process 22 accepts inquiries 13 and conducts a search for an answer using information stored in the fragment database 24, remote resources 14 and resource 30. In sense mode, (FIG. 3), the search process 22 senses information that traverses the communication pathways 13, in order to accumulate and alter information stored in the fragment based 24 based on the search process 22 goals and directives.

The search process 22 can be used as a server process, as shown, or as a process such as an embedded part (not shown) of the application 21. An application 21 can be, for example, an electronic mail reader or a hypertext browser application. Information accessed within the application 21 can be shared with the search process 22 and fragment database 24. The search process 22 can parse and incorporate the information based on goals and directives in the search process 22 and the fragment base 24. The server process 19 can be used to construct new pieces of information by binding together primitives and/or fragment data elements (as will be described). These elements are additive data elements and are characterized as having the ability to bind together in a generalized manner that is governed by binding rules.

Referring now to FIG. 2, in search mode, the search process 22 responds 15 to requests 13 from a client 12 for particular information associated with an "information object." The term "information object" is used broadly to denote any identifiable thing in the physical, electronic or virtual world, but is not directly tied to a conventional software programming object.

The search request can ask for an information object by name. Alternatively, the search request can ask for a property of information objects or an information object. The request can ask for information objects by classifications, property, membership in a group, or relationship between information objects. The search module 22 queries its current store of information in the fragment base 24. If the information is not present, the search module 22 enters a search loop (described in FIG. 5A or 5B) that obtains 25 resources 14 from the network 16 via a request 23. Retrieved resources 25 such as a document are sent to an external data reader 26. The external data reader 26 may pass the retrieved resources straight into the fragment database 24. Alternatively, the external data reader 26 may translate the format or filter the contents of the retrieved resources into a form that is useable by the fragment database 24. The search module will return the results 15 back to the client 12.

Referring now to FIG. 3, a client 12 is shown using data 14 in a sense mode. The client process 12 can be, for example, an E-mail reader accessing mail messages, or a hypertext browser accessing hypertext pages. The client 12 sends a signal 13 to the search process 22 to 'sense' the data 14 that the client 12 is accessing. The client 12 may send 13 the external data 14 in whole or in part to the search process, along with particular instructions. The search process 22 attempts to incorporate the data 14 by binding the new data to its existing data or producing new data within the fragment database 24. Information within the fragment base can specify whether it will allow new information to be attached to specific locations. Binding can be specific, or general, to allow known and unforeseen bindings and therefore new constructions of information.

The external data 12 can be native fragment data, or be translated into such a form by the client 12. The binding of such external data to the fragment database 24 can be incorporated into the connected collection of fragments and primitives within the fragment base.

In the case of external data not natively formed as fragments composed of primitives, the existence of words, word phrases, tags, field values or other properties within the contents of the data 14 or its location can be used by the resource parser 26 along with any particular instructions sent by the client 12. For example, the search process may 'sense' data 14 loaded by the client 12 that contain the words "news", "interest rates" and "stock market", and create a referral to the data 14 within the fragment database 24 as an instance of news about the stock market.

Figure 4:
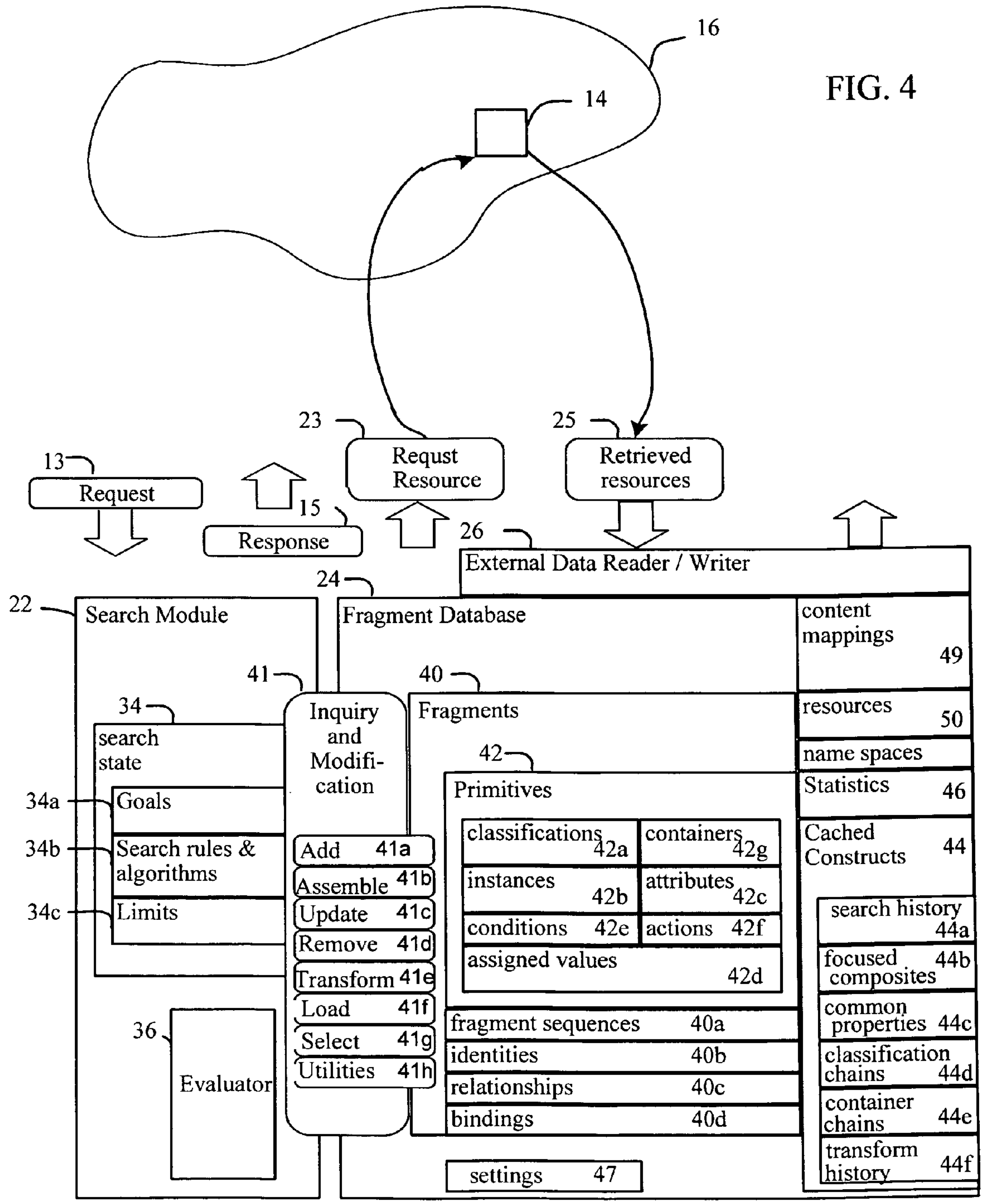
FIG. 4 is a detailed block diagram of the system of FIG. 1.

Referring now to FIG. 4, a request 13 that was sent from one of the clients 12 (FIG. 1) is received by the search process 22. After processing the request 13, the search process sends the response 15 back to the client 12 (FIG. 1). The search process 22 decodes the request 13 and initializes a search. Retrieved resources 25 are also shown coming into the external data reader 26. The retrieved resources 25 are returned from resources 14 on the network 16 in response to the search request sent out by the fragment database 24. A search has a search state 34 that is the condition of the search at a given moment. At the start of a search, the search process 22 initializes a new search and sets up goals 34*a*, search rules 34*b* and limits 34*c* for the search.

The goals 34*a* of the search are dependent on what the search is asking for. For example, if search request seeks all instances of a classification, it will try to search only for instances of a particular classification. Search process 22 can be regulated by search rules 34*b*. Search rules 34*b* can regulate the handling of error conditions, such as disallowed connections between primitives. Search rules can specify the conditions under which particular search algorithms are applied, for example, when or whether search by inheritance, by membership, by application of transformations should be applied. The search engine 22 also includes an evaluator 36 that is an interface between the search engine 22 and the fragment base 24 where the data is stored. The evaluator 36 determines whether the contents of the fragment base have satisfied the search.

The search limits are, for example, the amount of CPU time that can be expended for a search. The request 13 comes in, a search is initialized and the evaluator 36 evaluates available information in the fragment base to see whether information in the fragment base 24 can satisfy the search. If the requested information is not available in the fragment base 24, then the search engine 22 initializes an expansion of the search space to continue searching. At each loop, the search module determines whether the goals 34*a* have been satisfied. If the goals 34*a* have not been satisfied and the limits 34*c* have been exceeded, then the search module responds with a message that the request could not be satisfied within the limits of the parameters of the search.

An inquiry and modification interface 41 interfaces the search module 22 or other client to the fragment database 24. The inquiry and modification interface 41 allows the search module 22 to search for internal data in or referenced by the fragment base 24. The fragment database 24 can be asked to select 41*g* a particular piece of information. Retrieved or external resources 14 can be requested for incorporation into the fragment database 24 via the external data reader 26. Requests can be made to add 41*a*, assemble 41*b*, update 41*c*, remove 41*d*, or transform 41*e* information in the fragment database. Requests can also be made to load 41*f* or unload data sets, and export information from the fragment database 24.

The fragment base 24 holds fragments 40. The fragments 40 are comprised of primitives 42. The primitives 42 can be of several types, including classification 42*a*, instance 42*b*, attribute 42*c*, assigned-value 42*d*, condition 42*e*, action 42*f*, and container 42*g*. In addition to constituent primitives, fragment sequences 40*a*, equivalent identities 40*b*, fragments, relationships 40*c* and bindings 40*d* are maintained for individual primitives and for fragments.

During the course of search and evaluation, it may be more efficient to hold particular intermediate products. Therefore, the fragment base 24 can include a cache 44 that holds intermediate or derived constructs, such as search history 44*a*, composed information objects 44*b* that are focused upon during search, common properties among instances 44*c*, classification chains 44*d*, containership chains 44*e*, and transformation history 44*f*. The fragment base 24 includes settings 47 for its operation, including general operational rules and preferences.

The fragment base 24 can hold statistics 46 on how it is performing or whether something has been searched already or how many times something has been accessed. Statistics 46 can work with fragment store 40, the primitives store 42, and the cache 44 to access the quality of pieces of information. Quality can be based upon what was requested via inquiry 41, details of the search 44*a*, including what yielded positive or negative results. Information stored can be removed, added, transformed or otherwise altered based on an assessment of quality.

Figure 5A:
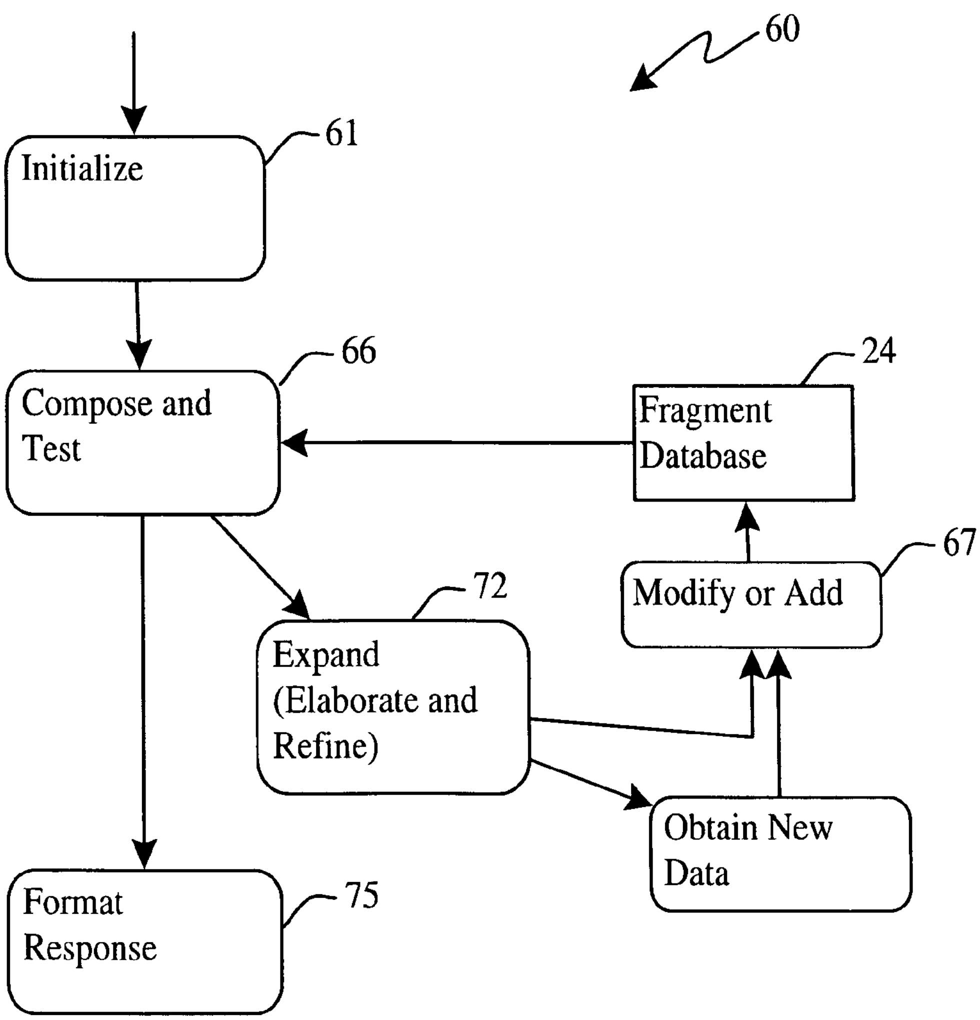
FIGS. 5A and 5B are flow charts showing details of a search engine used in the system of FIG. 2.

Referring now to FIG. 5A, a control process 60 for the evaluation of a search request is shown. The control process 60 includes an initialization 61 and compose and test process 66. The compose and test process 66 determines whether fragments from the fragment database 24 satisfied the request and can include a loop that can expand 72 the request to obtain new data and or modify 67 the data in the fragment database. The process also formats 75 a response. An implementation is shown in FIG. 5B.

Figure 5B:
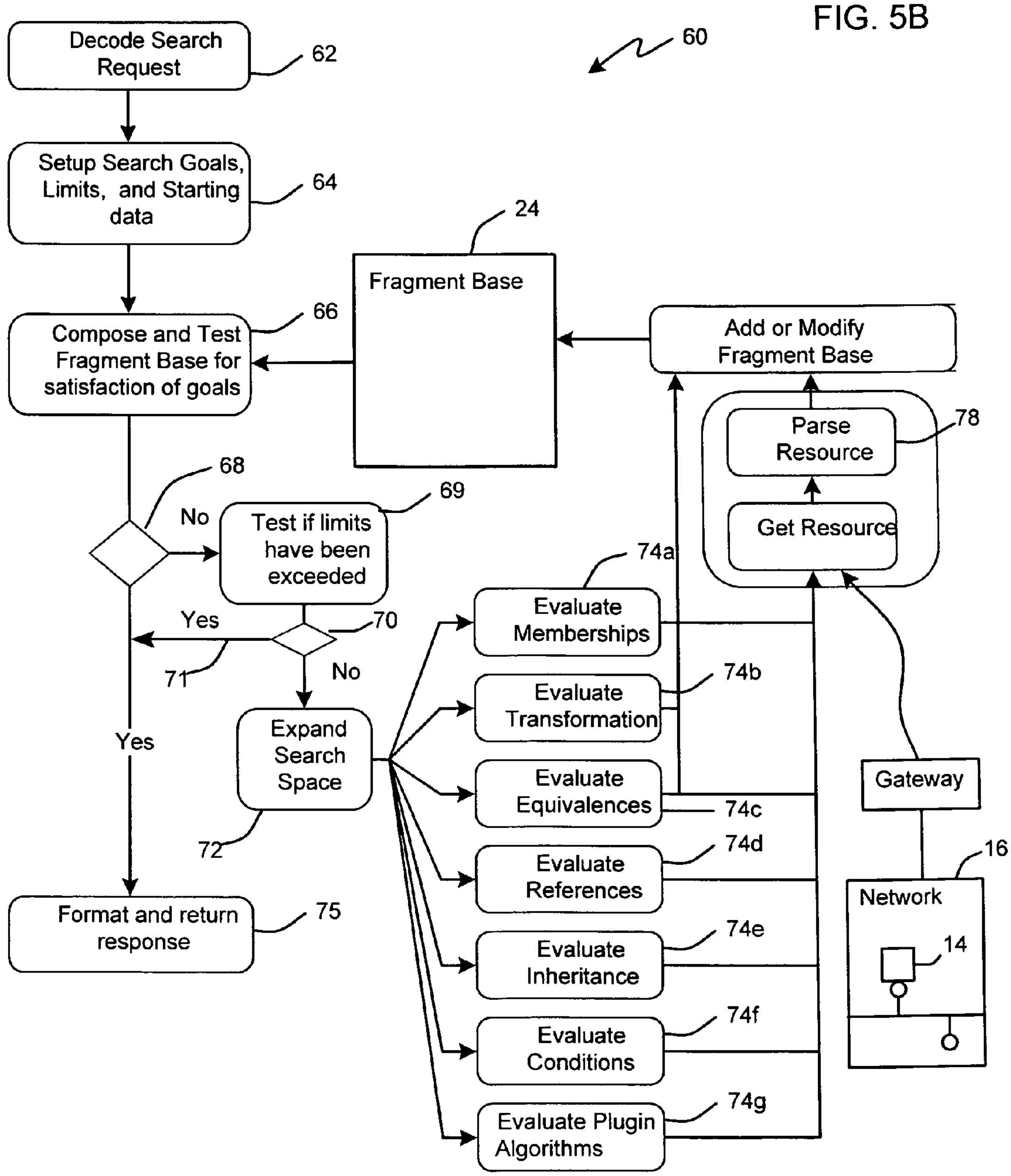

Referring now to FIG. 5B, the control process 60 for evaluation of data from a search request 13 (FIG. 2) is shown. A search request is decoded 62 into what information is being asked for, data selection criteria, runtime limits, and search scope including search specifications and restrictions on where to search and whether to restrict the search to contents of the fragment base 24 or to allow external resources to be accessed. The process 60 initializes 64 goals, limits and starting data. The fragment base 24 is searched 66 for the required fragments to satisfy the request. A decision is made 68 as to whether the request was or was not satisfied by searching the fragment base 24. If the request was not satisfied, then the process 60 tests 69 whether the search limits have been exceeded. If the search limits have been exceeded 70, the process returns a response 75 to indicate that the request cannot be satisfied unless the search space is expanded. If the search request allows expansion of the search space beyond the immediate contents of the fragment database, the search space is expanded by further evaluating the fragment base 24 and drawing upon references to external resources 14. References to the external resources 14 may be obtained from the search process in sense mode. If the test limits have not been exceeded the search space is expanded 72.

The search process 22 expands the search space 72 based on a set of methods that can be pursued in parallel. The search module 22 can evaluate memberships 74*a* in the system 10 and transformations 74*b* in the system. The search engine 22 can also evaluate equivalences 74*c* between primitives, evaluate references 74*d*, evaluate inheritance relationships 74*e*, evaluate conditions 74*f*, and evaluate plug-in algorithms based on either the request for the particular search or on a setting local to the search engine 22. For some requests, resources 14 are retrieved from the network 16, such as evaluating new references 74*d*. The search process 22 gets resources from the network 16 and parses the resources 78 into primitives and/or fragments and adds the data to the fragment base 24. The resources pointed to by the references can be retrieved through a gateway such as TCP/IP HTTP gateway (not shown) over the network 16.

In contrast to the search process 22 responding to a direct request for information, the search process 22 can work in sense mode, in which the search module senses or is given information to read, in order to accumulate and alter information stored in the fragment based 24 based on the search module's goals and directives. This mode is one way in which the search module can acquire information.

Figure 6:
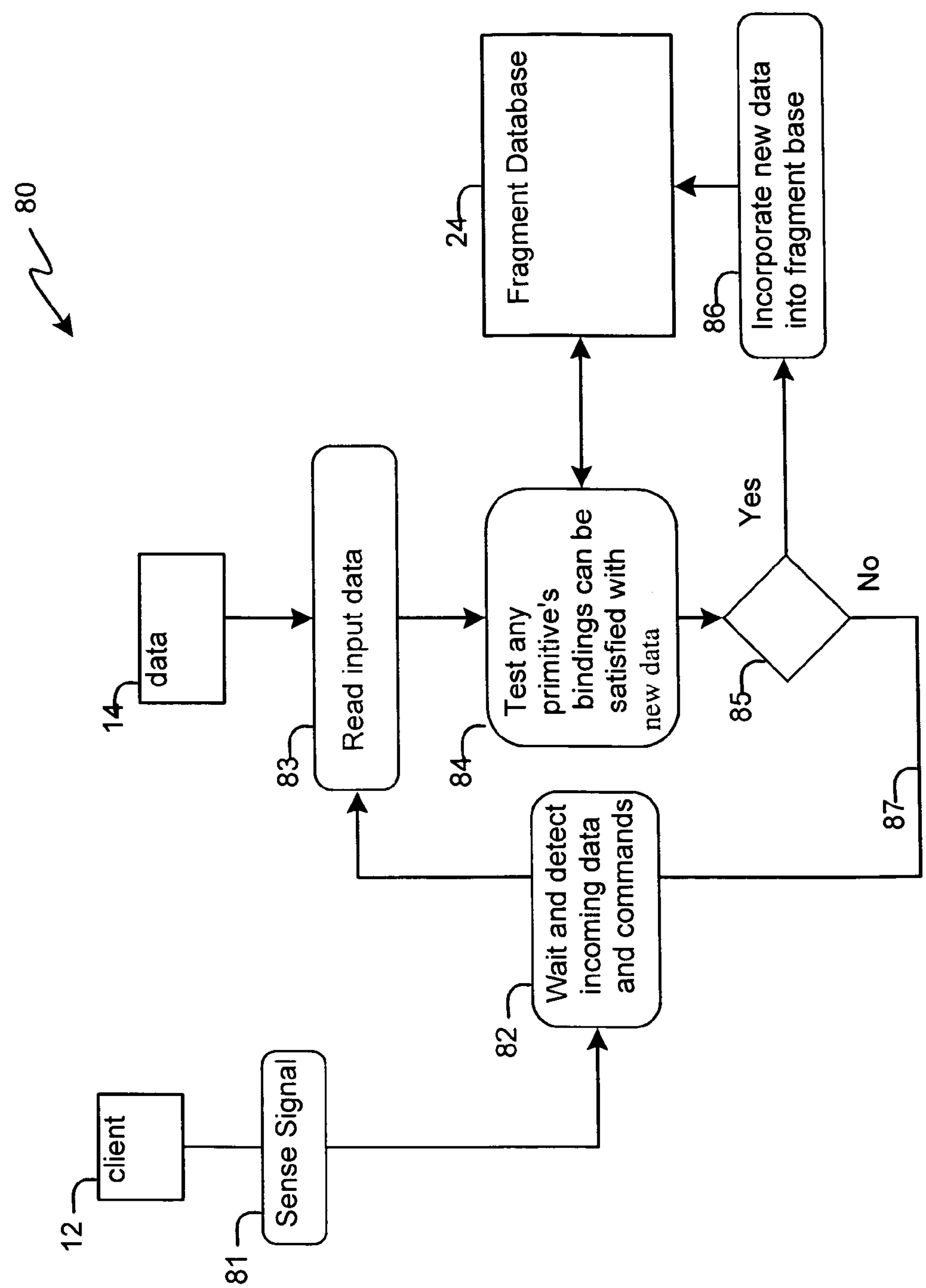
FIG. 6 is a flow chart showing details of a sense engine used in the system of FIG. 3.

Referring to FIG. 6, a process flow for the sense process 80 mode is shown. A client 12 sends a sense signal 81 including instructions and data to the search process 22. The process 80 can wait 82 until it detects incoming data and instructions. Data 14 is read 83 into the fragment database via the external data reader 28. The data is checked 84 to determine if it can be used to bind to existing data in the fragment base 24. If satisfied, the new data is incorporated into the fragment database 86 and the resource location. Where the data was obtained is noted. The process includes a loop that continues back to waiting 82 after incorporation 86 or no incorporation 87. The loop continues until some external event causes the process to exit the loop.

A client 12 for the search process 22 can include, for example, a hypertext browser or electronic mail reader. A current browsed page within the browser or the current read mail message within the electronic mail reader can be used as the external data source 14. The search process 22 senses each page or message accessed by the user operating the client application 12. The fragment database 24 contains information used to control the way in which the external resource is used. Data is incorporated by the creation of information fragments. By testing, content filling, and binding rules, new information is produced and is bound to existing information. User organized information within the fragment database can be associated with external data.

Figure 7:
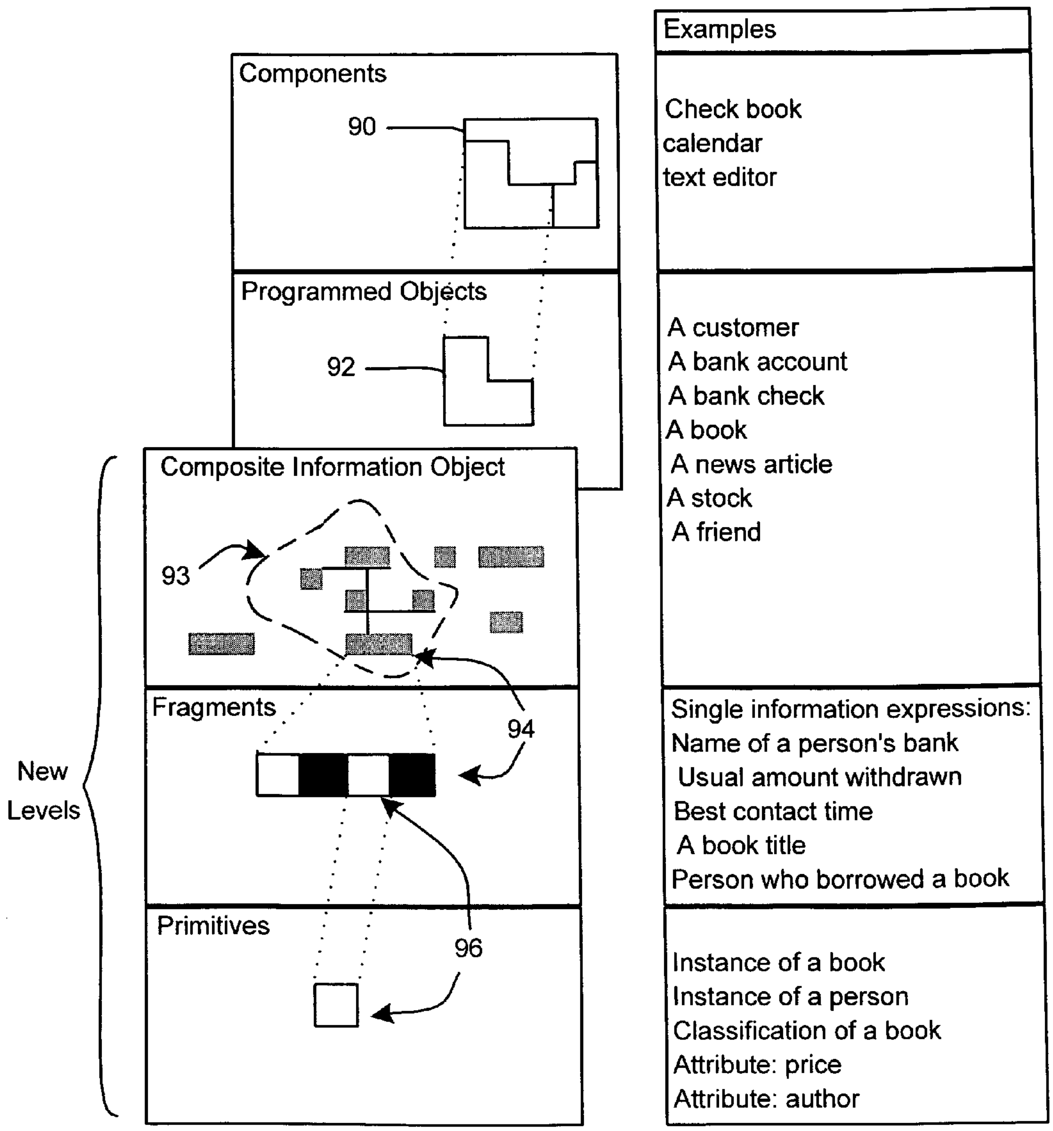
FIG. 7 is a diagrammatical view of some data representations.

Referring now to FIG. 7, information can be considered to exist as high level components 90 that are composed of objects 92. Examples of a component 90 include a checkbook, a calendar or a text editor. These are considered components because they each have a defined interface and can be plugged into other components to create applications, and have a very high level of functionality. Below the level of components is the traditional object-oriented software level programmed objects 92. Programmed objects 92 are smaller, i.e., a customer, a bank account, a stock, etc. Traditional software objects are encapsulations of data structure and functional behavior. The object concept is predicated on the object appearing to a programmer as a black box. The object exports a well-defined interface. The insides of the object are not available, i.e. visible, without special privilege.

Three new conceptual structures are introduced here, composed information objects 93, fragments 94, and primitives 96. An information object 93 is composed from an assembly of fragments 94. Fragments are composed of primitives 96. The term "information object" is used broadly to denote any identifiable thing in the physical, electronic or virtual world, and not directly tied to a conventional software programming object. For example, a particular friend, a person's bank account, or a book a person is reading are instances of real-world personal objects. Fragments 94 are small pieces of information about an information object 93. Fragments 94, in their smallest canonical form, are single minute statements, i.e., expressions or utterances of information about an information object 93. Primitives, fragments and information objects are bindable. That is, these structures can be bound to each other in a manner that is governed by binding rules. They are additive elements. That is, they can be added together through binding to produce new information. Thus, unlike hard linking, i.e., pointers or URL's, for example, these elements are free-form. That is, they can be bound together in various ways to produce information objects, but are not limited to a hard linking arrangement, since they can bind with any other primitive, fragment, and/or information object according to binding rules and general primitive type considerations.

Fragments 94 include both general information and particular information. For example, a fragment 94 can be "the best contact time" to contact someone. This fragment has a general property a "concept of time" and also has a particular property a "contact time" for a particular person. Other examples of fragments 94 include the usual amount of money that someone withdraws from a checking account. Again this fragment has a general concept withdrawing money from a bank account and a particular concept that is an actual value withdrawn. The name of a person and the person's bank are also quantities of information. Those are small fragments that are quantified as being "object like" statements people make about things that they have or do and that are below the level of a whole object.

Below defining building blocks of fragments 94, involves identifying particular types of information, i.e. primitives 96, that go into making these fragments 94. For example, an instance name, can be a bank name, a person's name. A classification can be an account type. An attribute of an account, for example, would be the balance.

Several differences exist between standard software objects, primitives, fragments and information objects. A first difference is the way that software objects are produced. Conventional objects are created as a combination of data structure and functions or methods. The actual data structure does not hold a value until run time. A customer object could be produced but until the customer object is instantiated at run time it does not have a customer number, it only has a general data structure to hold numbers, default values and functions. When the customer object is instantiated at run time, then it acquires a particular data like customer number or name.

Object databases or persistent objects store traditional run time objects in a database. This is a two-phase process that requires sophistication to create the whole pre-defined concept of an object first, then at run time, to store this elaborate run time structure. At run time, it is the object's state that is retrieved.

Fragments 94 do not replace the functionality of traditional software objects and persistent object bases, but they represent information in a different way and can be formed and manipulated in different ways. Traditional software objects are carefully pre-defined and encapsulated. Information objects, on the other hand, are composed from fragments in an open and distributed manner.

Fragments 94 represent information in small pieces that can have both generalized structure and particular data. For example, a fragment can denote an instance of a classification, similar as an object is to a programmed class. However, classification as used with fragments is differentiated from programming class because a programming class is a well-defined, bounded whole, with pre-defined data structure and functionality. The "classification" on the other hand, is a more primitive starting point, as a label that forms a hierarchical structure. Semantically, an instance of a classification and an instance of a programmed class belongs to a grouping of similar-typed things. A loose form of search-based inheritance rules can be imposed on classifications, though not with the rigor of conventional programmed class inheritance. This is part of differences between objects and, fragments and primitives. Objects are bigger and more well defined than fragments and primitives.

By defining fragments to be additive, the fragments do not have to be designed in an object oriented manner of pre-defined classes. Another distinction from conventional software objects, therefore, is that conventional software objects are quite rigidly defined prior to use, in both data structure and functionality. The addition of attributes to a class definition requires reprogramming. Conventional programmed 'objects' therefore have to be preconceived to a high degree of precision. This requirement often runs counter to how people naturally develop a gradual cumulative concept, i.e., information about a thing. In contrast, as information changes and grows incrementally, fragments can be added to or modified within the fragment base 24 (FIG. 1) to define a larger composite concept of information objects.

Figure 8:
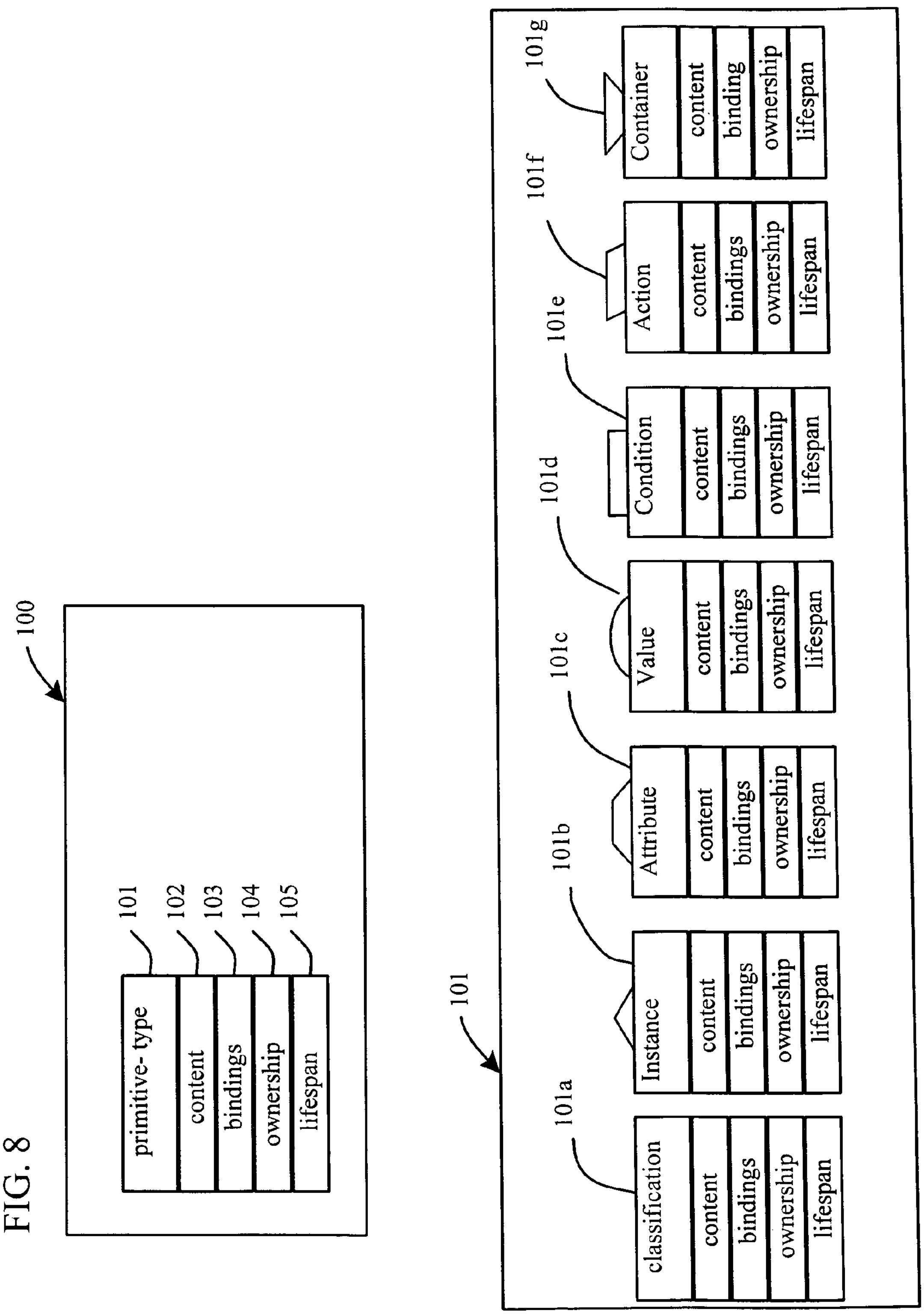
FIGS. 8–12 are diagrammatical views of data structures used in the system of FIG. 2.

Referring now to FIG. 8, a data structure 100 of a primitive is shown. The data structure 100 includes five fields, primitive type 101, primitive content 102, bindings 103, ownership 104 and life span 105. The primitive type 101 can be one of here seven basic primitive types, classification 101*a*, instance 101*b*, attribute 101*c*, value 101*d*, condition 101*e*, action 101*f*, and container 101*g*. Each primitive includes a primitive "type" field 101 and content field 102 that are the minimum required fields for many primitives. The minimal configuration is the type and the content. The binding field 103, ownership field 104 and life span field 105 are optional.

A type field is defined. The types are similar to object-oriented software concepts and define the fundamental structure of a primitive. The content field 102 is used to represent a value or a referral to a value as will be shown below. The primitives can be represented minimally in plain text permitting them to be embedded into documents. The binding field 103 defines how the primitive 100 can connect to other primitives to form fragments. The ownership field 104 can specify the past owners and intended destinations of the primitive. The life span field 105 specified when the primitive was first formed, its expiration date, if it has one, and its status, i.e. whether it is active or dormant. Ownership 104 and life span 105 can be used as a distinguishing factor in fragment assembly and search. Life span 105 can be used to control the time period and status based validity of information contained in primitives and fragments.

In the schema, primitive types 101 are used to represent different types of information. For example, a classification is a generalized category of things based on common features. A classification can be a part of a hierarchical structure. An instance is a particular named or unnamed thing, such as a particular person, or a particular book, and so forth. Instances may belong to zero, one or more classifications. An attribute is a named property of an instance or classification. For example, "E-mail address" may be an attribute of a friend or of all friends. Values can be assigned to primitives to quantify an attribute or to equate a primitive with another primitive. A condition is an event. An action is a description or specification of behavior. Action indicates computational function, but also descriptions of actions and calls to remote server functions. Examples of the latter actions could be a reference to a function over a gateway, including a call to retrieve a remote resource. A container is differentiated from a classification. Dissimilarly classified instances can be members of a container.

Figure 9:
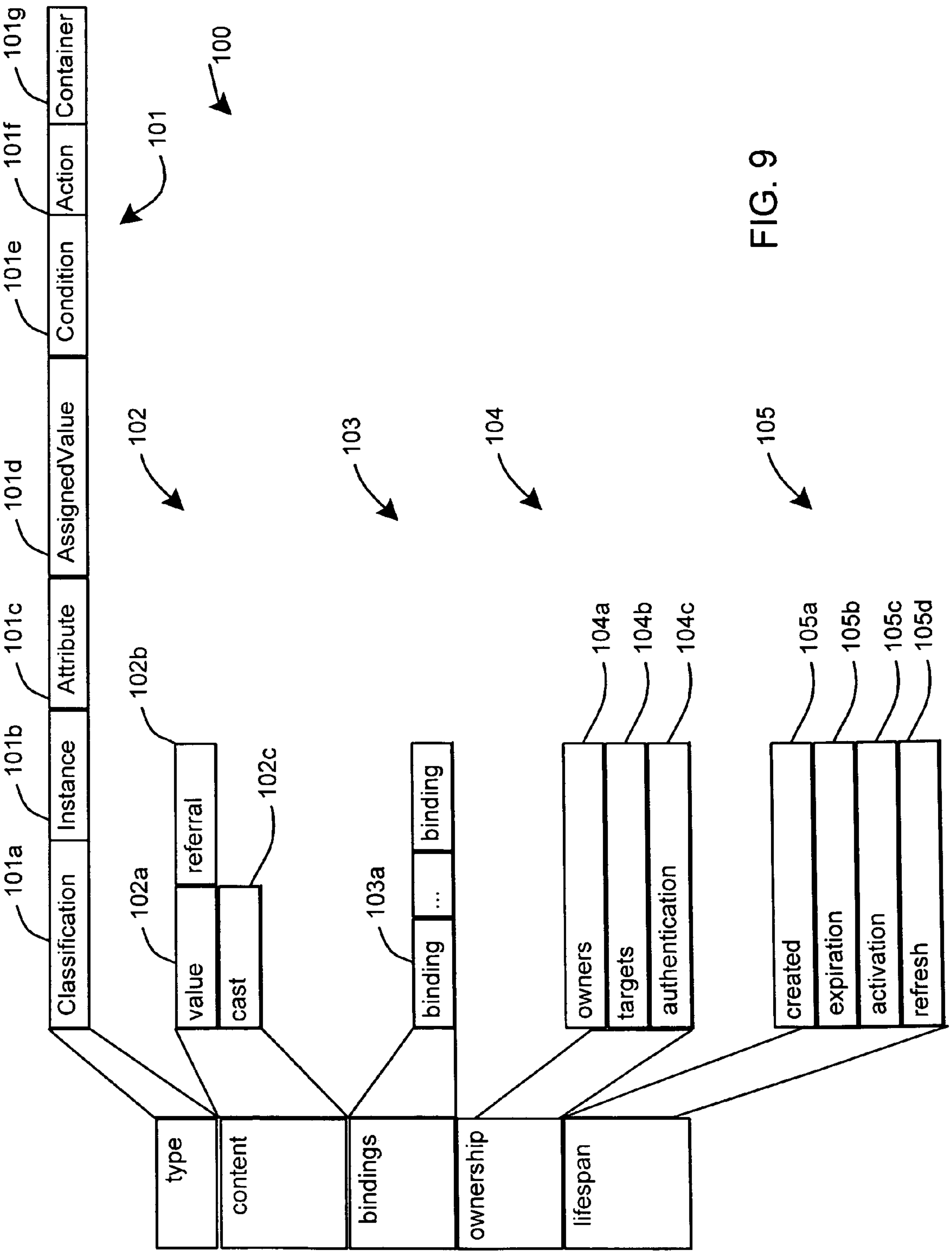

Referring now to FIG. 9, as mentioned, the type field 101 can be a classification, instance, attribute, assigned value, condition, action or container. The content field 102 includes a value field 102*a* that can hold a local value such as a string. A cast field 102*c* specifies the data type or filter for the local value. Instead of a local value, a referral 102*b*, via a gateway, for a value can be specified, as will be described in conjunction with FIG. 11.

Figure 10:
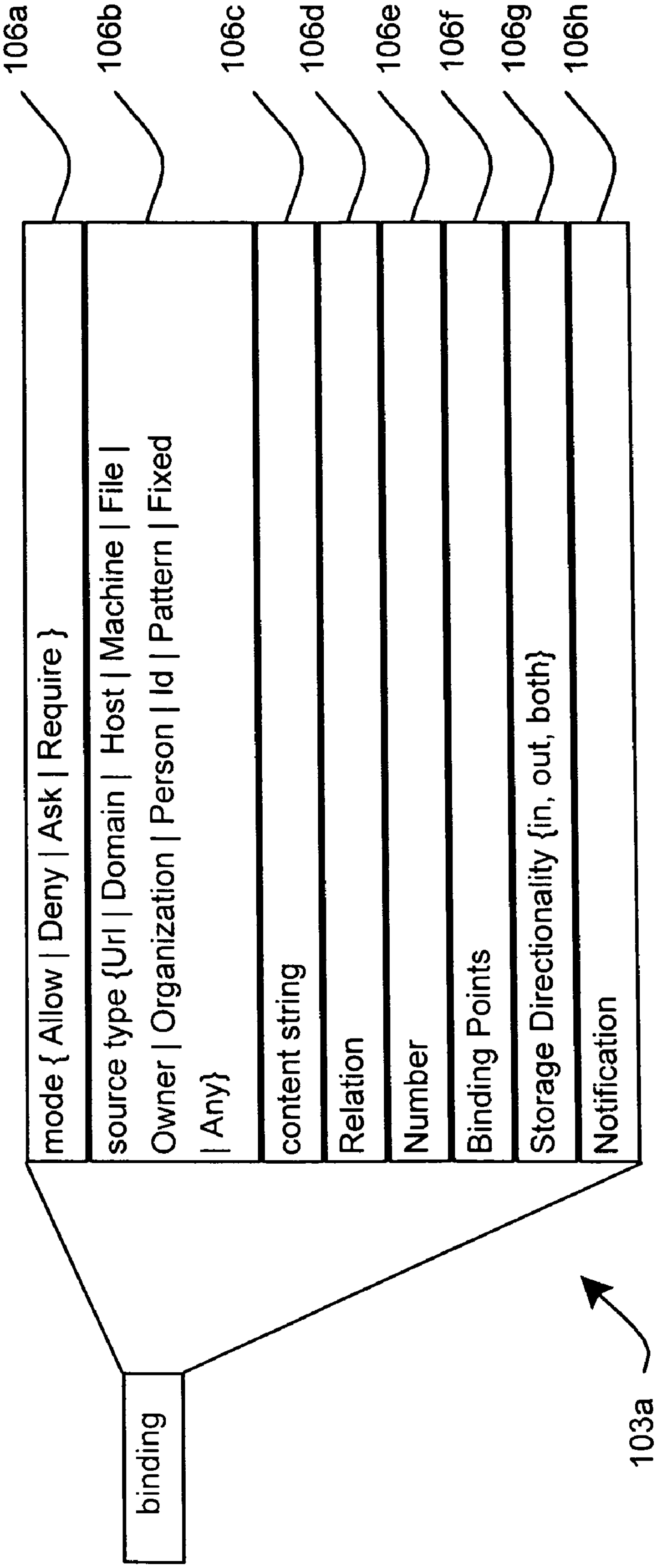

The binding field 103 includes a list of individual bindings, described in conjunction with FIG. 10. Each binding specifies a possible connection that a primitive can or does make with another primitive. Ownership field 104 includes a list of owners 104*a*, a list of targets or destination owners 104*b* and authentication 104*c*. Owners can be expressed as an E-mail address, a name of a company, person, organization, Internet domain, etc. Authentication 104*c* is a key that could either be required to enable decoding of the primitive or allow the primitive to be verified.

The life span 105 includes a date and time of creation 105*a*, expiration 105*b* and a status 105*c* of whether it is active or inactive. The life span 105 can optionally include a refresh specification 105*d* to indicate the frequency of reloading its source data. Whereas, the expiration field 105*b* can facilitate removal of old data, refresh 105*d* can facilitate keeping rapidly changing data up to date once it is read into the fragment database 24.

Referring now to FIG. 10, details of the binding field 103 are shown. A binding 103*a* can include a mode 106*a*, source 106*b*, content 106*c*, relation 106*d*, number 106*e*, binding points 106*f*, storage directionality 106*g* and notification 106*h*. The mode 106*a* could be either "allowed", "denied", "asked" or "required" as to whether it can bind to another primitive. "Ask" mode permits binding decisions to be made via a remote server. The source field 106*b* can be a specified URL, domain, host, machine, file, owner or organization or any source. The binding field 103*a* also includes a content string 106*c* which is the value defined by the source 106*b*. For example, if the source is 'domain' then the content holds the name of the domain. If the source is 'URL' then the content holds the URL string. The relation 106*d* specifies the relationship established by the binding. For example, the relation between two classification primitives would be 'super classification' for one primitive and 'sub classification' for the other primitive. The number field 106*e* can specify the optimal number, if any, of such bindings. The binding points 106*f* can specify what primitives or primitives within fragments can be bound to. The precision to which this is specified can vary from absolute positions, relative positions or as a pattern or expression.

Binding relation 106*d* can specify a relation to a primitive type. For example, the binding relation 106*d* can specify a super-ordinate relation from one classification primitive to another classification primitive, or an attribution of an instance primitive by an attribute primitive.

The binding points 106*f* can specify the primitive within a connected structure of primitives at which to bind. This can be specified as a position within pattern of connected primitives to match with. For example, the binding point can be at the top, middle or bottom of a sequence of classifications, or as an attribute to a particular classified instance.

Binding storage directionality 106*g* specifies if the binding is to result in incorporation "in" to the fragment base 24 holding the primitive, or to result in serving "out" of the primitive to the owners of the source, or both. Potentially, the binding of two primitives from different sources can result in a change in information in two or more databases, i.e. within the database that the binding occurs, and out at the database where the bound-to primitive came from. The binding directionality specification 106*g* controls how information gets incorporated into or distributed out of a fragment base 24. The binding of two primitives with binding directionality as "in", can result in the binding effecting local and remote data. The binding of two primitives with directionality as "out" will not effect any data. The binding of two primitives with one directionality as "in" and the other as "out" will alter the data where the "in" primitive originated.

Binding notification 106*h*, allows for signaling of the source owner that binding with its primitive occurred. The source owner, if it is a compatible search process 22 and fragment database 24, can update its data.

Directionality 106*g* and notification 106*h* facilitate primitives and fragments composed of primitives, to exist out as stand alone data units that can be read, bound and accepted into databases, and/or act as requests for information that if recognized, can result in a change in the originating database.

Figure 11:
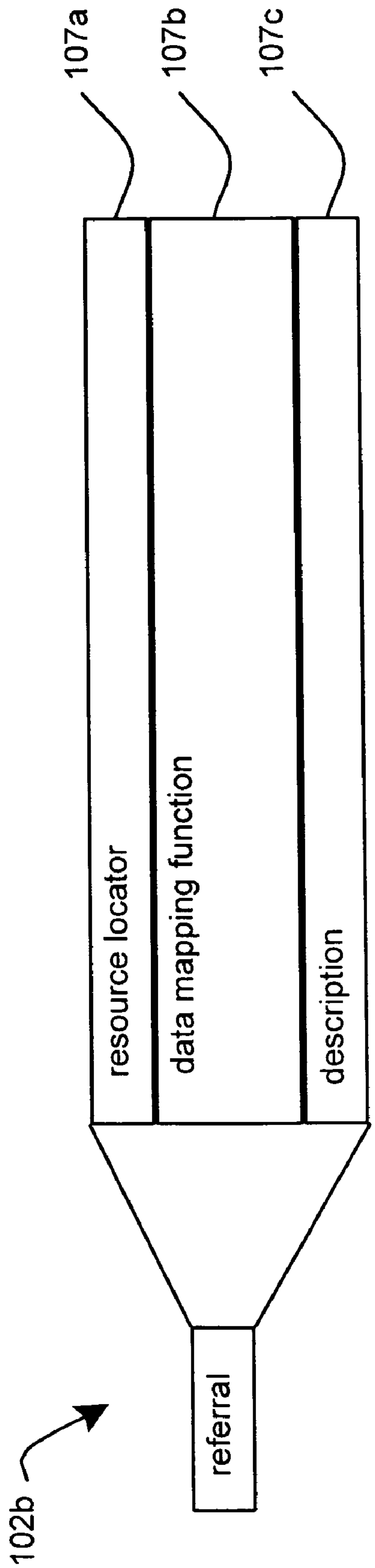

Referring now to FIG. 11, details of the referral field 102*b* of content field 102 are shown. The referral field 102*b* can include a resource locator 107*a* such as a URL that specifies the location of a file, a data mapping function 107*b* and an optional description 107*c*. The data mapping function 107*b* specifies how to convert the external data into a useable form. The mapping function 107*b* can, for example, call utility functions to parse text lines, extract words from text, or retrieve data from database servers.

Figure 12:
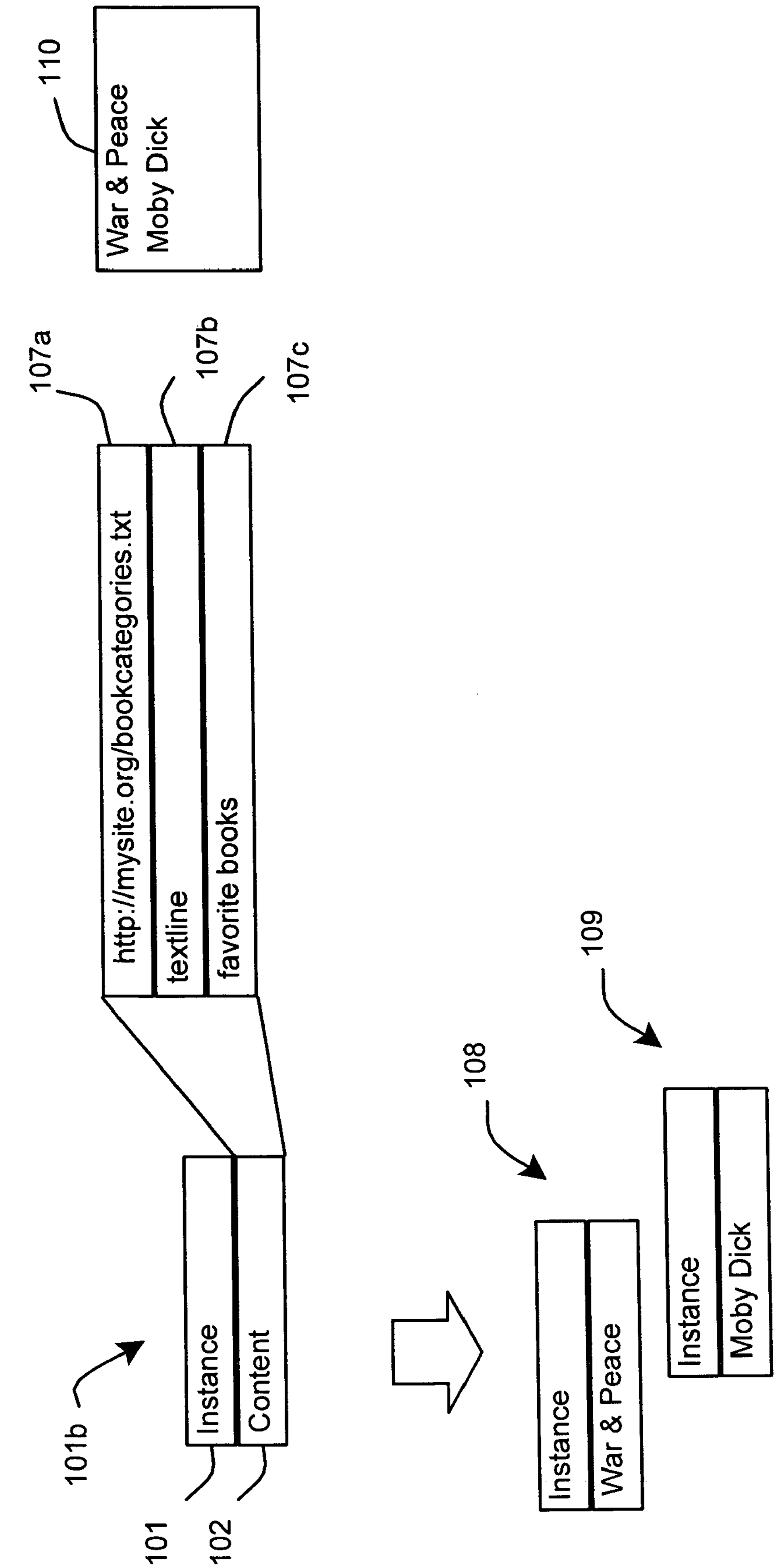

Referring now to FIG. 12, an example content referral is shown. The content referral has the resource locator 107 that points to a URL "http://mysite.org/bookcategories.txt" which is a text file 110. The data mapping function 107*b* specifies a "text line" or a reading by the external data reader 26 (FIG. 1) line of text at a time. In this example, the text file 110 contains 2 lines of text, which in turn forms two primitives 108 and 109. Here the primitives 108 and 109 are instance type primitives and have a content field containing "War & Peace" and "Moby Dick", respectively.

Figure 13:
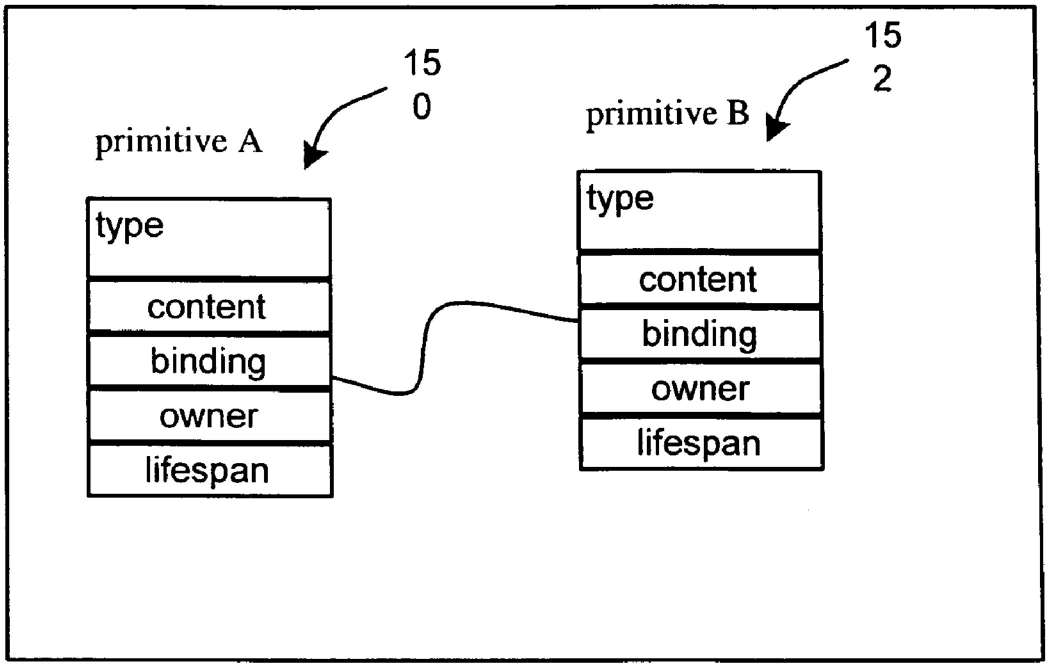
FIGS. 13–15 are diagrammatical views showing binding relationships of the data structures of FIGS. 8–12.
Figure 14:
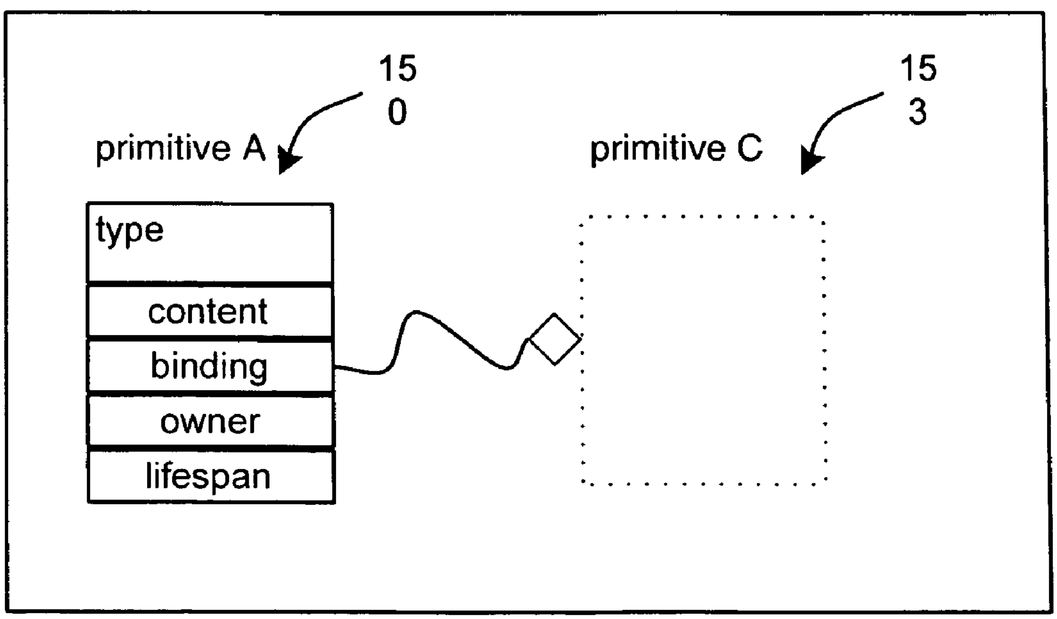

Referring now to FIGS. 13 and 14, examples of binding relationships are shown. In FIG. 13, two primitives 150, 152 are connected in a fixed or "set" manner. FIG. 14 shows a primitive 150 and a binding that is open, i.e., not connected to anything but is open to a potential primitive 153 that satisfies the binding specifications 103 (FIG. 9).

Figure 15:
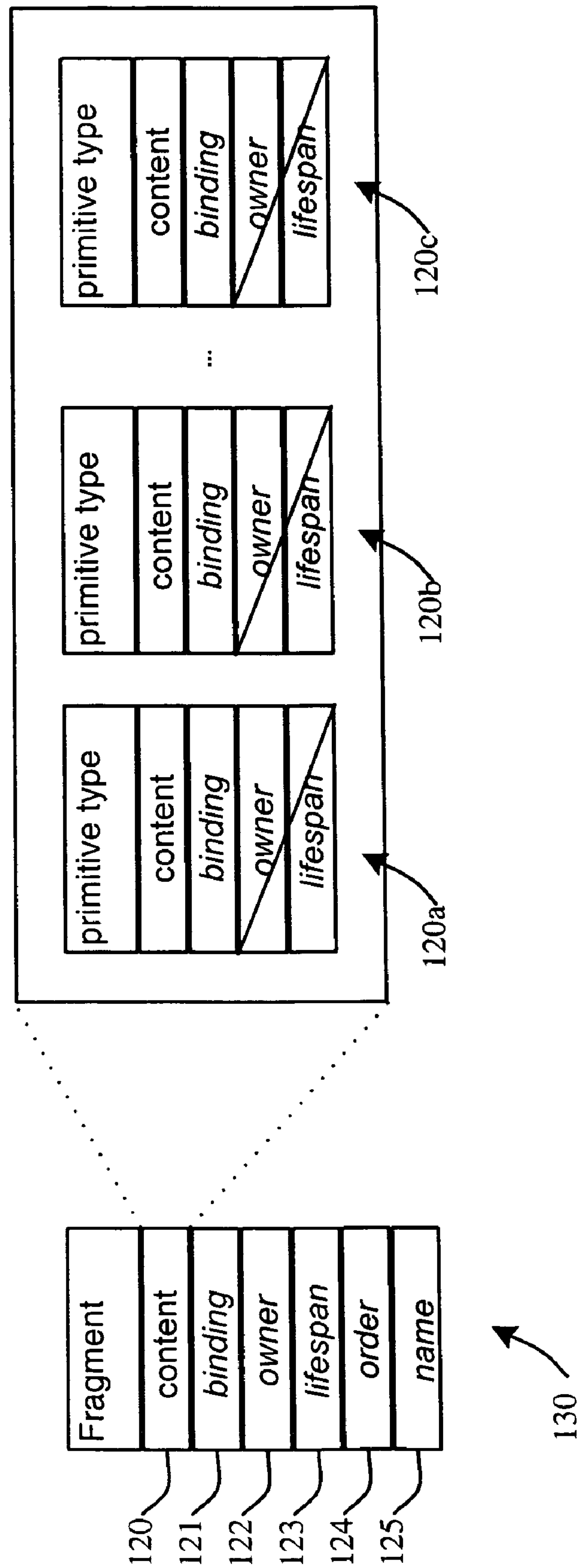

Referring now to FIG. 15, an exemplary fragment structure 130 is shown. In this example, the fragment structure includes three primitives 120*a*, 120*b*, 120*c*. Each of these primitives 120*a*, 120*b*, and 120*c* is in a sequence. Each primitive in the sequence is implicitly bound to its adjacent primitives in the sequence. Each primitive can specify other bindings to be allowed, denied or required. The fragment can specify binding 121, ownership 122 and life span 123 at the level of the whole fragment. The fragment can specify an owner and lifespan, for example, that applies to each primitive within the fragment. The fragment can specify to allow, deny or require bindings from particular sources which can add to binding specifications for each primitive. Bindings at the level of a fragment that 'deny' or 'require' binding can supersede primitive level 'allow' directives. These specifications can add to or supersede the specifications of each constituent primitive. Fragment order 124 can specify sequential implicit binding of primitives or unordered explicit bindings based on binding specification 121 and 103. Fragment base 125 can specify a name for the fragment 130.

Figure 16:
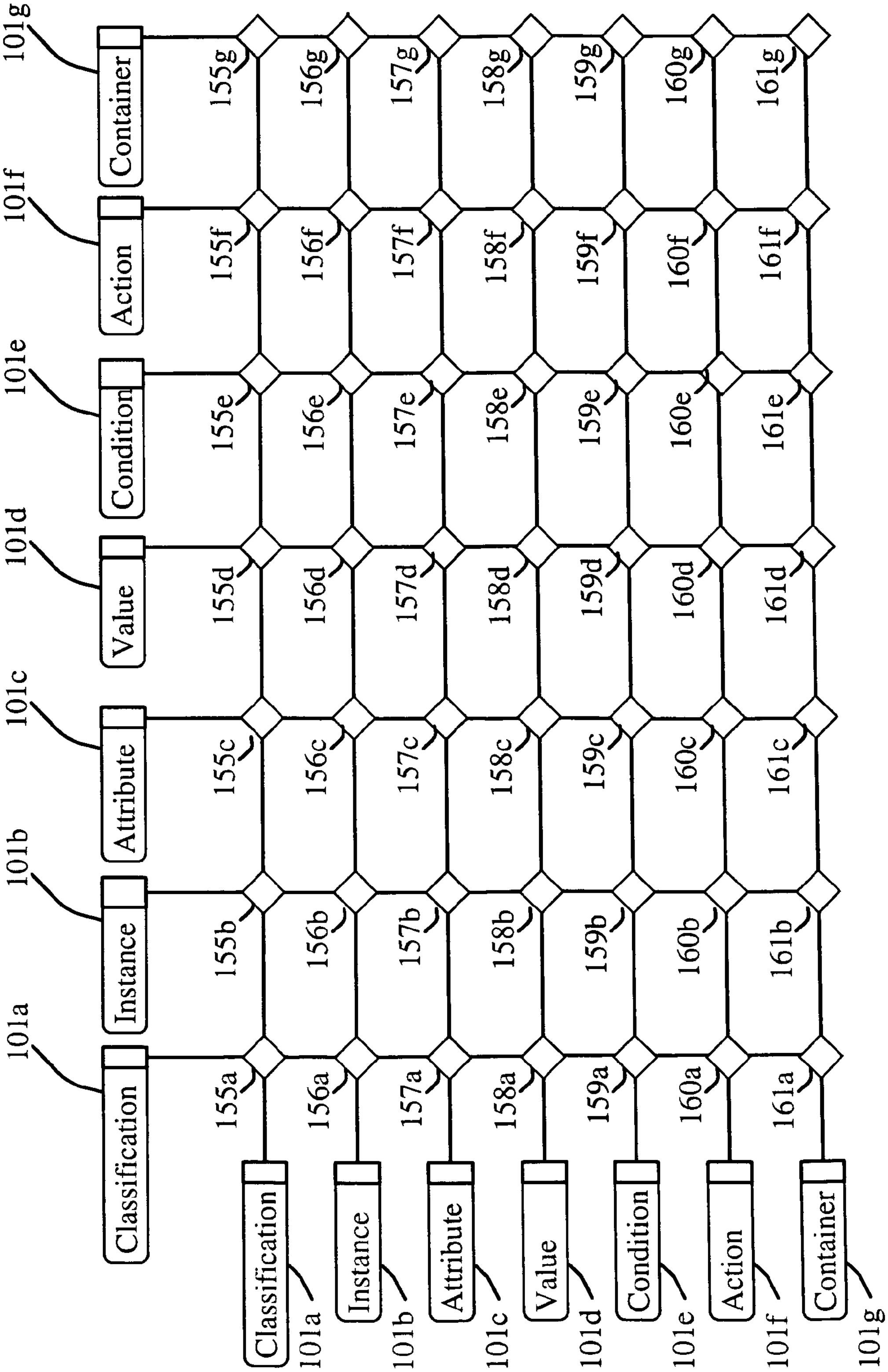
FIGS. 16–17 are diagrammatical views showing canonical forms of the data structures of FIGS. 8–12.

Referring now to FIG. 16, connections between individual primitive-types are shown as a connection matrix. As mentioned, the type field 101 can be a classification 101*a*, instance 101*b*, attribute 101*c*, assigned value 101*d*, condition 101*e*, action 101*f* or container 101*g*. The rows show the primitive-type bound from and the columns are the primitive-types bound to.

Figure 17:
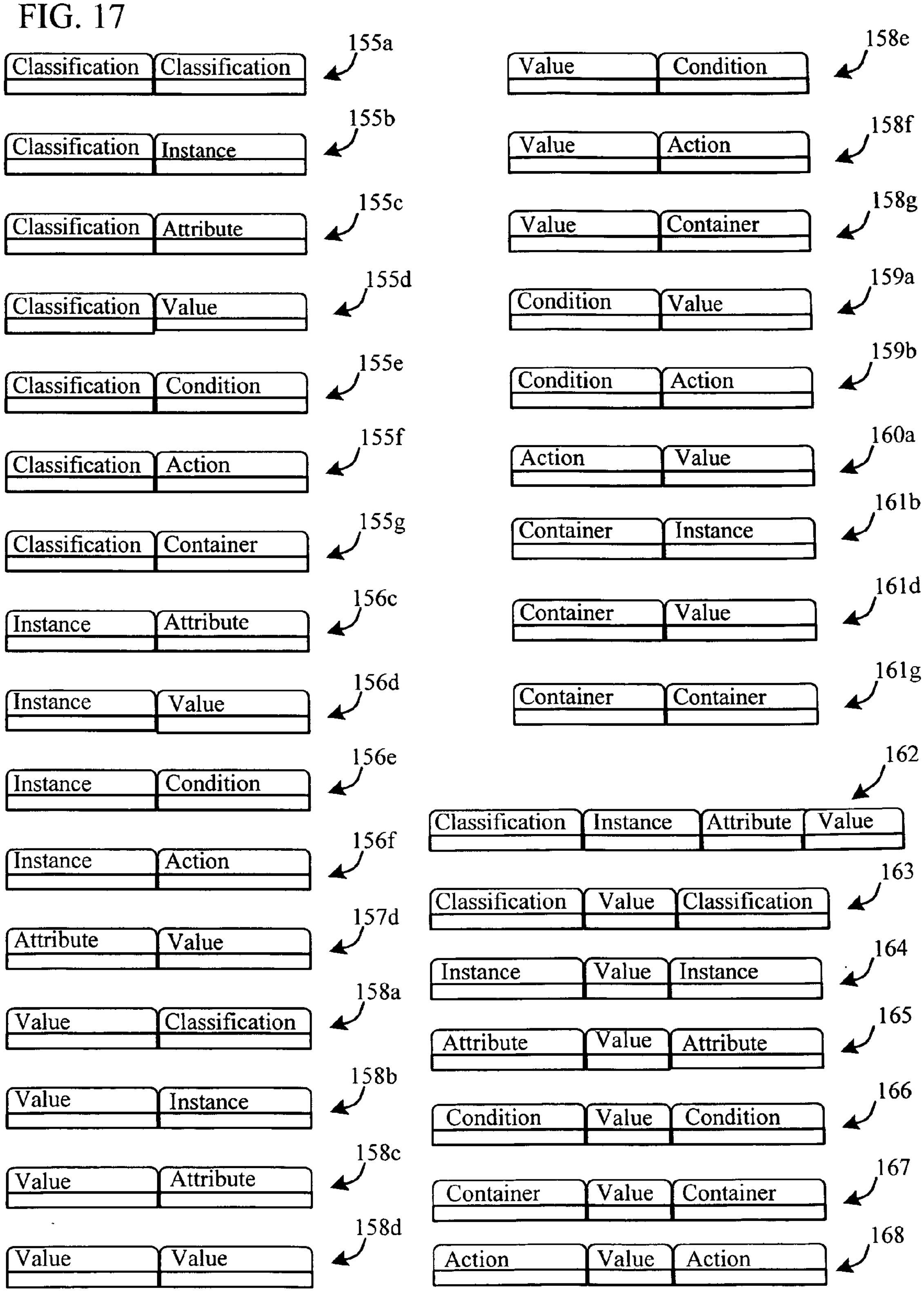

FIG. 17 shows the two primitive fragments yielded from the connections. Connections between a primitive-type can be made to any other primitive-type including the same primitive-type. However, certain connections have particular significance. FIG. 17 shows some important, canonical, two and three primitive fragments yielded from the connections.

Classification primitives 101*a* are shown to bind with any primitive-type, allowing any primitive to be classified. A classification primitive can bind with another classification primitive in a super-ordinate or subordinate relationship 155*a*. Most connections between two primitive-types establish an implicit primitive-type based relationship. Some connections, particularly connections between primitives of the same type, such as two classifications must specify an explicit binding relation. The connection between two classifications must specify which is super-ordinate and which is subordinate. One or more such bindings create a classification hierarchy fragment. A classification can bind with an instance, yielding a classified instance fragment 155*b* and 156*a*. The formation of classified instances 155*b* and 156*a* is an important starting point for describing a thing as an instance of a general type. A classification can bind with an attribute yielding a fragment denoting a general attribute for a classification 155*c* and 157*a*. A classification can bind to an assigned value 155*d* which in turn can be bound to another classification 158*a*, yielding an equivalent, i.e. alias, classification 163.

The value primitive allows primitives such as a classification to be equated with another primitive of the same type, thereby establishing equivalences. For example, the classification "car" can be made equivalent to the classification "automobile".

A classification can bind with a condition yielding a classified condition fragment 155*e* and 159*a*. A classified condition fragment 155*e*, 159*a* specifies a condition that is general to the classification and therefore to instances of the classification. A classification can bind with an action, yielding a classified action fragment 155*f* and 160*a*. A classified action is an action that is general to the classification and its instances. A classification can bind with a container, yielding a classified container fragment 155*g* and 161*a*.

Instance primitives can 101*b* can bind to an attribute primitive yielding an instance attribute fragment 156*c* and 157*b*. An instance attribute fragment 156*c* is the smallest expression of a property for an instance, such as "Dan's age" where "Dan" is an instance and "age" is an attribute. An instance primitive can bind to an assigned value primitive 156*d* which in turn can be bound to another instance 158*b*, yielding an equivalent instance 164. This fragment 164 expresses that an instance is the same as another instance, such as "the instance Dan is the same as the instance Daniel". An instance can bind to a condition yielding a condition that the instance responds to 156*e* and 159*b*. An instance can bind to an action yielding an action that the instance can perform 156*f* and 160*b*. As mentioned, an action can be descriptive or computational. For example, an instance "Dan" can be bound to an action "reads". Even without associated computational function, such an instance-action fragment 156*f* expresses a small fact that can be used during a search, such as for an inquiry on what people like to do.

An attribute primitive 101*c* can bind with an assigned value primitive 101*d* yielding an attribute value fragment 157*d* and 158*c*. This is the fragment form of the basic pairing of attributes and values. An important difference here is that the attribute-value fragment 157*d* is part of a larger system and structure of information. For example, an attribute-value 157*d* can belong to an instance 156*c*, which in turn can be classified 155*b*, yielding a 'attribute-value of a classified instance' fragment 162 (FIG. 17). Since the presented system of primitives 96 and fragments 94 is used to dynamically compose information objects 93, the formation of attribute-value fragments 157*c* as part of a larger fragment, such as fragment 162, allows both information structure and particular assigned values to be used in a dynamic manner.

The value primitive 101*d* can be used to specify equivalence relations between primitives, such an equivalence between two classification primitives, or between two instance primitives. FIG. 17 shows equivalence fragments shown as three-primitive fragments for classification equivalence 163, instance equivalence 164, attribute equivalence 165, condition equivalence 166, container equivalence 167, action equivalence 168, and value-equivalence 158*d*.

A condition primitive 101*e* can bind with a value primitive yielding an equivalent condition 159*d* and 158*e*. A condition primitive can bind to an action primitive yielding a condition-action fragment 159*f* and 160*e*. This is the fragment expression of a condition-action pair. A condition primitive can bind to another condition primitive to form a nested condition 159*e*. The super-ordinate subordinate relationship 159*e* between condition primitives must be made explicitly.

An action primitive can bind 160*d* to a value primitive which in turn is bound 158*f* to another action, yielding an equivalent action 168.

Container binding allows primitives to be grouped without classified likeness, as is the case with classification. A container primitive can bind to an instance primitive, yielding a contained instance fragment 161*b* and 156*g*. A contained instance 161*b* is distinct from a classified instance 155*b*. For example, "War and Peace" is an instance of a book. The instance can be contained in "my library" but "War and Peace" is not an instance of a library. A container primitive can bind 161*d* to a value primitive which in turn can be bound 158*g* to another container, yielding an equivalent container 167. A container primitive can bind to another container, yielding a container hierarchy fragment 161*g*. The super-ordinate subordinate relation between two connected containers must be made explicit.

Figure 18:
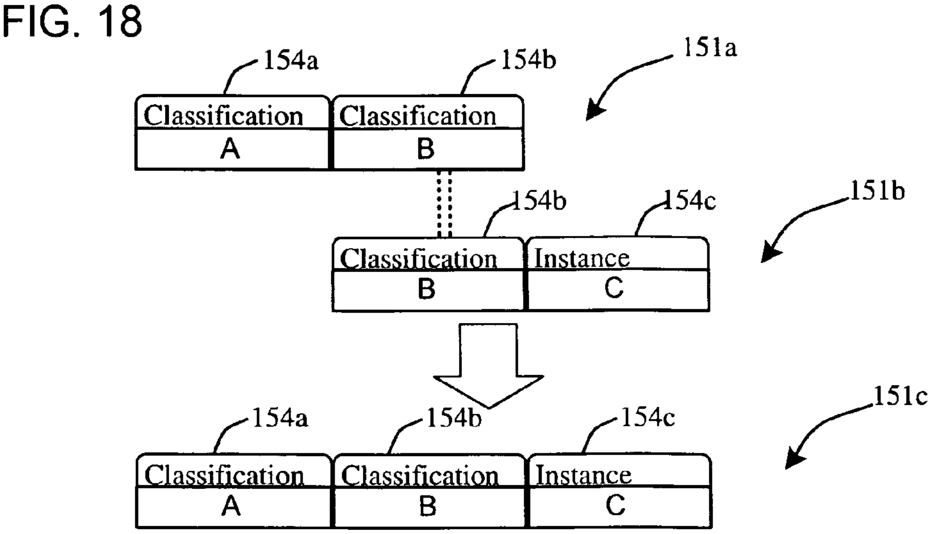
FIGS. 18–20 are diagrammatical views illustrating assembly of fragments.

Referring now to FIG. 18, the assembly of two fragments 151*a*, 151*b* to yield the fragment 151*c* is shown. Fragments can be assembled into larger connected assemblies by identifying identical or equivalent primitives and unifying the identified fragments so that they are treated as one. In the example, fragment 151*a* and 151*b* both contain the primitive "B" 154*b*. The example shows the primitive type "classification" and content "B" to be identical. One could also test primitive ownership, life span and other specifications to determine whether two primitives are identical. For fragments consisting of a long sequence of primitives, such as a long classification hierarchy chain, the more identical primitives between two fragments indicates a higher degree of statistical confidence that the fragments should be so connected.

Figure 19:
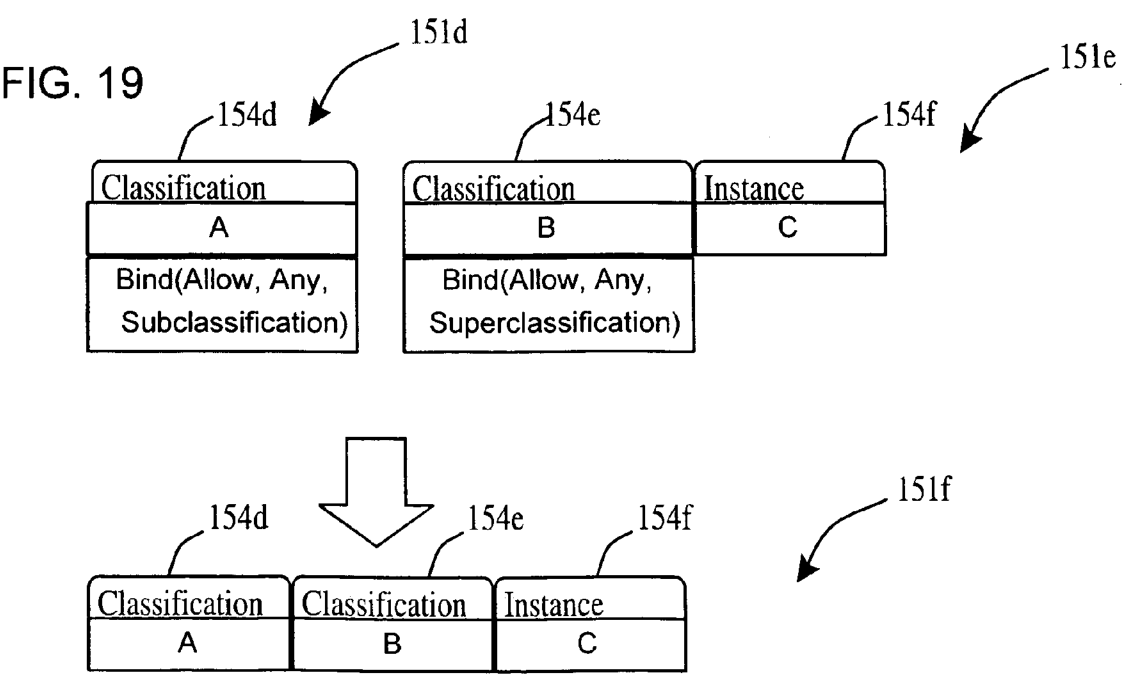

Assembly of fragments can also be determined through an explicit binding specification. FIG. 19 shows two fragments 151*d*, 151*e* with no common primitive. Identity binding therefore cannot be used to assemble these two fragments. However, classification primitive "A" 154*d* has an explicit binding that allows the binding "sub-classification" to occur. Similarly, the classification "B" 154*e* allows a super-classification. The resultant fragment 151*f* is sequentially identical to the fragment 151*c* but formed from a different process. The binding mode 106*a* in this example is to "allow" a binding, in contrast to "deny" or "require". The binding source 106*b* in this example is to allow "any" source. The binding source can specify the origin of an acceptable binding partner in very specific terms, such as only from one file or URL, or in general terms, such as from a company or from any source.

Figure 20:
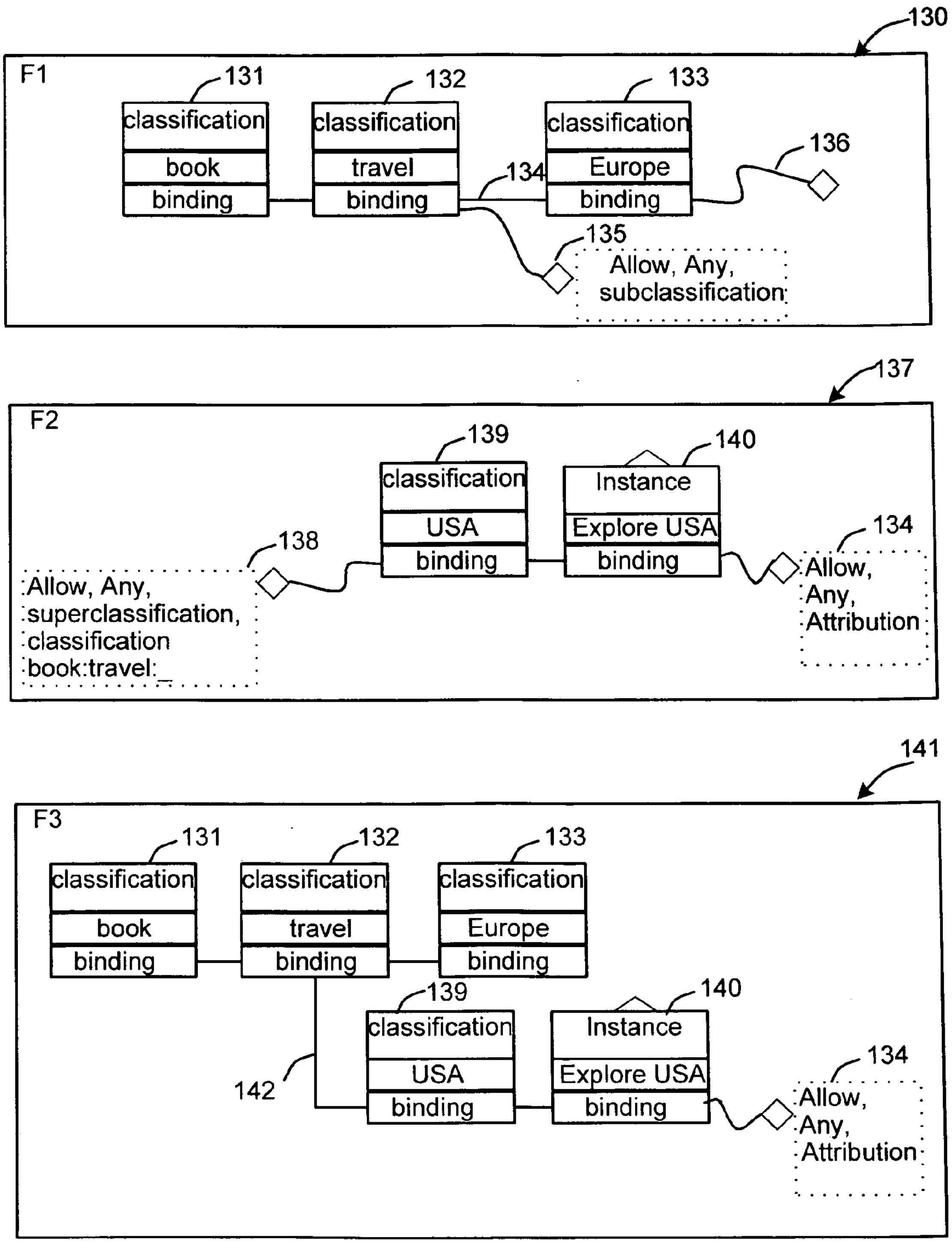

Referring now to FIG. 20, an example that illustrates the assembly of two fragments 130, 137 into a larger fragment 141 is shown. One fragment 130 is a classification fragment comprised of a classification primitive's "book" 131, "travel" 132, and "Europe" 133. The fragment expresses the primitive that "travel" 132 is a sub classification of primitive "book" 131, and the primitive "Europe" 133 is a sub-classification of the primitive "travel" 132. The classification primitive "travel" 132 of fragment 130 has an open binding 135 for another classification primitive.

The second fragment 137 is a classification instance fragment 155*b*. The fragment expresses that "Explore USA" is an instance of the classification "USA". The classification "USA" has an open binding 138 that allows 106*a* any source 106*b* to bind the relation 106*c* "super-classification", i.e. as a super ordinate classification. In this example context, the two fragments 130, 137 can be bound based on explicit binding allowances, yielding the new fragment 141. The "USA" classification primitive 139 now is bound to the "travel" classification primitive. The composed fragment 141 extends the classification of the primitive "Explore USA" as an instance of a USA travel book. Note that the fragment 141 express no direct relationship between the classification primitive 133 'Europe' and classification primitive 139, but infers an indirect relationship that both sub-classification primitives 133 and 139 relate to 'travel'. The open binding 134 of the instance 140 will allow an attribute to bind to it. In the present example, binding has been shown without much limitation, in order to emphasize the basic assembly process.

Figure 21:
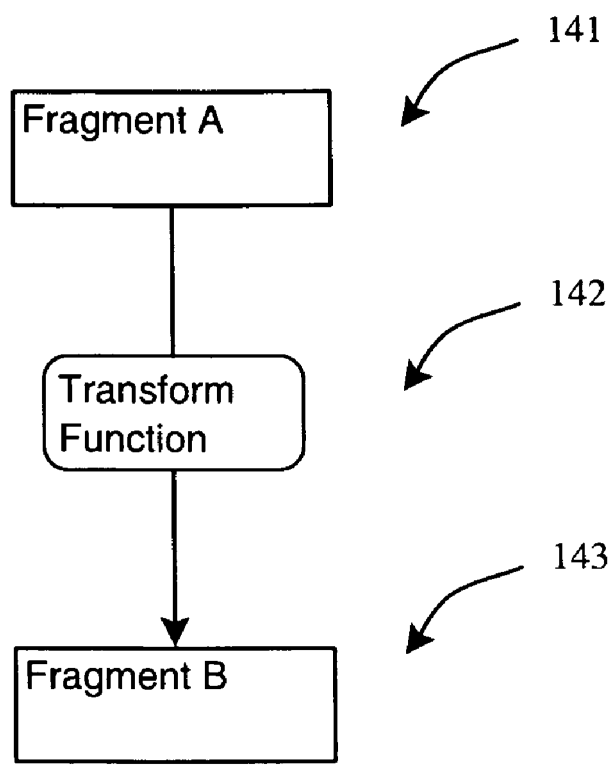
FIGS. 21–23 are diagrammatical views illustrating transformation of fragments into other fragments.

Referring now to FIG. 21, a special form of assembly technique is the transformation of one fragment 141 into another fragment 143 based on a transformation function 142. A transformation function 142 can be represented as a condition-action fragment 159*b* (FIG. 17), where the condition is the existence of a fragment of a particular form, and the action is the restructuring of the fragment into another form. Fragment transformations can be specified in terms of general fragment structure, i.e. a sequence of primitive-types, without regard to their primitive content 102.

Figure 22:
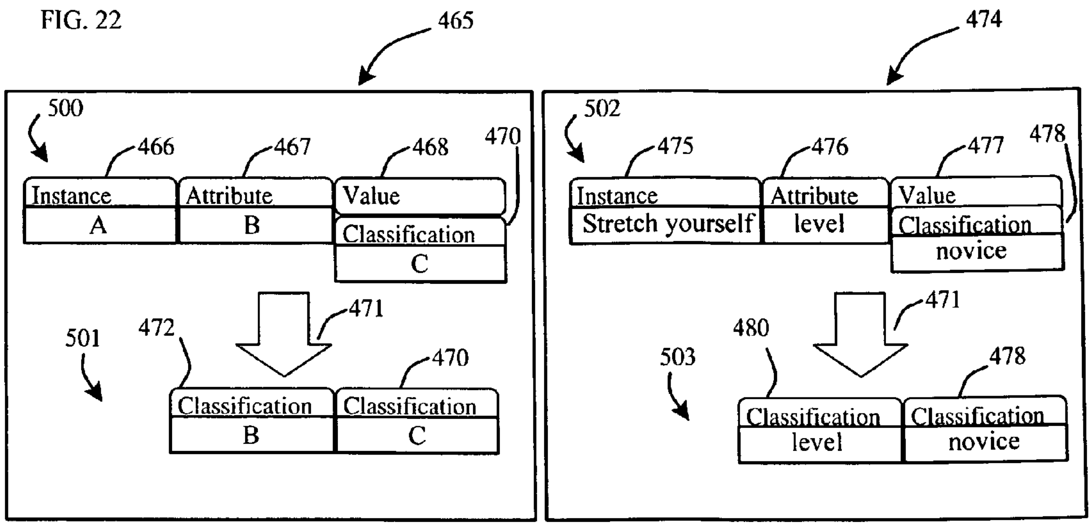

Referring to FIG. 22, a transformation 465 is shown where a fragment 500 containing the primitive sequence {instance 466, attribute 467, value 468, classification 469} is transformed via a transform function 471 into a fragment 501 of the sequence {classification 472, classification 470}. In general, given an instance-attribute-value where the value is a classification, a new classification hierarchy can be formed, where the name of the attribute is the super-ordinate classification. For example, the transformation 474 shows a fragment 502 of the identical primitive sequence as fragment 500, but with actual content. The fragment states that the level of the book "Stretch yourself! is novice", where "Stretch yourself!" is the instance (of a book), "level" is the attribute, and "novice" is the attribute's value and "novice" is a classification. This fragment can be transformed via a transform function 471 into a classification hierarchy fragment 503 that expresses that the classification "novice" is a sub classification of "level". The transformation 465, in general form, and 474 in example form, have altered specific information about an instance to general classification structure. Transformation functions can be specified as a condition-action fragment in which both the condition is the existence of a fragment and the action is the production, alteration or removal of a fragment. The fragments can be fully specified or specified in structural form, i.e. a collection of primitives, with incomplete specification of primitive type 101, primitive content 102, bindings 103, ownership 104 or lifespan 105. Data matching the starting fragment or fragment pattern is used to produce a fragment fitting the ending fragment structure. Some of the data of the starting fragment may be transferred into the ending fragment. Transformations can be applied to the data in a fragment database, for example, to maintain consistency, check and remove identified structures, or change the way information is expressed structurally.

Figure 23:
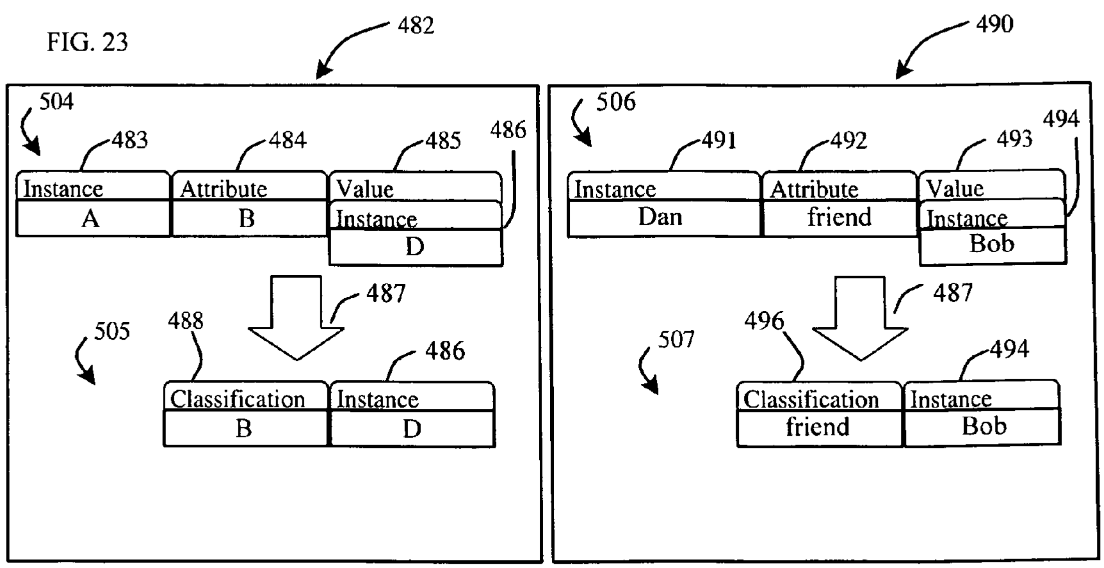

Referring to FIG. 23, a second transformation type is shown. The fragment 504 containing the primitive sequence {instance 483, attribute 484, value 485, classification 486} is transformed, via a transform function 487, into a fragment 505 of the sequence {classification 488, instance 486}. In general, given an instance-attribute-value where the value is an instance, a new fragment can be formed, where the name of the attribute 484 is now a classification 488 of the instance 486. For example, the transformation 490 shows a fragment 506 of the identical primitive sequence as fragment 504, but with actual content. It is a fragment stating that "Dan's friend is Bob", where "Dan" is the instance, "friend" is the attribute, and "Bob" is the attributes value and is also an instance. This fragment can be transformed via a transform function 487 into a classified instance fragment 507 where the instance "Bob" 494 is now classified as "friend" 496.

Both transformations 465, 482 result in the transformation of fragments from one form into another. More importantly, both transforms create generalized information from more specific information. Such transformations can be used to alter fragment bases 24 so that information is more structurally suitable for evaluation and searching.

Figure 24:
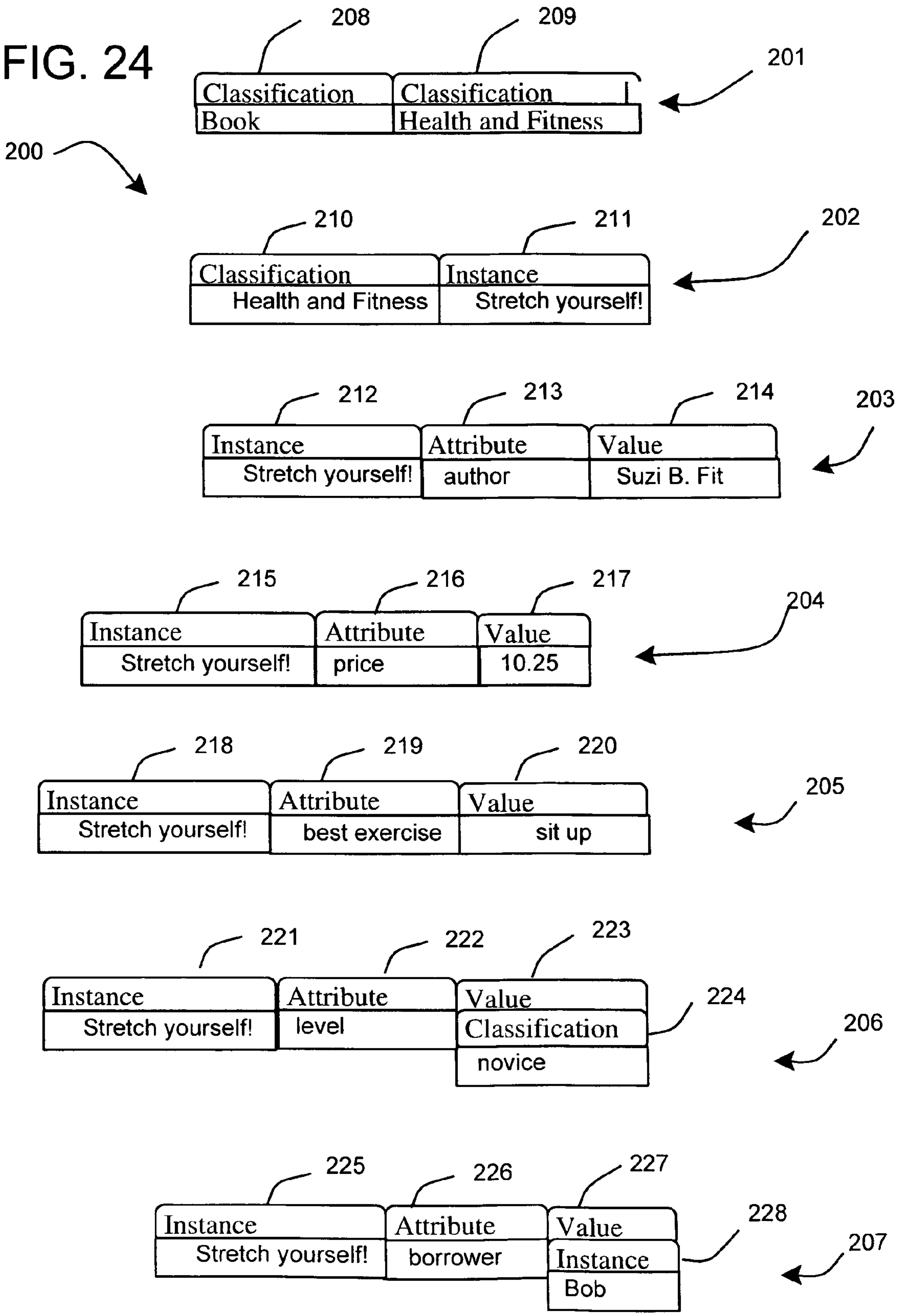
FIGS. 24–26 are a diagrammatical views of composed information objects.

Referring now to FIG. 24, a set of fragments 200 is shown. Fragment 201 is a classification hierarchy fragment 155*a* where "Health and Fitness" is a sub-classification 209 of "Book" 208. Fragment 202 is a classified instance fragment 155*b* where the "Stretch yourself!" is an instance 211 of the classification "Health and Fitness" 210. Fragment 203 is an attribute-value of an instance where the value "Suzi B. Fit" 214 is the author 213 of "Stretch yourself!" 212. Fragment 204 is another attribute-value of an instance, where the price 216 of "Stretch yourself!" 215 has the value '10.25' 217. Fragment 205 is an attribute-value of an instance where the best exercise 219 of "Stretch yourself!" 218 is the sit up 220. Fragment 206 is an attribute value of an instance where the level of "Stretch yourself!" is the classification "novice" 224. Fragment 207 is an attribute-value of an instance where the borrower 226 of "Stretch yourself!" is the instance "Bob".

Figure 25:
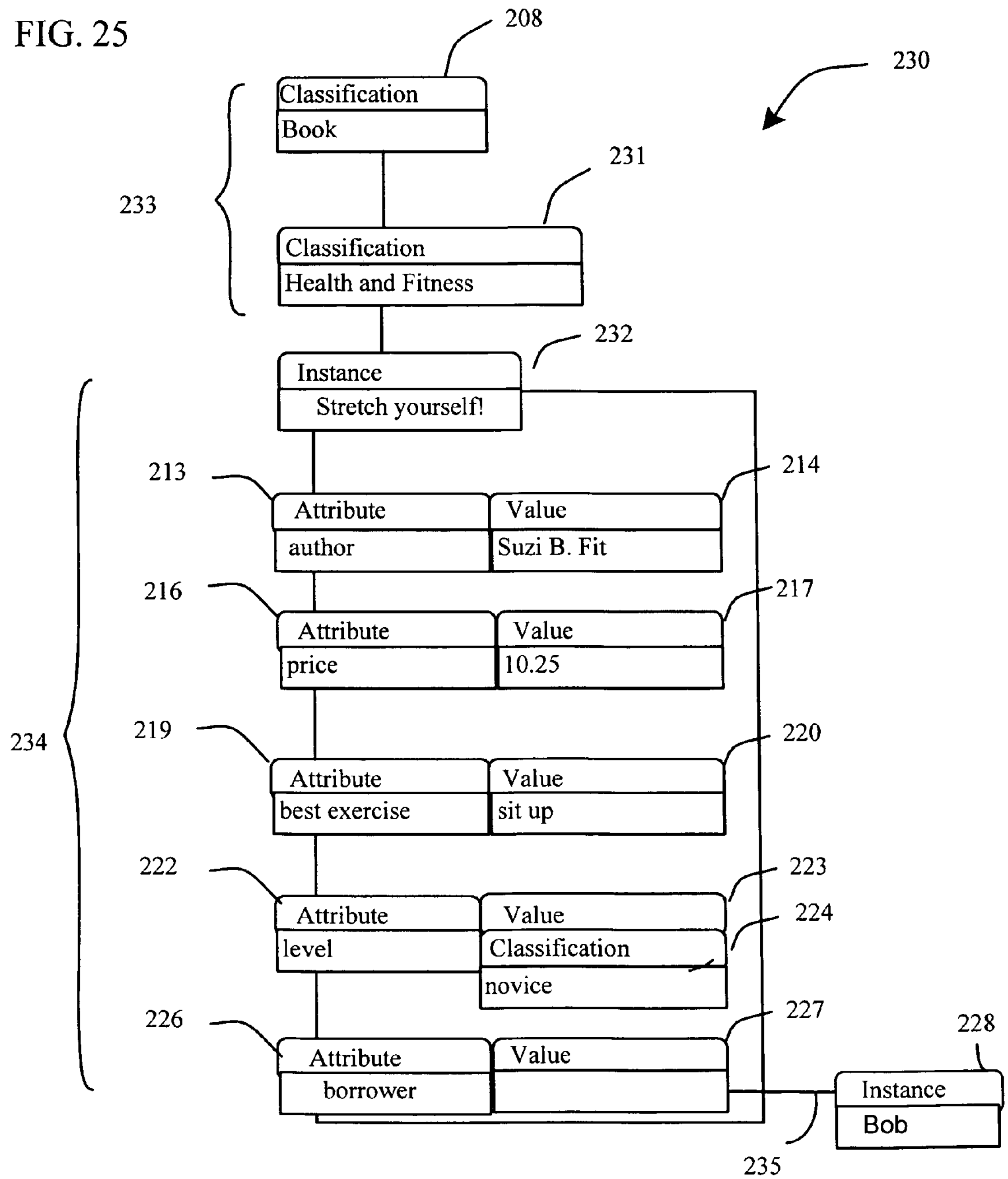

Referring now to FIG. 25, fragments 200 (FIG. 24) can be assembled together using the described identity binding technique (FIG. 18) to yield a composite information object 230. The object 234 is the instance 232 named "Stretch yourself!". The instance primitives 211, 212, 215, 218, 221 and 225 have been merged by binding into the instance 232. "Stretch yourself!" is an instance of a health and fitness 231 book 208. The composed object 234 has five attributes, namely author 213, price 216, best exercise 219, level 222 and borrower 226. Each attribute has a value. Values can refer to other primitives. The attribute "level" 222 has as a value 223, the classification "novice" 224. The attribute "borrower" 226 has as a value 227 the instance "Bob" 228.

Figure 26:
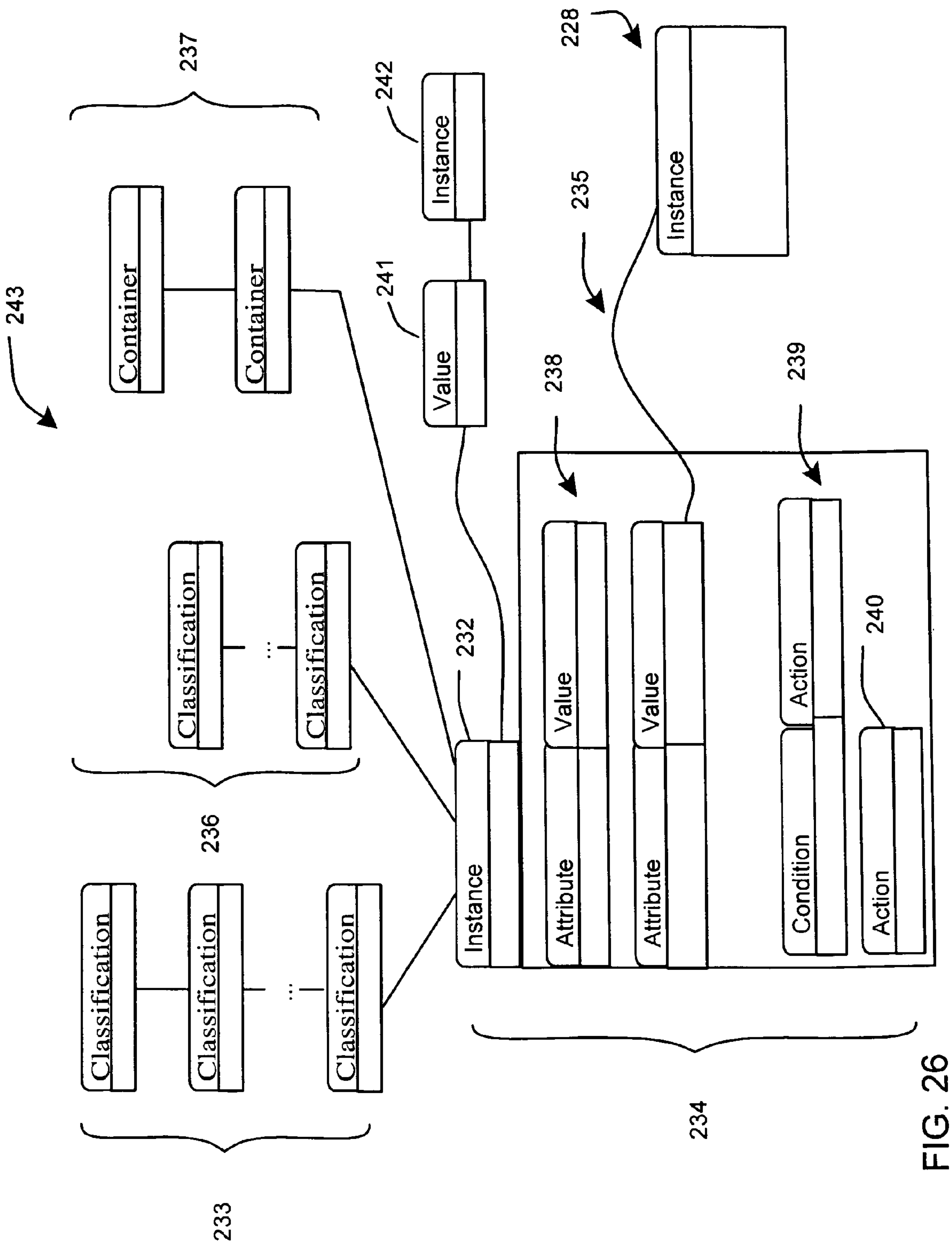

Referring now to FIG. 26, the example composed information object 230 (FIG. 25) has the general structure 243, as shown. A composed information object 234 is composed of an instance primitive 232 that identifies, i.e. names, the object. The instance can be classified by one or more classifications, structured as hierarchies 233, 236. The composed information object 234 can be a member of one or more container hierarchies 237. The composed information object 234 can possess properties in the form of attribute-values 238, condition-actions 239 and actions 240. The instance name 232 can be equivalent to another instance 242 via an interconnecting value primitive 241. The value of an attribute can refer to another instance 228 thus establishing a relation between two composed objects.

Figure 27:
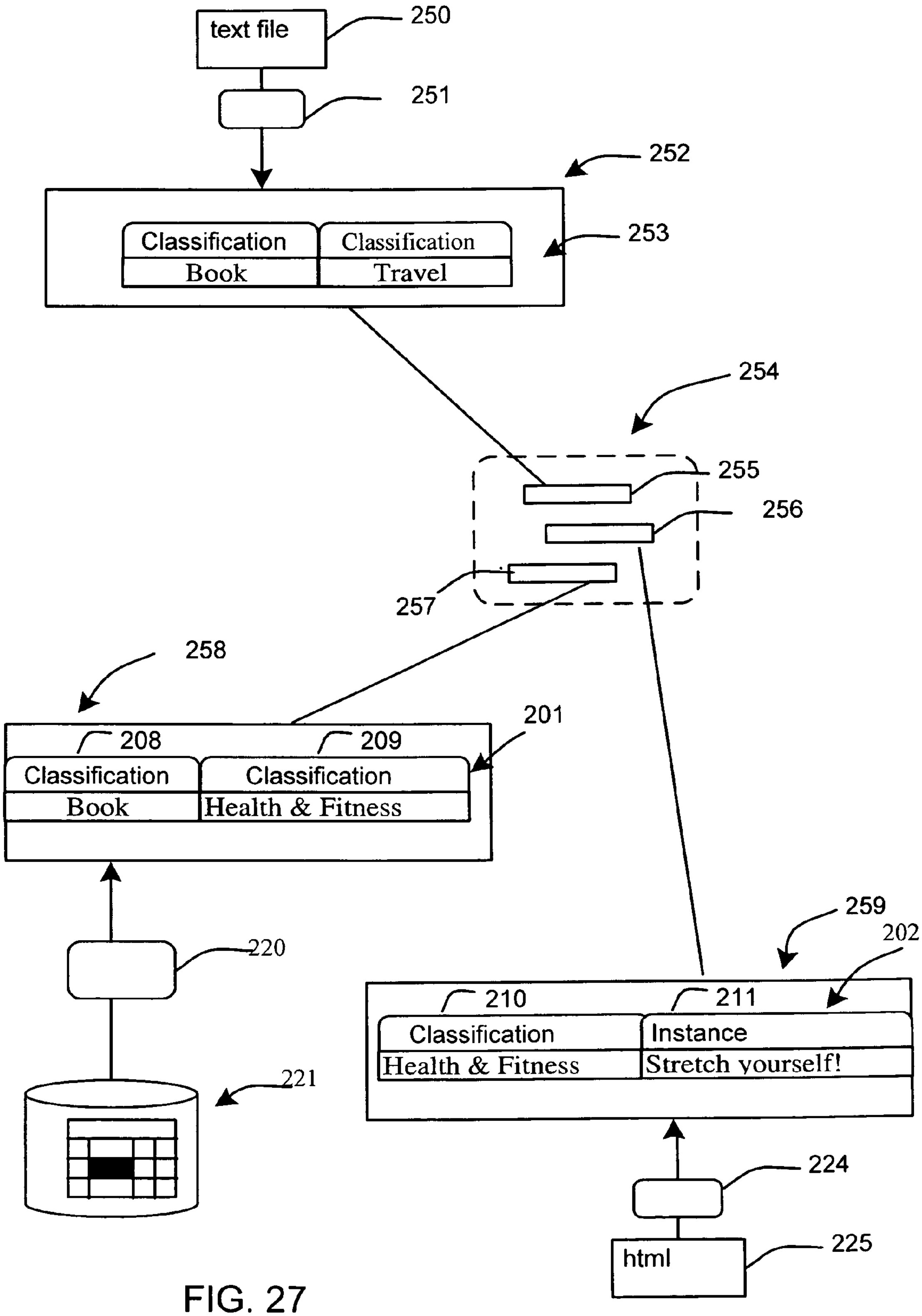
FIGS. 27–31 are diagrammatical views showing use of external resources to produce fragments.

Referring now to FIG. 27, a composed information object's fragment data is derived from a variety of sources. The information used to fill the contents 102 of primitives 96 that make up fragments 94 and the subsequent composed information objects 93 can originate from external data resources 14. External data sources can include text files 250, tagged documents such as HTML documents 225, and databases such as databases 221. Content 102 of primitives 96 derived from external resource 14 use content referral 102*b*, as previously described. A resource locator 107*a* specifies the external resource 14 and a data mapping function 107*b* specifies the manner in which the external data is parsed 28.

Figure 28:
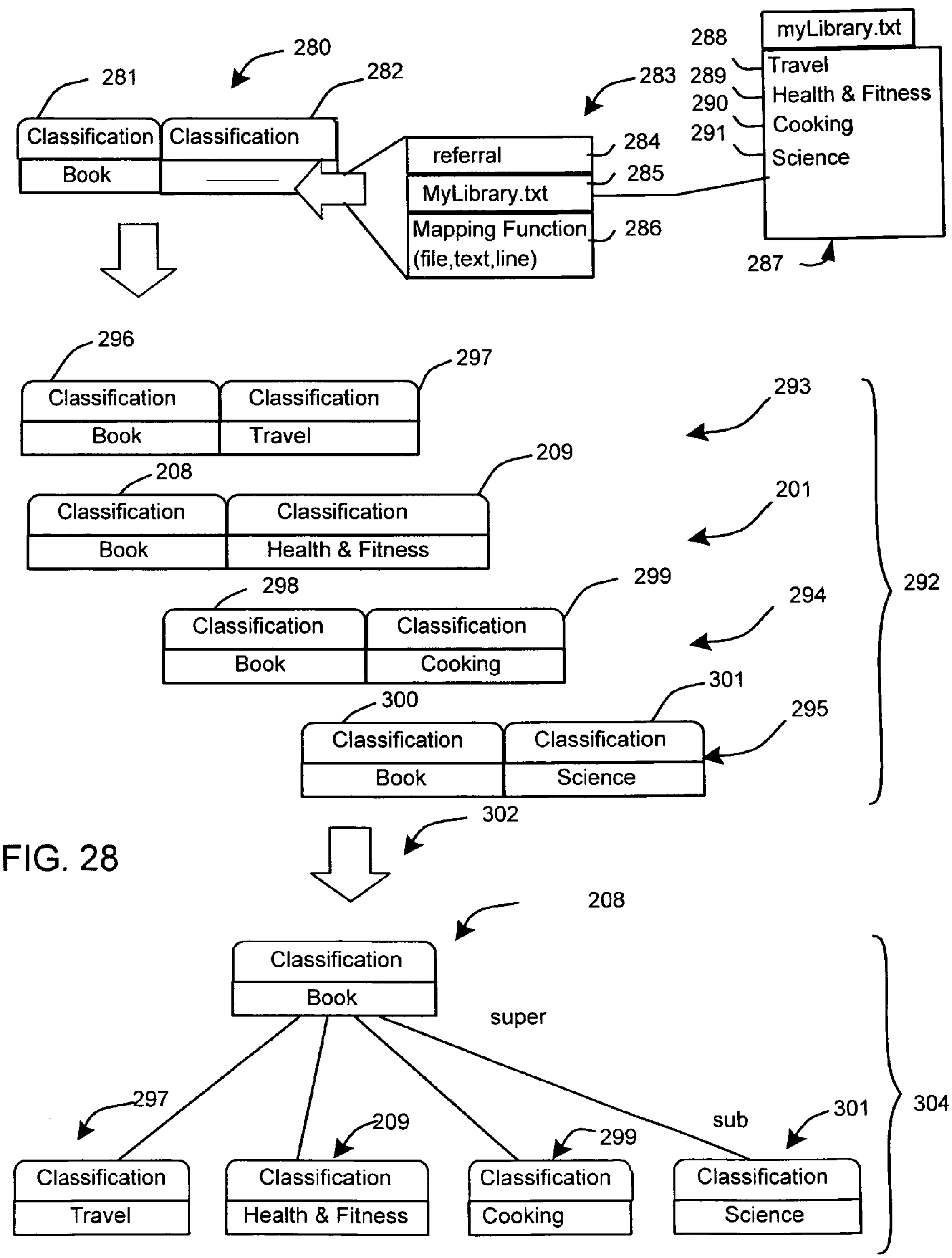

Referring to FIG. 28, data from an external text file 287 can be used to produce fragment data. The classification hierarchy fragment 280 is partially specified. The classification "Book" 281 has an unspecified subordinate classification 282. Instead, a content referral 283 specifies a resource 284 as the file 287 named "myLibrary.txt". The content referral 283 also specifies a data mapping function 286 to read a "file" as "text" and break it up by "line." The resource locator field 285 refers to a file resource 287, containing four lines of text "Travel" 288, "Health and Fitness" 289, "Cooking" 290 and "Science" 291. Each of these text lines can be used to create a set of fragments 292.

The resultant fragments 292 are individual classification hierarchy fragments fitting the structure of the original fragment 280, with the referred 283 external data 287 occupying the contents field of each classification primitive 297, 298, 299 and 301. The fragments 293, 201, 294 and 295 express the categories "Travel Book", "Health and Fitness Book", "Cooking Book", and "Science Book", respectively. The fragment database 24 can assemble these fragments 292 into a collective hierarchy 304, if possible. In this example, the classification "Book" 208 is the super-classification of four classifications "Travel" 297, "Health and Fitness" 209, "Cooking" 299 and "Science" 301.

Figure 29:
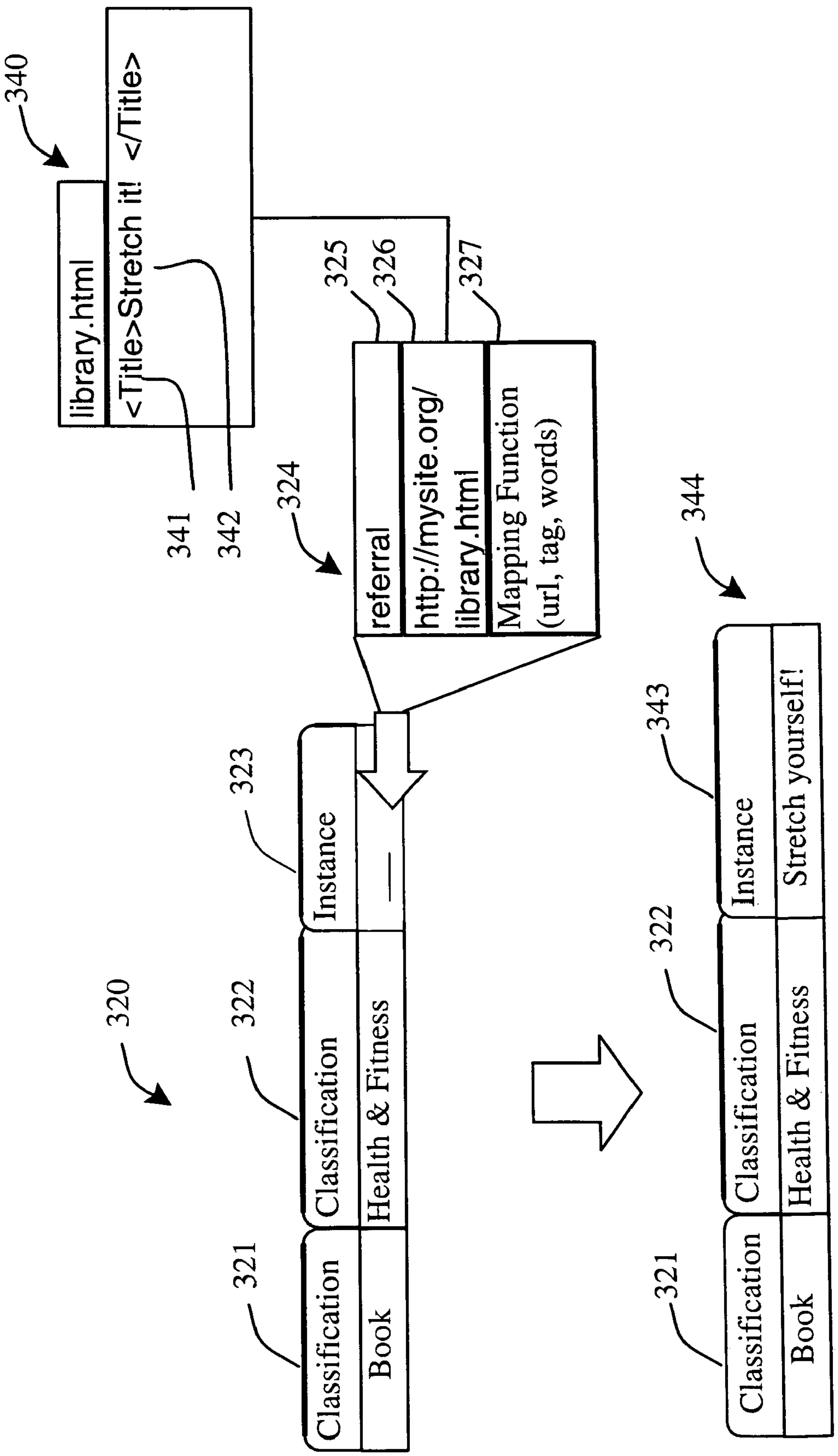

Referring now to FIG. 29, an external HTML file 340 is used to produce fragment data. A fragment 320 is of the canonical fragment form of a classified instance 155*b* (FIG. 17). "Health and Fitness" 322 is a kind of "Book" 321. The instance 323 of this classification is specified by referral 324 to the resource 340 named http://mysite.org/library.html 326, a hypertext file. The resource 340 contains markup language tags such as a title tag 341 and the title string 342. The content referral specifies through an external mapping function 327 to map, for example, the specified url 326 by tagged words, such as the title. The resultant fragment 344 is the instance "Stretch yourself!" 343 as an instance of a Health and Fitness Book.

Figure 30:
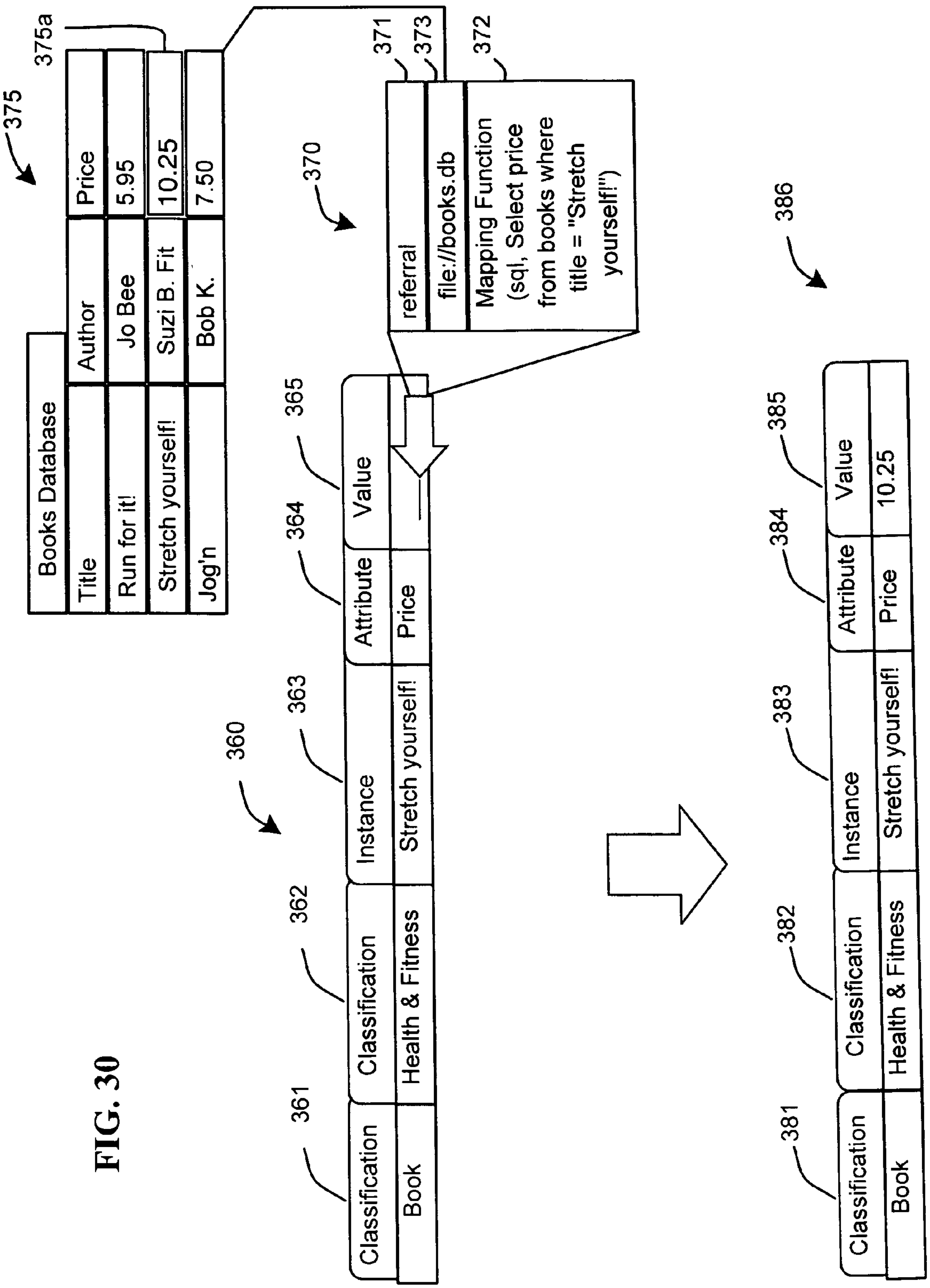

Referring now to FIG. 30, an external database 375 is used to create fragment data. The fragment 360 is a classified-instance-attribute-value. The value specified by a referral 370 to "file://books.db" 373, a database table. A mapping function 372 specifies a structured query language (SQL) command to retrieve data from the database 375. In the example, the SQL selects the price from a books table 375*a* where the title is "Stretch yourself". The resultant fragment 386 has the value 385 filled with the data retrieved from the database. The fragment expresses that the Health and Fitness book called "Stretch yourself" has a price of 10.25.

The external data mapping functions shown included the mapping of relational or flat tabular data onto fragments. This process can work in the reverse direction to allow the storage of composed objects into one or more relational databases. Since composed objects may not have singular structure, a common structural specification can be searched via the fragment database 24, and search module 22. Customized properties can be stored as well.

The examples above show how a variety of external data sources can be used to fill the contents of fragments 94 contained within a fragment database 24. The use of external data to fill the contents 102 of fragments allows fragments to work in conjunction with other forms of data such as relational databases 221, text files 250, and tagged documents 225 (FIG. 27).

A composed, information object 93 is a flexible and dynamic representation of information that is assembled on demand from fragments 94 and primitives. Almost any aspect of an object (i.e., a physical, virtual or electronic object) can be modified and customized on an instance to instance basis. This differs from conventional object-oriented software objects, and this is a powerful difference. The real world is full of cases where information is partially specified or attributes of one category do not apply to all members of a category. The example instance of a health and fitness book 230 has the attribute 'borrower'. Other books may not have this attribute at all, yet they are still considered as instances of books. Then, the composed information object has this distinct feature that frees the user from the constraints of standard programmed objects that have strict pre-defined data structures. The use of primitive binding specifications 103*a* can regulate the openness and regularity of composed information objects. For example, the common assumption that a subclass inherits its superclass's attributes can be enabled via the use of the "require" binding mode 106*a*, which would require that a primitive, such as an instance, bind to an attribute, for example. A classification hierarchy can limit inheritance by denying additional classifications to be bound to particular classification primitives. Classification inheritance searching can also be further regulated by selectively recognizing primitives by ownership or other properties.

In the present system, composed objects of a classification can have varied properties and behaviors. The fragment database 24 and search module 22 can identify commonalities and cache 44 this data 44*c*. Since composed objects do not have to conform to one pre-defined structure and still be of one classification is significant and different. Classifications can embody greater generality and flexibility, without complex subclassifications. Commonality can be sought but variability and therefore flexibility in defining information objects can be enhanced. Subclassifications and re-classifications can be accomplished on the data through search and transformation of the fragment data.

Figure 31:
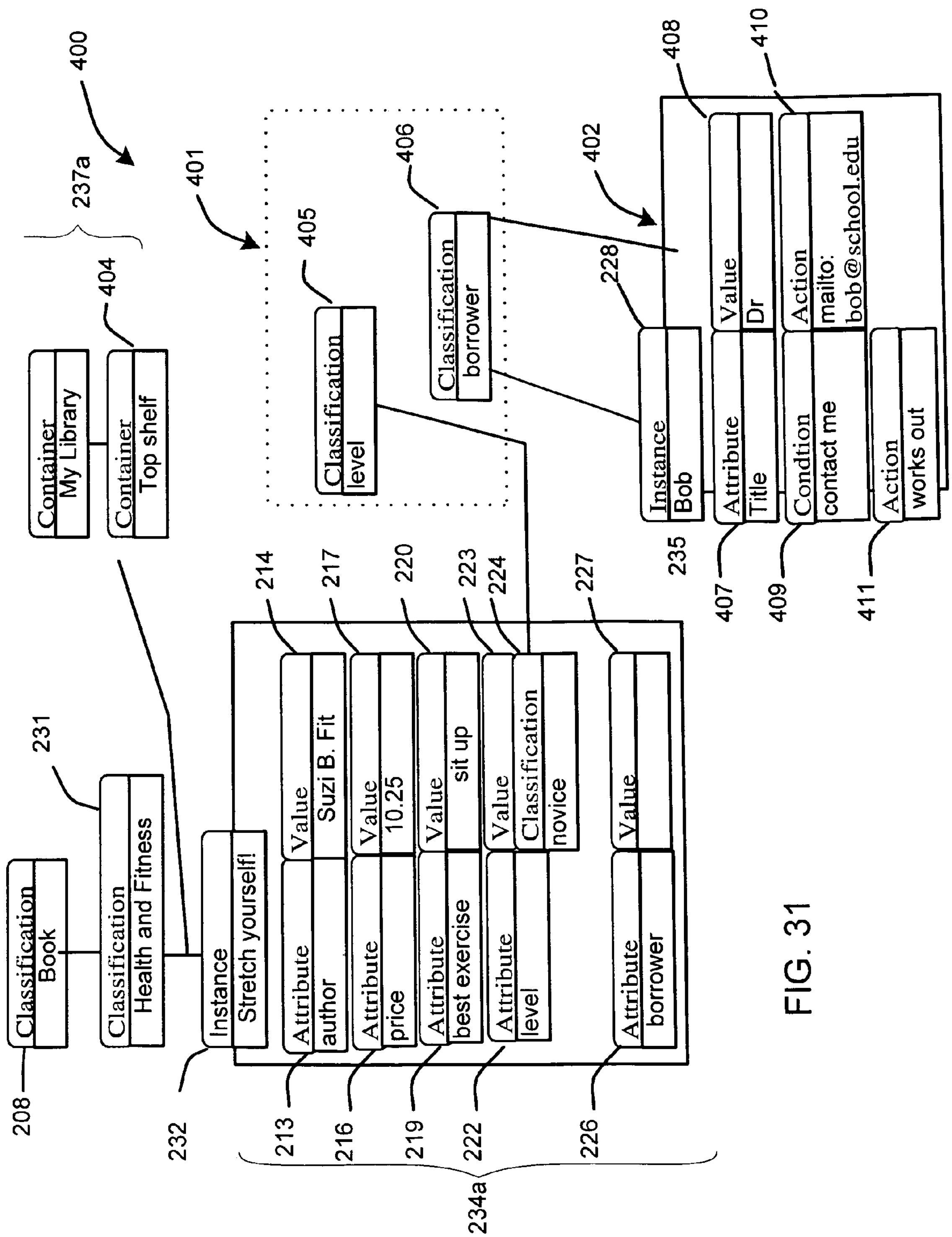

Referring now to FIG. 31, an elaboration of the composed objects in FIG. 25 is shown. Beyond the composed properties of the example fragments 200 of FIG. 24, the instance of a health and fitness book "Stretch yourself!" is also shown to be contained 237*a* by "My Library" and "Top shelf". Unlike classifications, the instance is not an instance of "Top shelf" or "My Library", but is contained in it. An inquiry 13 concerning 'where' an object is, can use the container hierarchy.

Elaborated information on the composed information object "Bob" 402 is also shown. The composed information object "Bob" 402 has an attribute 407 "Title" with assigned value 408 "Dr". The composed information object also has a condition 409 "contact me" with action value "mailto: bob@school.edu." i.e., a hyperlink. The condition is descriptive and can be searched or inspected. The action example shows that the composed information object responds to the request to 'contact me' with the invocation of a mail message. The second action "works out" 411 is an action primitive 101*f* without a condition and is descriptive of an activity, i.e. that "Bob works out" instead of a computational function. As mentioned previously, actions 101*f* are broadly defined to include computational or descriptive actions, in order to express virtual actions that a computer can perform as well as to express physical actions that are performed outside the realm of the computer.

A new classification 401 comprised of classifications 405 and 406 is provided. The classification "level" 405 is a super-classification of the classification "novice" 224. The classification "borrower" 406 is a classification of the instance "Bob" 228. These classifications are of note because they are derived from transformations, as previously described (FIGS. 22, 23). For the new classification "level" 405, the existence of a fragment with a primitive sequence 500 of {instance 101*b*, attribute 101*c*, value 101*d*, classification 101*a*} can be transformed 465 into a new classification sequence 501 where the contents 102 of the attribute can become the contents of a new super-classification.

Figure 32:
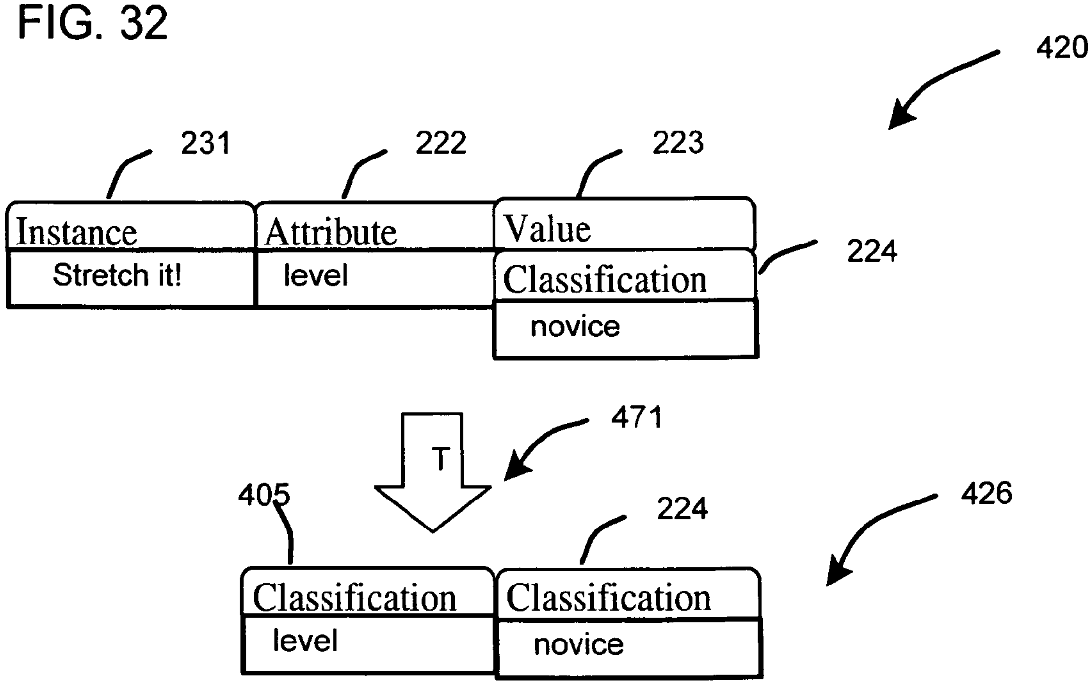
FIGS. 32–33 are diagrammatical views illustrating the use of transformation.

Referring now to FIG. 32, the transformation 500 applied to the example of FIG. 31 is shown. In descriptive terms, "the book Stretch it! is of novice level" is transformed into "novice is a kind of level". In structural fragment terms, the instance "Stretch it!" 231, attribute "level" 222, value 223 that refers to a classification "novice" 224, is transformed 471 into a classification fragment 426 where the new classification primitive "level" 405 is a super-classification of "novice" 224.

Figure 33:
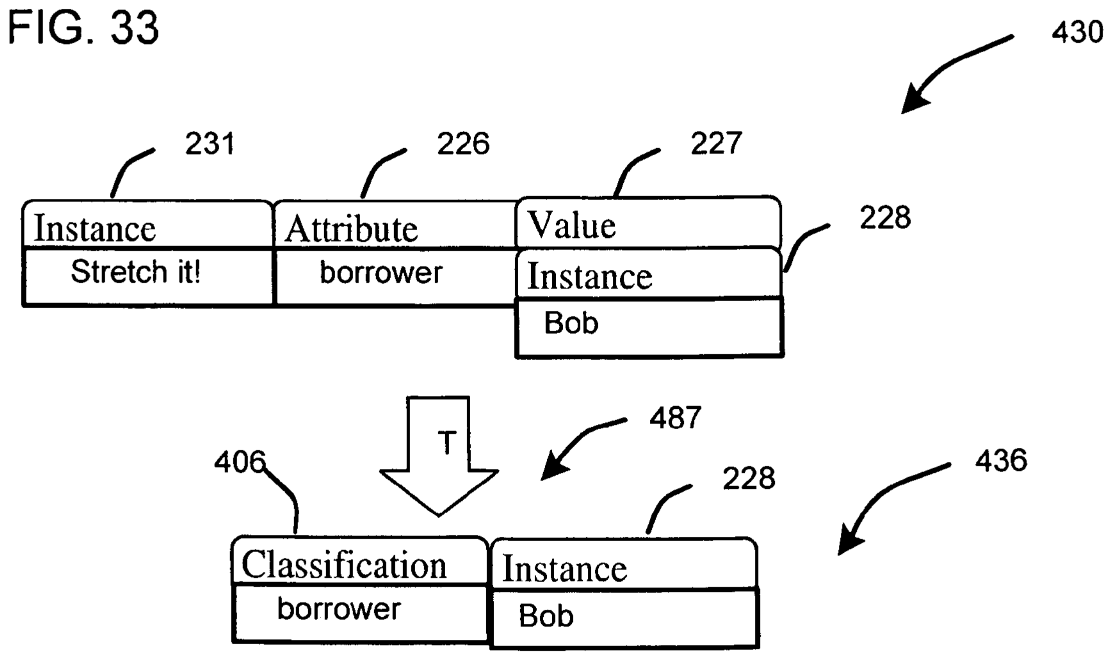

Referring now to FIGS. 31 and 33, a second transformation example is shown. The instance "Bob" 228 is classified by "borrower" 406 via a transformation, as described previously in FIG. 23. The existence of a fragment with a primitive sequence 504 of {instance 101*b*, attribute 101*c*, value 101*c*, instance 101*b*} can be transformed 487 into a new classified instance sequence 505 where the contents 102 of the attribute becomes the contents of a new classification. FIG. 33 shows the transformation 504 applied to the example. In descriptive terms, "Bob is the borrower of the book 'Stretch it!'" is transformed into "Bob is an instance of a borrower". In structural fragment terms, the instance "Stretch it!" 231, attribute "borrower" 226, value 227 that refers to the instance "Bob" 228 is transformed 487 into the classified instance fragment 436 where the instance "Bob" 228 is classified by a new classification primitive "borrower" 406.

A transformation can be used to loosen information structure represented by primitives and fragments. Transformations can be performed in the event that the data within the fragment database 24 is expressed in a particular way that does not yield any searchable structure. By unloosening the fragment data the transformation produces new generalized structures, in this case, that can be more useful for searching.

Figure 34:
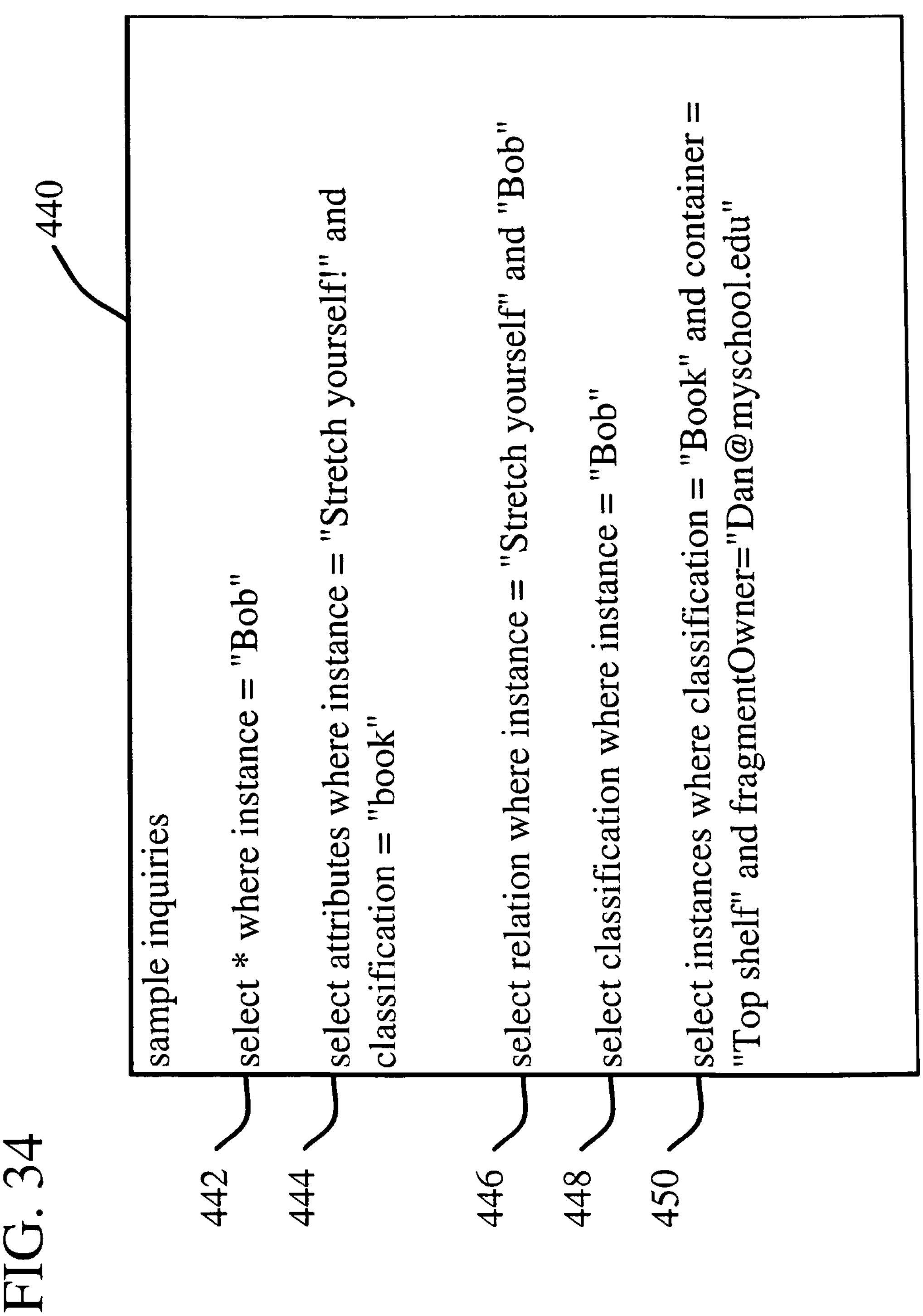
FIG. 34 is a diagrammatical view of fragment database queries.

Referring now to FIG. 34, examples of fragment database inquiries 440 are shown. The fragment database inquiries 440 are shown in a modified SQL (structured query language) applied not to a relational database, but to the fragment database 24 and search process 22. SQL search constraints are modified to operate with the concept of fragments and primitives. In this example, instead of using tables as in conventional SQL, primitives, fragments and composed information objects are used. The first inquiry 442 is a selection of all information about the instance primitive named "Bob." Using the fragment data in the example, FIG. 31, the inquiry would search for the instance primitive "Bob" 228 and composed the object 402, including the attribute "Title" 407 and value "Dr" 408, the condition "contact me" 409 and its action 410, and the action "works out" 411. A classification "borrower" for the instance "Bob" can be formed, via the previously described transformation (FIG. 33). The relation of the instance "Bob" to the instance "Stretch yourself!" can be searched via the fragment 207 (FIG. 24) where the attribute "borrower" 226 has as its value the instance "Bob" 228.

In the second example 444, is a request for all attribute primitives for the instance named "Stretch yourself!" and where the instance classification is "Book". Using the fragment data in the example, FIG. 31, the inquiry would search for an instance of the specified classification. If found, the search would focus on creating the composed information object 234*a* for the instance primitive "Stretch yourself" 232, and return the attributes "author" 213, "price" 216, "best exercise" 219, "level" 222 and "borrower" 226.

In the third example 446, a connection between two instances "Stretch yourself!" and "Bob" are asked for. Using the fragment data in the example, FIG. 31, the inquiry would search for the instance "Bob" 228 and the instance "Stretch yourself!" 232. A connection between the two instances would then be searched for. The composed information object for the book "Stretch yourself!" 234*a* yields a connection between the two instances. "Bob" 228 is found to be the "borrower" 226 of "Stretch yourself!" 232.

In the fourth example 448, the classifications for the instance "Bob" is requested. Using the fragment data in the example, FIG. 31, the inquiry would search for the instance "Bob" 228 and then search for its classifications. In this example, the classification "borrower" is produced via a transformation (FIG. 33). If this transformation is not performed prior to the search, this would be one avenue to pursue 74*b* during the search 60, FIG. 5B.

In the fifth example 450, instances are requested for classification "Book" and container "top shelf" and where the fragment owner is "dan@myschool.edu", a person specified by an Email address. In descriptive terms, this request is for books on the top shelf. Using the fragment data in the example, FIG. 31, the classification "Book" 208 does not have instances, but its sub-classification "Health and Fitness" 231 has an instance 232. This intermediate result is correlated with the search for instances contained under "Top shelf" 404. In the example, the book "Stretch yourself!" 232 is found.

These examples of inquiries in conjunction with the example fragment data show how fragment data can be formed and searched.

Figure 35:
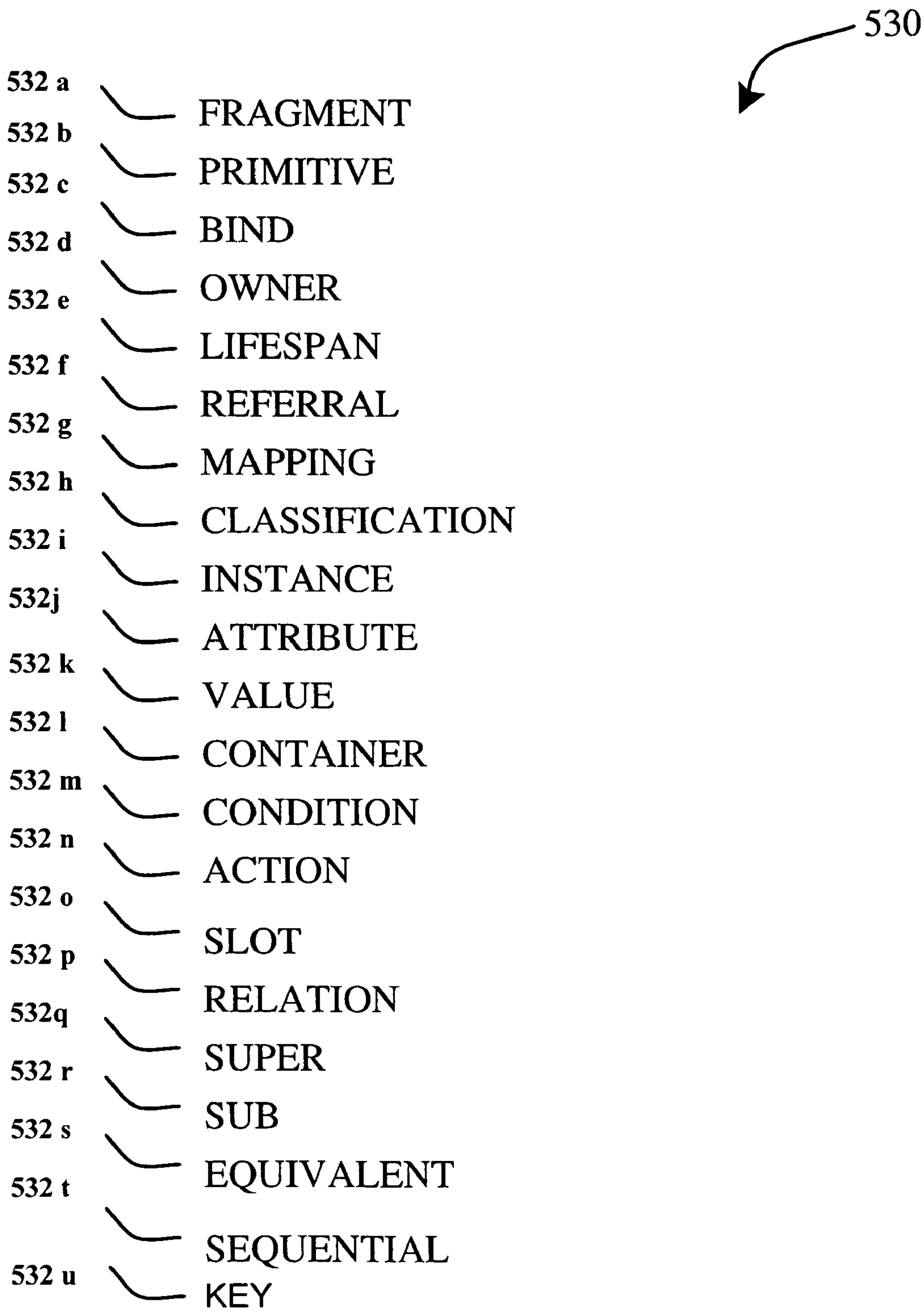

Referring now to FIG. 35, an example of a plain text representation 530 of fragment data is shown. The plain text representation allows fragment data to be embedded in documents such as mark-up type documents such as an HTML document or a plain text file. In the example, keywords 530 are shown. Each keyword or an abbreviation thereof can be used in a plain text representation of fragment and primitive data. The keywords can be abbreviated or substituted by symbols for compactness. The keyword "FRAGMENT" 532*a* can precede the specification of fragment data 130. The keyword "PRIMITIVE" 532*b* can precede the specification of a primitive 100, possibly within the scope of a fragment 130. The keyword "BIND" 532*c* can be used to precede the specification of binding permissions 103 for a fragment 130 or for an individual primitive 100, depending on the prior context. The keyword "OWNER" 532*d* can precede the specification of primitive ownership 104 of ownership or fragment ownership 122. The keyword "LIFESPAN" 532*e* can precede the specification of primitive lifespan 105 or fragment lifespan 123.

The keyword "REFERRAL" 532*f* can precede the specification of a referral information 102*b*. The keyword "MAPPING" 532*g* can precede the specification of a data mapping function 107*b*. The keywords "CLASSIFICATION" 532*h*, "INSTANCE" 532*i*, "ATTRIBUTE" 532*j*, "VALUE" 532*k*, "CONTAINER" 532*l*, "CONDITION" 532*m*, and "ACTION" 532*n* can follow the keyword "PRIMITIVE" 532*b* to specify the primitive types. The keyword "SLOT" 532 can specify a placeholder for unfilled and to-be-filled data. The keyword "RELATION" 532*p* can precede the specification of a binding relation 106*d* within a binding. The keywords "SUPER" 532*g* and "SUB" 532*r* can partially specify the binding relation 106*d* between two primitives, such as between two classification primitives 101*a* where one classification is superordinate and the other is subordinate. The keyword "EQUIVALENT" 532*s* can specify the type of relation for the primitive-type Value binding. The keyword "SEQUENTIAL" 532*t* can specify the fragment is to be interpreted as a sequence of implicitly bound fragments. The keyword "KEY" 532*u* can specify one or more primitive or fragment fields for inclusion in a key used to determine primitive uniqueness or similarity. For example, primitive type, content and owner can be used to designate uniqueness. The key can be used to regulate identity binding (described in FIGS. 18–20) and to establish name spaces.

Figure 36:
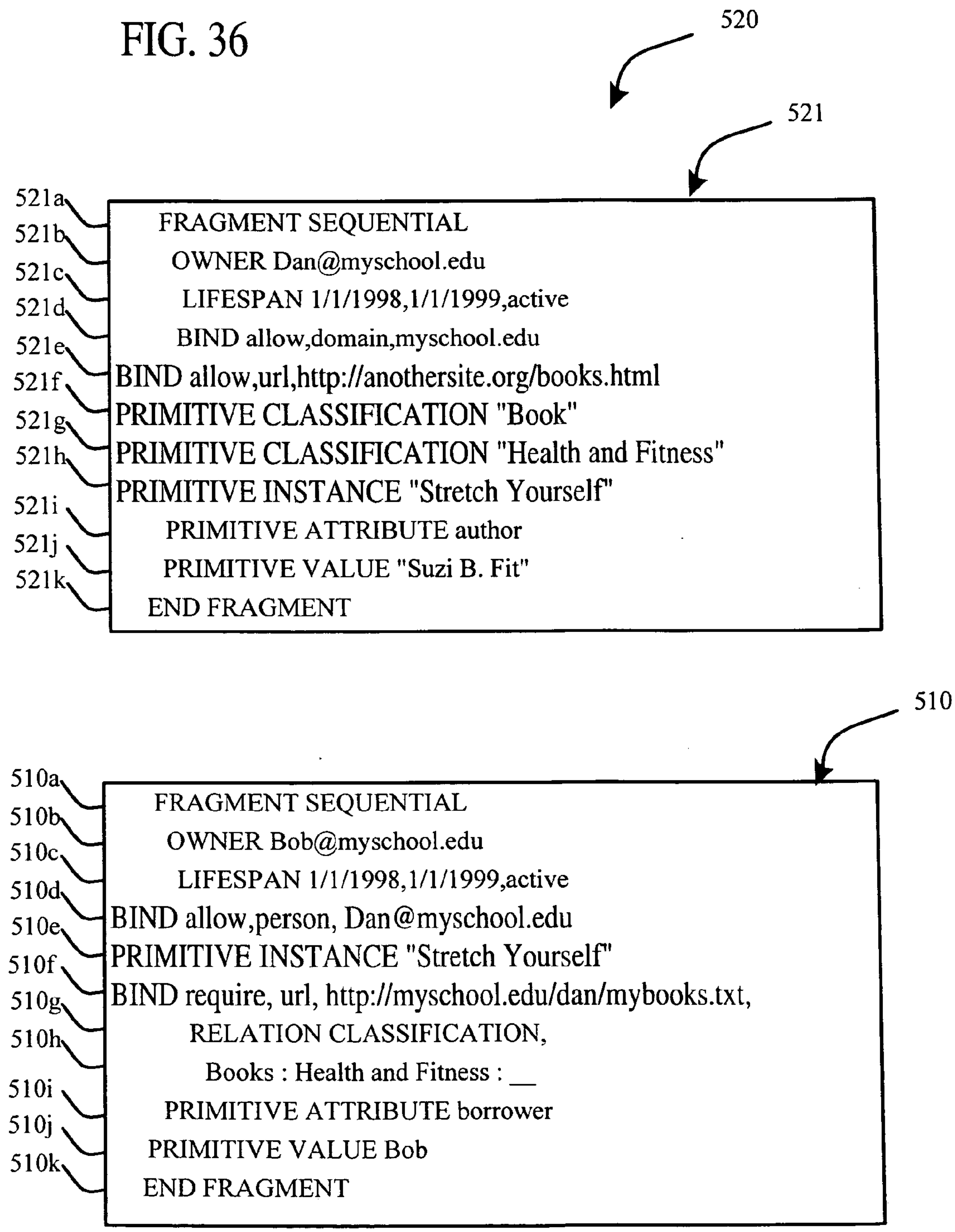

Referring now to FIG. 36, an example of a plain text representation 520 is shown. A fragment in the example 520 is divided into 2 files 521 and 510, which can reside on different computers. The first fragment 521 specifies its fragment owner 122 as "Dan@myschool.edu" 521*b*, its fragment lifespan 123 as starting on Jan. 1, 1998 and ending on Jan. 1, 1999, and its current state as "active 521*c*. The binding specifications 521*d* and 521*e* pertain to the fragment and not to an individual primitive, because it is specified within the FRAGMENT 521*a* context and not under a PRIMITIVE context. The first binding 521*d* "allows" binding to fragments in the network domain "myschool.edu". The second binding 521*e* "allows" binding to data contained in the url "http://anothersite.org/books.html". The fragment then specifies 5 primitives. Each primitive is specified in sequence and is bound implicitly to each adjacent primitive, indicated by the "SEQUENTIAL" specification 521*a*. The primitives descriptively state that "Stretch Yourself! is a health and fitness book whose author is Suzi B. Fit". This is specified by the classification primitive "Book" 521*f*, the classification primitive "Health and Fitness" 521*g*, the instance primitive "Stretch yourself" 521*h*, the attribute primitive "author" 521*i*, and the value "Suzi B. Fit" 521*j*. This fragment corresponds to a composite of the fragments 201, 202 and 203 from the prior example, FIG. 24.

A second plain text representation 510 is shown to indicate how two fragments stored separately can relate to each other. The fragment 510 descriptively states that "Stretch Yourself! was borrowed by Bob". The second fragment 510 is owned 122 by "Bob@myschool.edu" 510*b* and has a lifespan 123 from "Jan. 1, 1998" to "Jan. 1, 1999" and is active 510*c*. A fragment binding specification 510*d* "allows" binding of any of the primitives within the fragment to the person "Dan@myschool.edu." The fragment has a primitive instance "Stretch Yourself" 510*e*. The primitive 510*e* has a binding specification 510*f* to "require" binding to a classification primitive at the url "http://myschool.edu/dan/mybooks.txt". The binding further specifies a binding point below the classification hierarchy "Book" and "Health and Fitness" 510*h*, indicated in this example by the underscore "_". The instance primitive "Stretch Yourself" 510*e* is followed by the attribute primitive "borrower" 510*i* and value primitive "Bob" 510*j*. The fragment 510 corresponds to the fragment 207 from the prior example, FIG. 24.

The two fragments 521 and 510 can be assembled and form part of the composite information object as described previously and as shown in FIG. 31.

Figure 37:
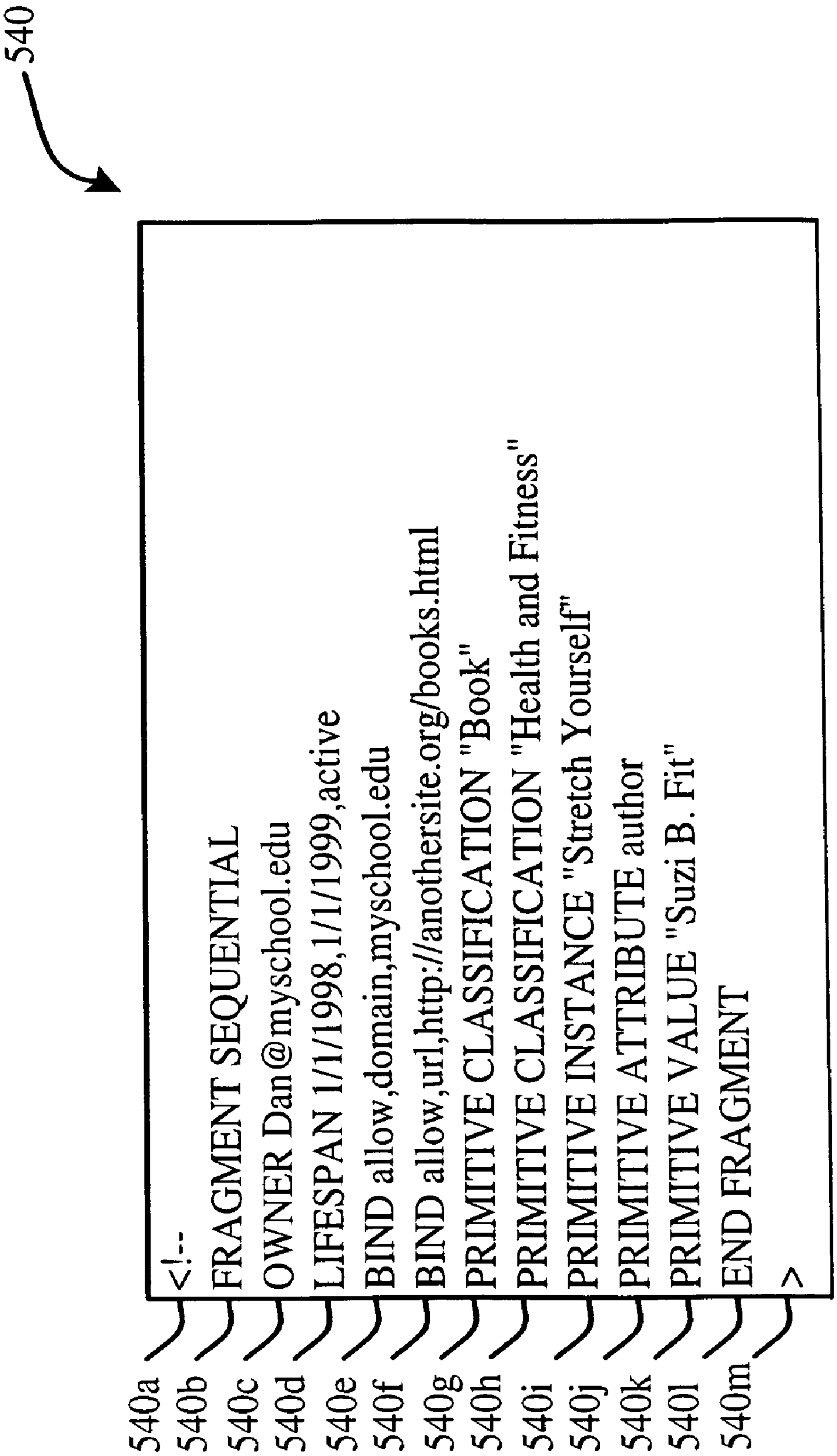

Referring now to FIG. 37, a second example 540 of a representation of fragment data is shown. The plain text fragment of FIG. 36 is now shown as an HTML comment 540. The tagged comment is the simplest way to embed fragment data into a markup document.

Referring now to FIG. 38, a third example 550 of a representation of fragment data is shown. The plain text fragment is expressed in a markup format 550. The keywords used within the plain text representation are used as tags. Embedded and nested tags 550*a*–550*l* particular to the fragment.

Figure 39:
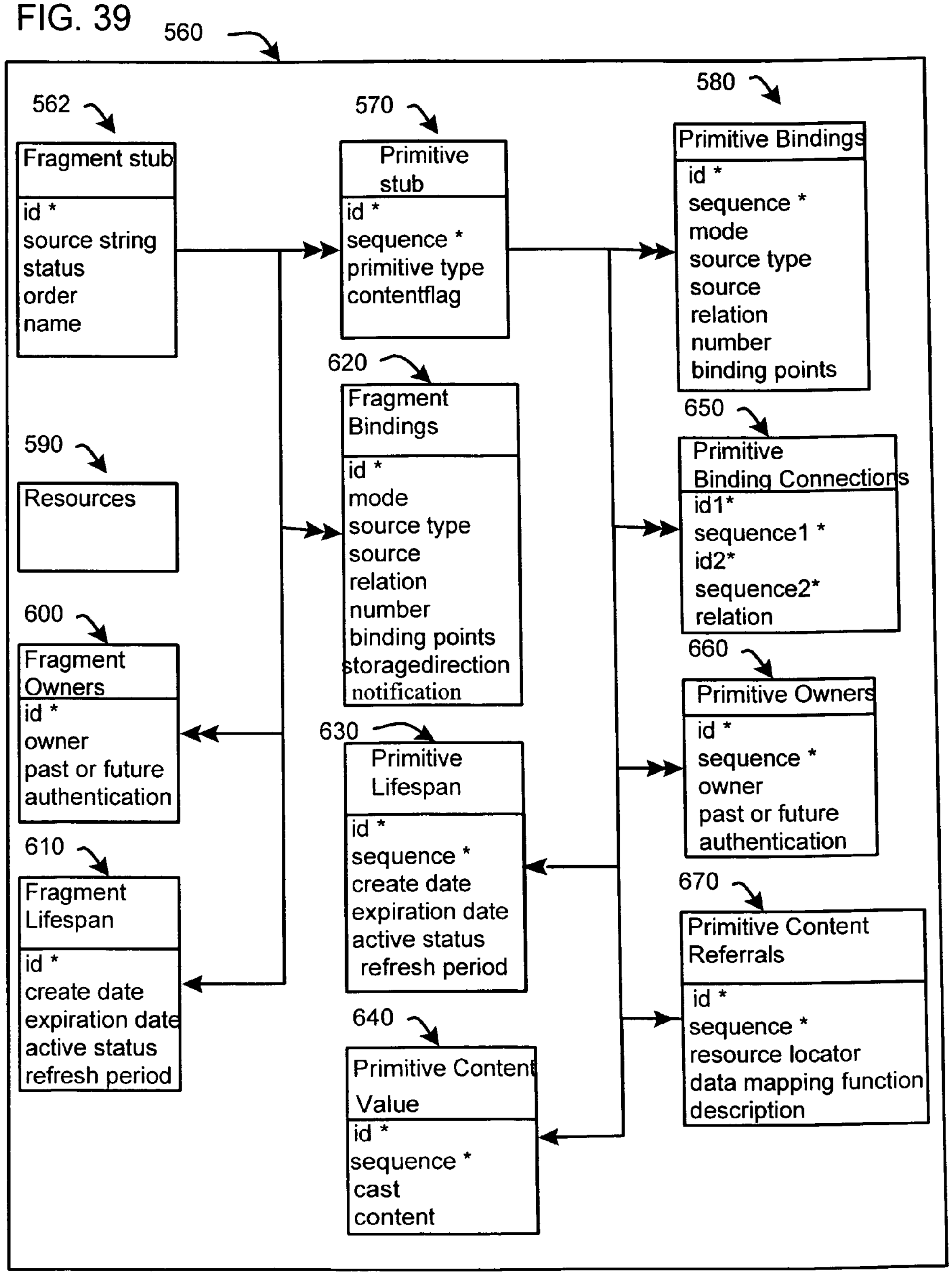
FIG. 39 is a tabular representation of fragment data represented in a relational, tabular form for searching.

Referring now to FIG. 39, a tabular representation 560 of the data to be stored is shown. The fragment data can be represented in a relational, tabular form for searching. For example, a fragment stub table 562 stores a record for each fragment and assigns an internal id. The resources table stores records of where each fragment was originated, as well as resource references within the fragment data. Each primitive within the fragment is recorded in the primitive stub table 570 with its sequence within the fragment. Fragment owners are recorded in the fragment owners table 600. The fragment lifespan is recorded in table 610. General bindings at the fragment level are recorded in table 620. Each primitive's bindings are stored in table 580, as described in FIG. 10. Derived connections between primitives are stored in table 650. Ownership of each primitive, if available, are stored in table 660, as described in FIG. 9. Based upon whether the primitive content is local or referred, the content is stored either in a content table 640 or a content referral table 670.

Figure 40:
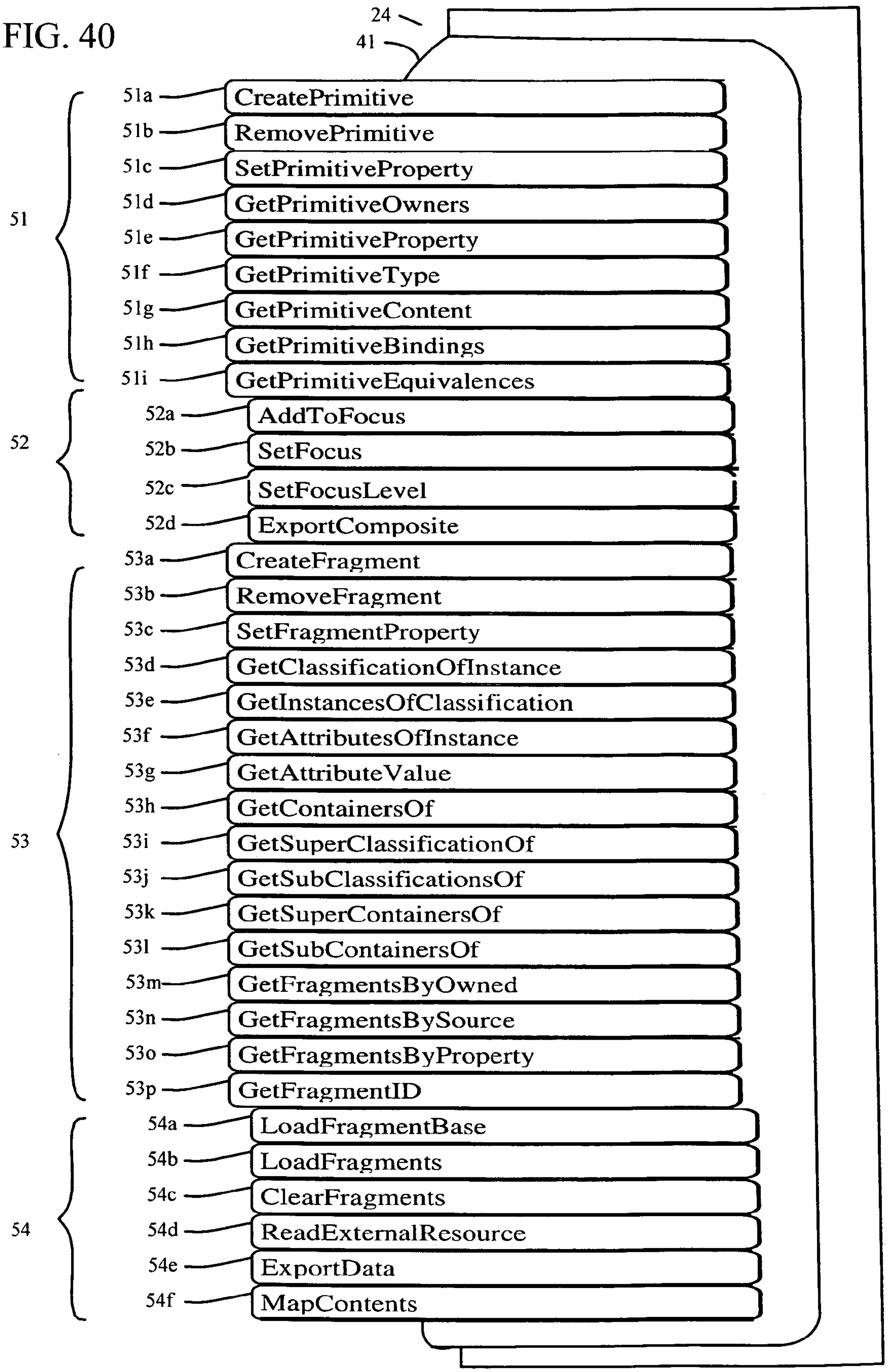
FIG. 40–42 are diagrams of exposed methods for the fragment database inquiry and modification module, transformation methods and primitive assembly.

Referring now to FIG. 40, an example schematic of exposed methods for the fragment database 24 inquiry and modification module 41 is shown. The exposed methods are grouped generally into primitive-handling functions 51, composite information object functions 52, fragment-handling functions 53 and database utility functions 54.

Primitive-handling functions 51 include a method to add a primitive to the fragment database 51*a* based on supplied data, a method to remove a primitive 51*b* within the fragment database, a method to set individual properties of a primitive 51*c*, a method to get the owners of a primitive 51*d*, a method to get a particular property of a primitive 51*e*, a method to get a primitive's type 51*f*, a method to get a primitive's contents 51*g*, a method to get a primitives bindings 51*h*, a method to get equivalent primitives 51*i*.

Composite information objects are a focused, i.e. an identified, subset of the primitives within the fragment database 24. Composite handling functions include a method to add a primitive to the focused set 52*a*, a method to set the focus to a previously defined set 52*b*, a method to assign a numeric or named level to focused primitives 52*c*, and to export the composite object 52*d*.

Fragment handling functions 53*a* include a method to create a new fragment 53*a*, a method to remove an existing fragment from the fragment base 53*b*, a method to set a property of a fragment 53*c*, a method to get the classifications of an instance as a fragment 53*d*, a method to get the attributes of an instance 53*d*, a method to get attribute-value fragments 53*g*, a method to get container hierarchies as a fragment 53*h*, a method to get the super-ordinate 53*i* or subordinate 53*j* classifications of a primitive as a fragment, a method to get the super-ordinate 53*k* subordinate 531 containers of a container, a method to get the fragment by owner 53*m*, by originating source 53*n*, or by a property 53*o*. A method for getting a fragment's internal identifier 53*p* is included.

Database utility functions include a method to load a dataset into the fragment base 54*a*, a method to load fragments into the fragment base 54*b*, a method to clear fragments from the fragment base 54*c*, a method to read external resources 54*d*, a method to export data from the fragment base 54*e*, and a method to map contents as specified in a content referral 102*b* (FIG. 11) 54*f*.

Figure 41:
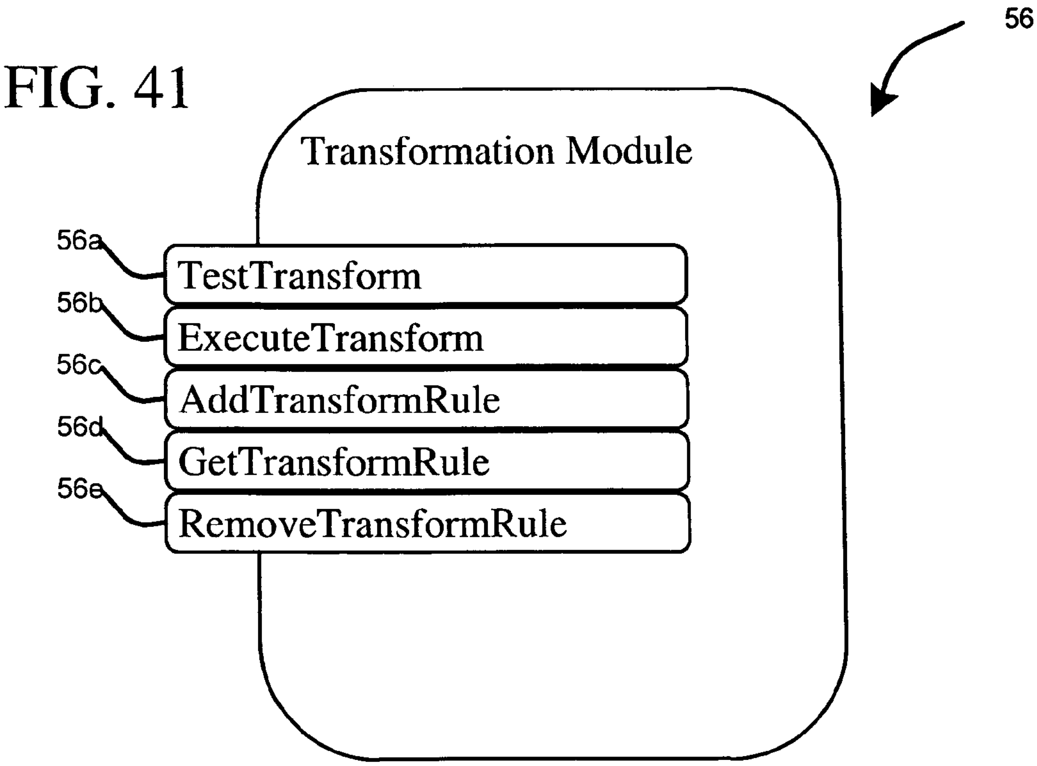

Referring now to FIG. 41, methods relating to fragment transformations are shown. A transformation handling process 56 includes a method to test if a transformation rule can be applied 56*a*, a method to execute a transformation rule 56*b*, a method to add a new transformation rule 56*c*, a method to retrieve an existing transformation rule 56*d*, and a method to remove an existing transformation rule 56*e*.

Figure 42:
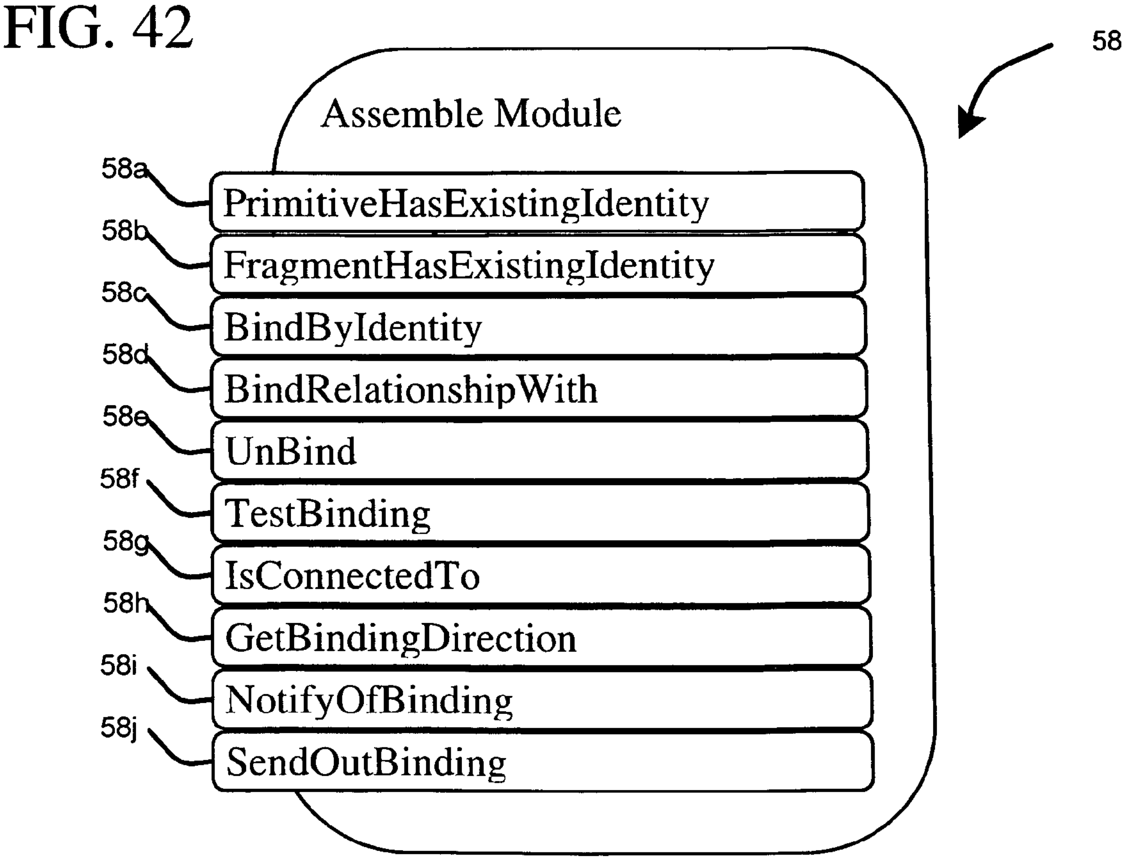

Referring now to FIG. 42, methods relating to the assembly of primitives is shown. An assembly module 58 includes a method to test if a primitive has an identical primitive 58*a*, a method to test if a fragment can match with another identical fragment 58*b*, a method to assemble by identity 58*c*, a method to assemble by explicit relationship 58*d*, a method to unbind two primitives 58*e*, a method to test if a binding can be performed 58*f*, and a method to test if two primitives are connected 58*g*.

An example composite information object 93 was described in FIG. 26 and delineated by example in FIG. 31. The formation of a composite information object in response to an inquiry, such as those shown in FIG. 34 is provided through a selective identification of primitives.

Figure 43:
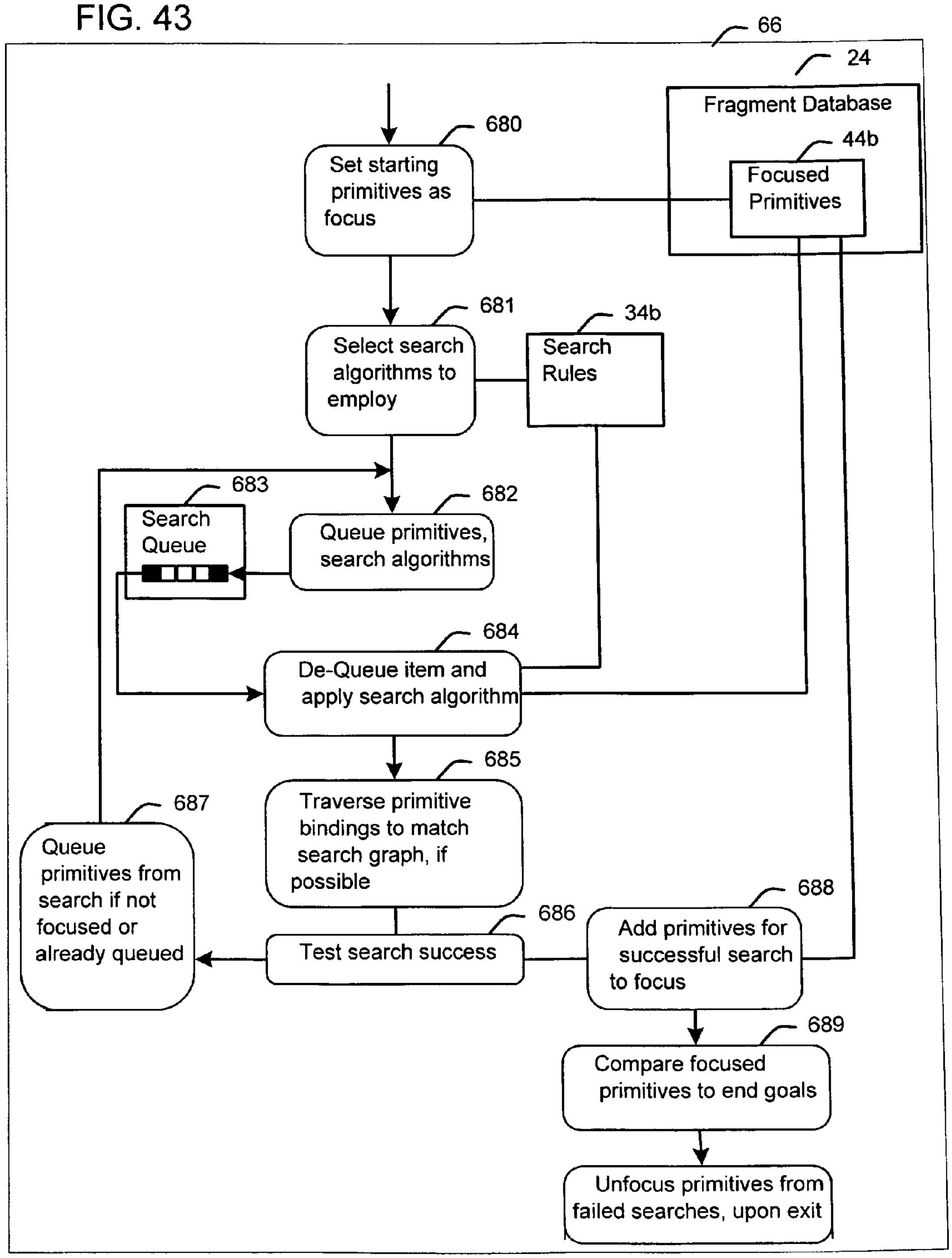
FIG. 43 is a flow chart of a fragment assembly process.

Referring now to FIG. 43, a process flow for identifying composite information objects 93 (FIG. 7) includes the compose and test process 66 of the search process 60 (FIG. 5). Composing an information object is based on what is needed to answer an inquiry. If an inquiry is, for example, about an instance's classification, but not about its attributes, then only particular aspects of an instance need to be composed. Composition uses a focused set of primitives 44*b* (FIG. 4) within a fragment database 24. The starting set of primitives can be obtained by a cursory search, such as for a primitive with a particular content-name.

Search algorithms are selected 681 from an available set 34*b* based upon the inquiry and the type of primitives in the focused set. All starting primitives are queued into a search queue, a first in first out (FIFO) structure 683. Each queued primitive is accompanied by the algorithms to use and the search depth. Each item is removed from the queue and search algorithms are applied. Search algorithms are based on the inquiry. Search and composition algorithms include classification hierarchy searching, classified-instance searching, instance-attribution searching, primitive equivalence searching, contained-instance searching, container hierarchy searching, transform pattern searching, instance-action searching, and condition-action searching.

The mentioned searches can be reduced to search graphs, which specify by starting primitive-types, valid connections to primitive-types and end goal primitives. To start at a primitive of the specified type, and be able to apply the general connections within the graph to the fragment base and arrive at the end primitive, is to satisfy the goal of the search graph. The 'product' of the search using the graph, is to 'focus', i.e. identify, the primitives in the fragment database that match the characteristics of the search graph, such as the traversal of primitives by type.

Iterative applications of selected searches, as described by the search graphs, forms the composite objects within the answer set. The traversal success is tested 686. Unsuccessful traversals end in a non-end state. The ending primitive can be placed onto the queue with new algorithms 687. Primitives traversed during a successful traversal of a search graph are added to the set of focused primitives 688. The new focused set of primitives is compared to the end goals to determine if further searching is needed 689.

Figure 44:
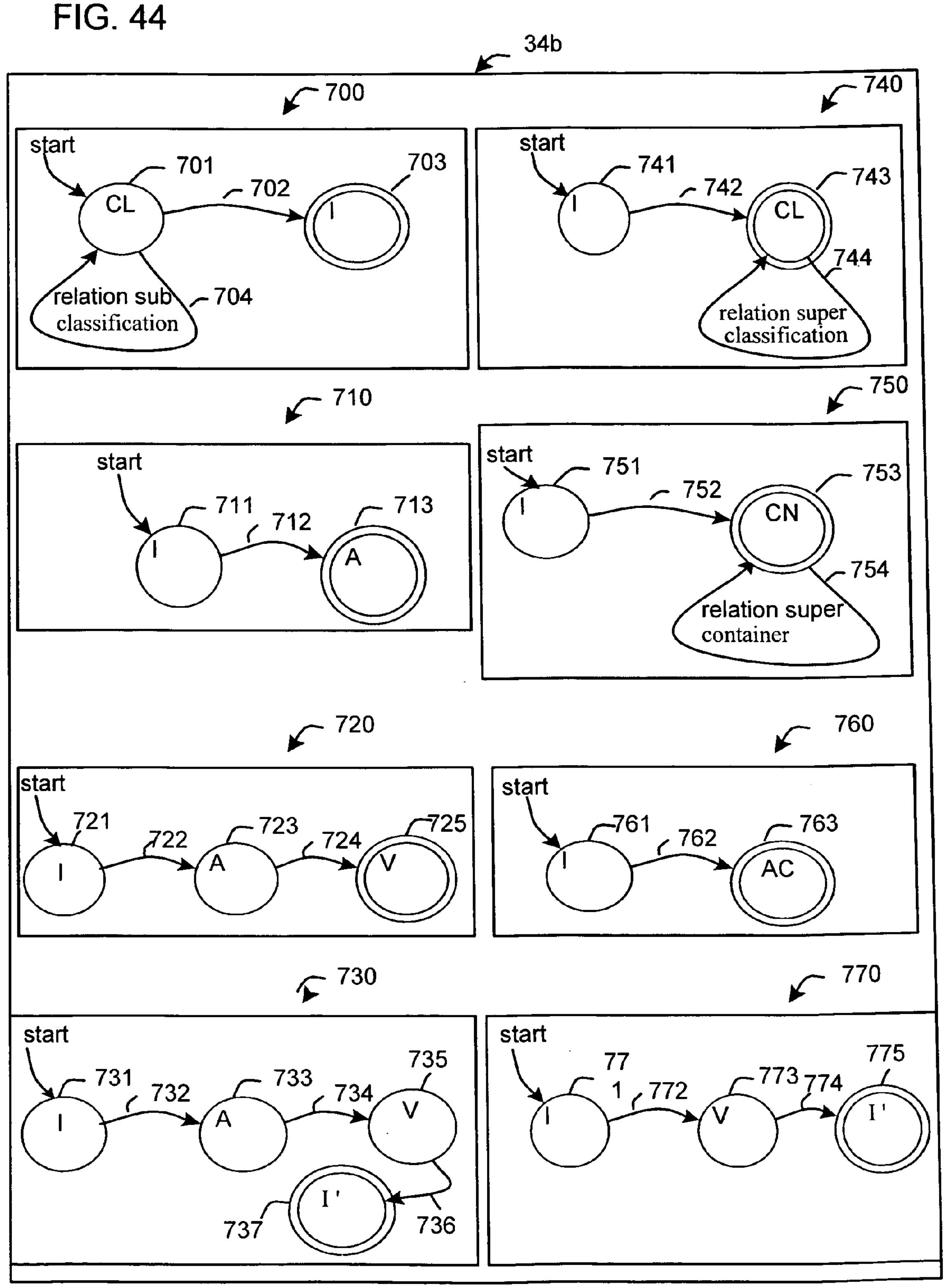
FIG. 44 is a depiction of a set of search algorithms expressed as traversal graphs used in the fragment assembly of FIG. 43.

Referring now to FIG. 44, a set of search algorithms 34*b* expressed as traversal graphs is shown. Each search graph has a start primitive and a successful ending primitive. The end state is tested when all allowable traversals are exhausted without revisiting a primitive. If the end state is the desired end state, then the search graph has been satisfied. For example, search graph 701 shows a search graph for a classified instance. The search graph starts with a classification primitive 701. The valid moves are either to descend a classification hierarchy via 704, or to move to an instance 703. Referring back to the example of FIG. 31, a successful search for an classified instance could start at the classification primitive "Book" 208 and move to its sub classification "Health and Fitness" 231, and then to the instance "Stretch yourself!" 232. At this point, there are no more allowed moves so the ending primitive is tested and found to be the desired ending primitive—an instance primitive. The classifications 208, 231 and the instance 232 are added to the set of focused primitives which ultimately will form the composite information object 93.

A second search graph 710 starts with an instance primitive and ends with an attribute primitive.

Figure 45:
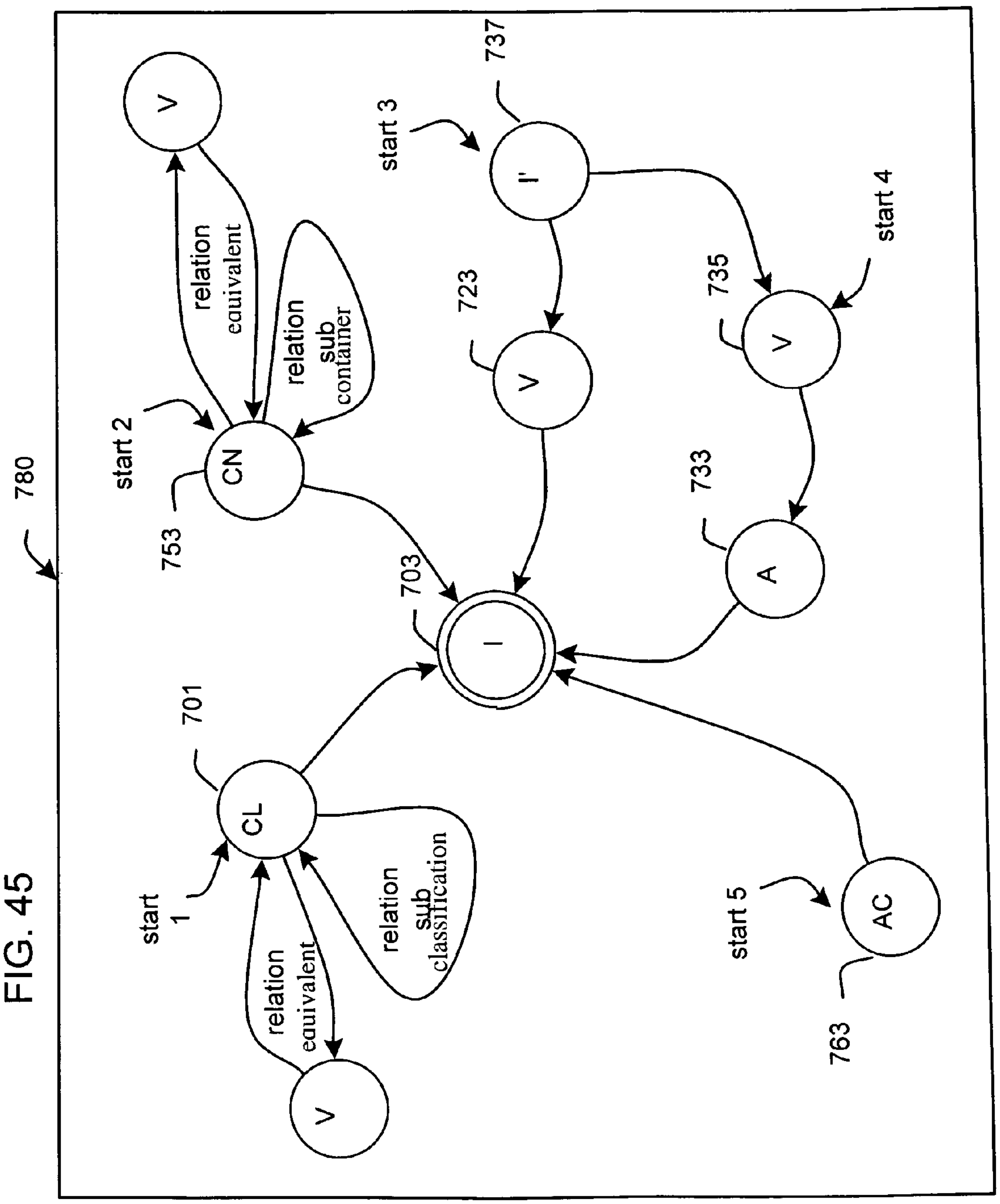
FIG. 45 is a depiction of a search graph that combines some of the search algorithms of FIG. 44.

Referring now to FIG. 45, a search graph that combines some of the search graphs of FIG. 44 is shown. Multiple starting points are shown. All valid traversals of the search graph end on the same instance primitive 703. Completion of the multiple searches can be used to verify that the composite object model described previously in FIG. 26 and exemplified in FIG. 31 is satisfied by a particular set of data within a fragment base 22. This search graph therefore represents a test for an overall search goal for a composite information object.

Figure 46:
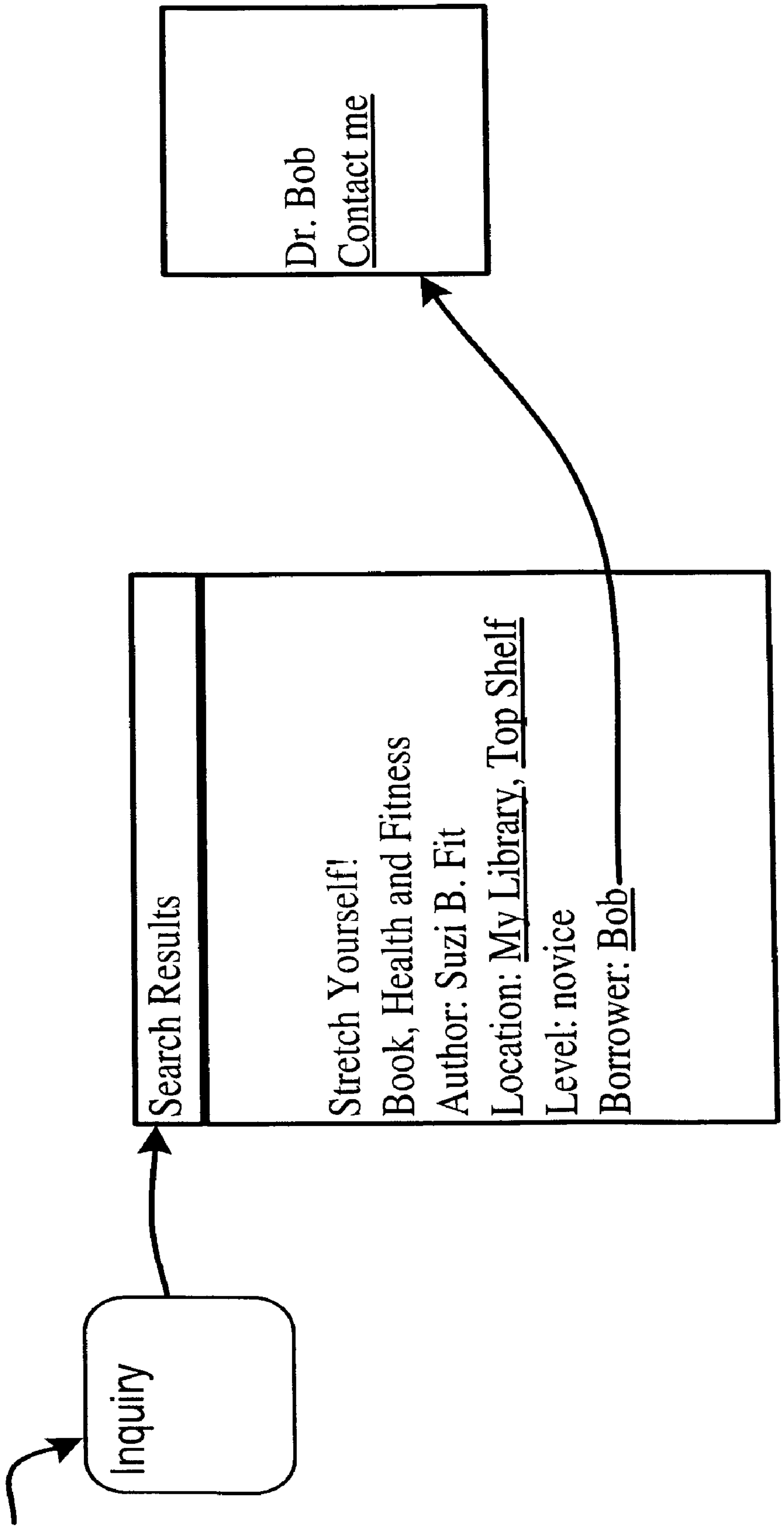
FIG. 46 is a depiction of a search results from a search inquiry.

Referring now to FIG. 46, a sample response to query 444 (FIG. 34), in which all information is requested about the book, "Stretch Yourself!" is shown. The response is shown as a page containing the information found about the book, including the attributes "author", "location", "level" and "borrower", and their values. Some values are underlined, indicating that there is more information pertaining to that property. For example, selecting the value "Bob", which is an instance, can display a subsequent page of information on "Bob". The described search engine and fragment database may be used by programs, including agents, instead of direct user inquiry.

Figure 47:
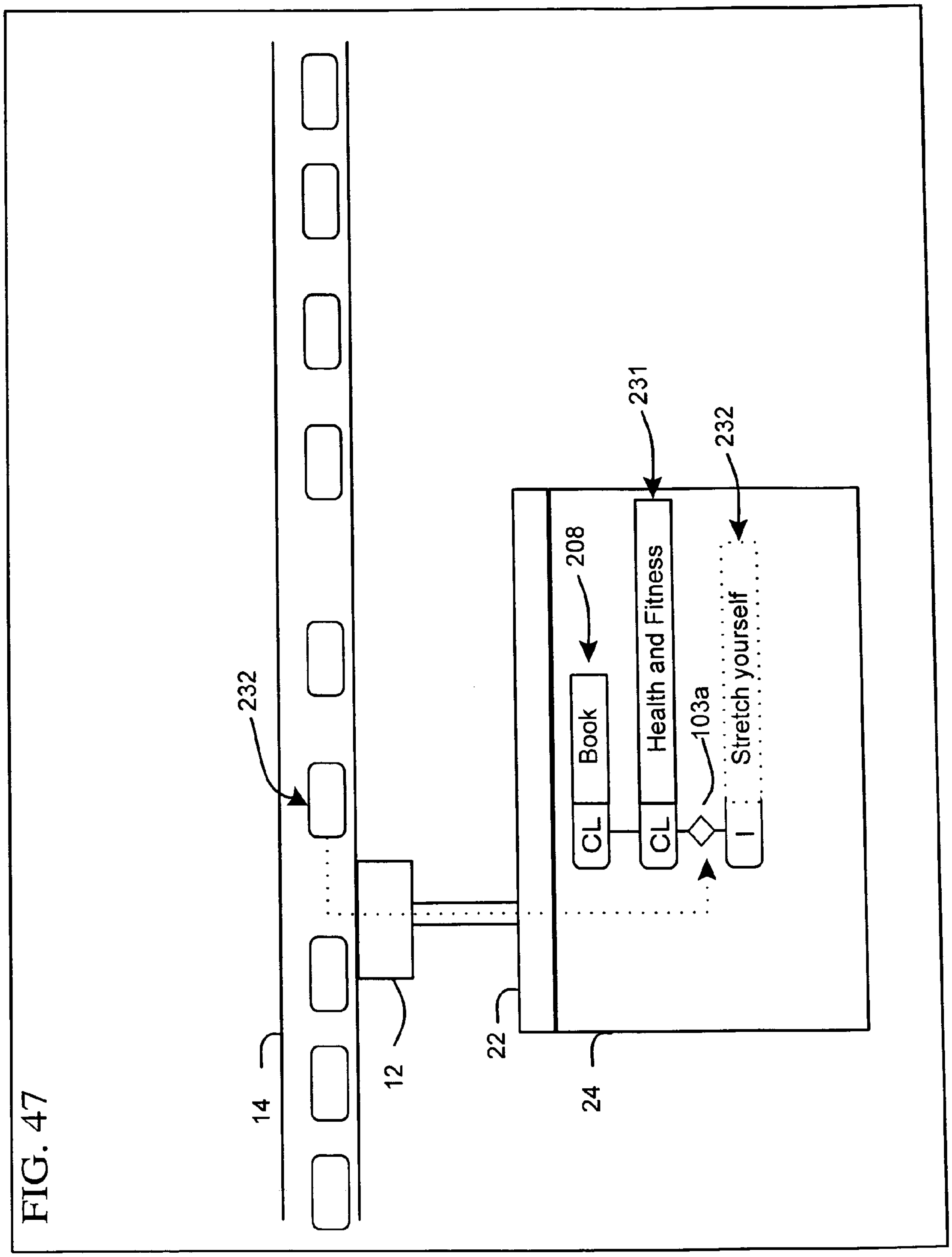
FIG. 47 is a block diagram of a client access to a data stream in a sense mode.

Referring now to FIG. 47, a client 12 has access to a data stream 14 of fragments 130. The client passes the fragments including fragment 232 into the search engine 22 and fragment database 24. The search process 22 in the sense mode, as described in FIGS. 3 and 6, attempt to bind data 14. In this example, as in the example of FIG. 31, the classification "Book" 208 with the sub-classification "Health and Fitness" 231 binds 103*a* with an incoming instance "Stretch Yourself!" 232.

Figure 48:
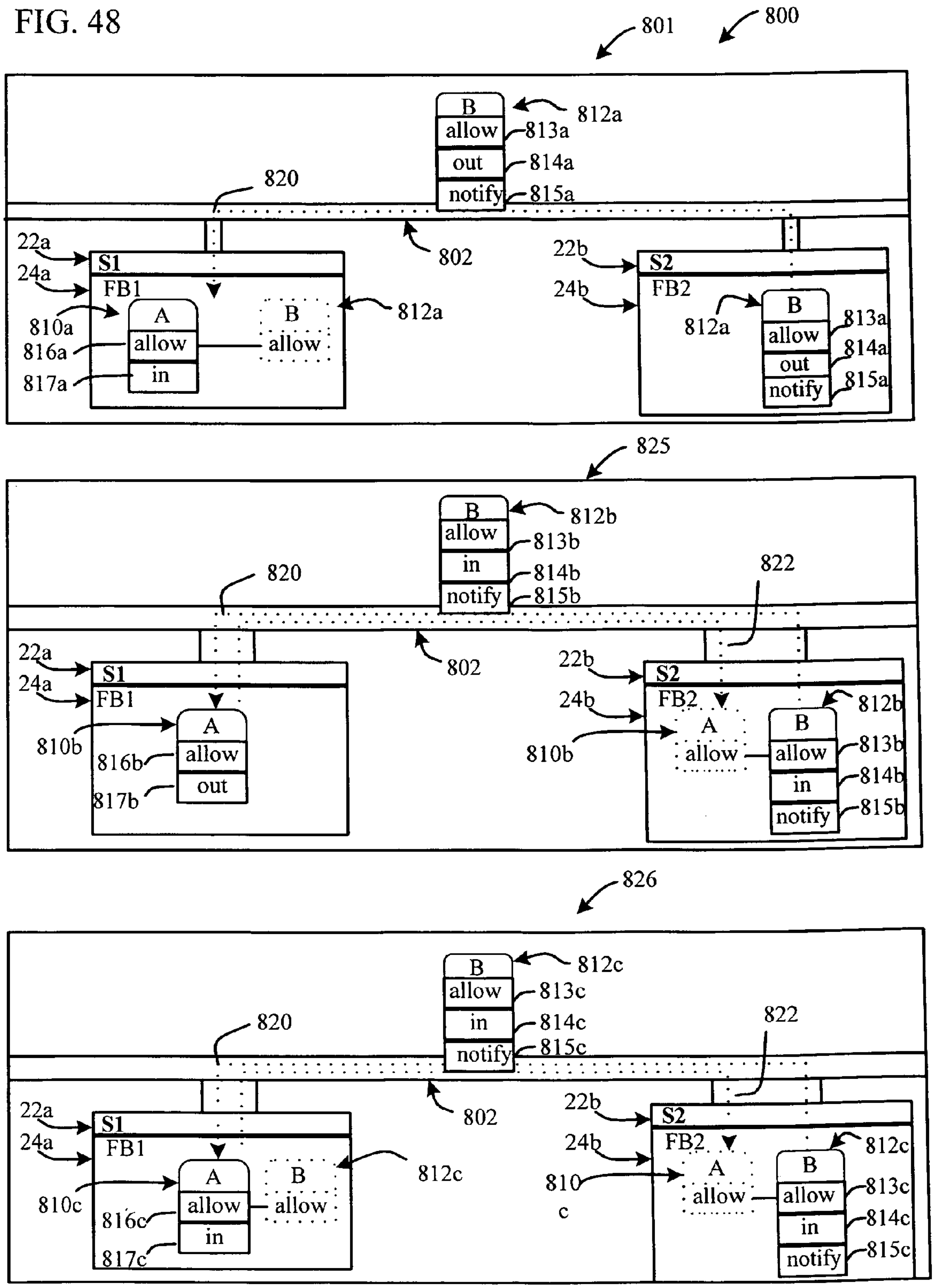
FIG. 48 is a diagram depicting three scenarios of primitive binding control.

Referring now to FIG. 48, three scenarios 800 of using primitive binding control is shown. The primitive binding specification 103*a* (FIG. 10) can specify a mode 106*a* to "Allow", "Deny", "Ask" or "Require" a binding. This control is further augmented by the specification of binding storage directionality 106*g* and notification 106*h*. In FIG. 48 the first scenario 801 shows two fragment bases 24*a* and 24*b* and their respective search process 22*a* and 22*b*. One fragment base 24*b* has sent out data containing a primitive "B" 812*a* through a network 802. The primitive "B" 812*a* specifies in its binding to "Allow" binding 813*a*, with direction "out" 814*a* and with notification 815*a*. Search process 22*a* detects the primitive "B" 812*a*, such as when operating in sense mode, as described previously in FIG. 3 and 6. The search process 22*a* requests its fragment base 24*a* to test for binding with the new data 812*a*. In the example, a primitive "A" 810*a*is found compatible for binding with the new data 812*a*. The binding direction specified by the new primitive "B" 812*a* is "out" and the binding direction specified by the primitive "A" 810*a* is "in" 817*a*, resulting in storage of the bound data in fragment base 24*a*, but not in the fragment base 24*b* that transmitted the data.

In the second scenario 825, the primitive "B" 812*b* sent from fragment base 24*b* has a binding direction set to "in"

814*b*, and the primitive "A" 810*b* in fragment base 24*a* has a binding direction "out" 817*b*. Fragment base 24*a* does not bind to the new data 812*b*, but instead, notifies 822 fragment base 24*b* of the possible binding with its primitive "A" 810*b*, as specified by the notification setting in the primitive "B" 812*b*. The binding between primitives "A" 810*b*and "B" 812*b* occurs not in the fragment base 24*a* but in the fragment base 24*b*.

In the third scenario 826, the primitive "B" 812*c* sent from fragment base 24*b* has a binding direction set to "in" 814*c* with notification 815*c*, and the primitive "A" 810*c* in the fragment base 24*a* has a binding direction set to "in" 817*c*. Both fragment bases 24*a* and 24*b* are changed internally. Fragment base 24*a* incorporates primitive "B" 812*c*, and notifies 822 fragment base 24*b* to bind with fragment "A" 810*c*.

A fourth scenario (not shown) in which both binding directions are "out" have no effect on either fragment base 24*a* or 24*b*.

The ability of fragments and their contained primitives to specify how they are to be bound to, and where this effect is to take place, allows for the fragment and primitive data to be distributed in an actively transmitted fashion such as a broadcasted stream of data, or in stored files, and when used, i.e. bound to, have the effect selectively take place where the data is being read and/or where the data came from.

The schema can be built into new web pages or existing web pages can be modified. One approach can have a client that has a agent that helps form information object statements and embeds then into HTML pages. There are several ways that this data can be put into web documents or on the web. One way would be as an embedded comment that would be invisible except to a search engine or something that searches for a particular comment with a header of a particular type. Another way would be that it could be in an XML format with a particular reader of that document applying that XML format to it.

A browser could have an agent that would be the client side part of the system. The agent would be designed to read fragments and primitives and splice them together to point to a resource or to give information in terms of a web page. The actual data need not be visible as text on the page. The agent could add information to data embedded into documents. Data could also be embedded into images as a way of highlighting regions within a two-dimensional or three-dimensional representation. Therefore, the actual source document does not have to change. To express some object fragment information about a page, a local process can store fragment data and reference a URL for the page. In this manner, the fragment data can be stored locally along with the reference to the URL.

There exists alternative implementation versions of the above schema. In one alternate implementation, the schema can be represented as actual firmware on an integrated circuit. The alternate implementation can have a search engine and fragment base. One example application could have the implementation in an appliance that can acquire information on how the appliance is used. For example, the appliance could be a telephone and the schema can acquire an object type model that can learn behavior and produce a profile of a user by building an object type database on favorite restaurants, etc.

OTHER EMBODIMENTS

It is to be understood that while the invention has been described in conjunction with the detailed description thereof, the foregoing description is intended to illustrate and not limit the scope of the invention, which is defined by the scope of the appended claims. Other aspects, advantages, and modifications are within the scope of the following claims.

What is claimed is:

1. A method of searching for information to construct an information object comprises:

querying a resource having information stored as bindable data elements with bindable data elements being structures that can be bound to each other in an additive manner, with binding being according to a binding specification that is implemented by binding rules that are specified in each of the bindable data elements; and returning as a result of querying the resource bindable data elements that can be combined together to construct the information object according to the binding rules.

2. The method of claim 1 wherein the bindable elements include primitive elements that represent a unit of information.

3. The method of claim 2 wherein bindable elements have type specification and content.

4. The method of claim 3 wherein bindable elements further use in addition to binding rules, elements' structure, content and source to determine binding between elements.

5. The method of claim 1 wherein the bindable elements include fragment elements that represent at least two combined units of information.

6. The method of claim 5 wherein the fragment that is comprised of bindable elements has binding relations defined in the fragment that defines the binding relationship between the bindable elements.

7. The method of claim 6 wherein the relationship between a fragment's bindable elements can be superordinate, subordinate, identity, or implicitly defined by the types of bound primitive elements.

8. The method of claim 5 wherein the fragment includes contents, ownership, lifespan and binding rules.

9. The method of claim 5 wherein the each element of the combined units is of any one of a classification, instance, attribute, value, condition, action or container type.

10. The method of claim 1 wherein the resource is a local database that organizes bindable elements as fragments.

11. The method of claim 1 wherein the resource is a networked computer system that has data stored as bindable data elements across the networked system.

12. The method of claim 11 wherein returning returns a second universal resource locator associated with an additive elements that can satisfy the query.

13. The method of claim 1 wherein the networked computer system is the Internet, and the resources are sites on the Internet that have data arranged as the bindable elements.

14. The method of claim 1 wherein returning results returns bindable elements that can satisfy the query.

15. The method of claim 1 wherein returning results returns a reference corresponding to a location associated with bindable data elements that can satisfy the query.

16. The method of claim 1 wherein returning returns a universal resource locator associated with bindable elements that can satisfy the query.

17. The method of claim 1 wherein the type specification of the bindable, primitive elements are classification, instance, attribute, assigned-value, condition, action or container.

18. The method of claim 1 wherein the binding specification for the bindable elements specify binding storage directionality that defines whether the binding is to be stored, where the binding primitive resides or where a bound-to primitive came from.

19. The method of claim 1 wherein the binding specification for the bindable elements includes a field that specifies ownership of the element, and the ownership of the element being implemented as part of the binding rule.

20. The method of claim 1 wherein the binding specification for the bindable elements specifies a life span with the lifespan of the element being implemented as part of the binding rule.

21. The method of claim 1 wherein the binding specification for the bindable elements have a mode and the mode can be allow, deny or ask permission to bind with other elements, with the mode being implemented as part of the binding rule.

22. The method of claim 1 wherein the binding specification for the bindable elements specify their source with the source being implemented as part of the binding rule.

23. The method of claim 1 wherein bindable elements have information on preferred and allowed number of bindings.

24. The method of claim 1 wherein binding notification controls what sources obtain the results of binding.

25. The method of claim 1 wherein the bindable data elements can bind with any other primitive, fragment, and/or information object according to the binding rules and general primitive type attributes.

26. The method of claim 1 wherein binding rules are specified in the bindable data elements.

27. A computer-based system comprising:

a search engine that produces a search query; and a fragment database that stores data fragments and/or primitives that may be used to satisfy the query, with data fragments comprised of at least two primitives that are bound together according to a binding specification that is implemented by binding rules specified in each of the fragments and/or primitives where fragments and/or primitives can be added to or modified within the fragment database to define a larger composite information object.

28. The computer system of claim 27 wherein the search engine is part of a server process and produces the query in response to a request for information issued by a client process.

29. The system of claim 28, wherein the server process further comprises:

an external data reader that translates retrieved resources into a format for storage in the fragment database, with the retrieved resources obtained from an external response to the query; and an inquiry and modification interface that interfaces the search engine to the fragment database, the inquiry and modification interface enables the search engine to search for additive elements in the fragment database.

30. The system of claim 29 wherein the inquiry and modification interface can enable requests to add, assemble, update, remove, or transform information in the fragment database.

31. The system of claim 27 wherein the search engine issues the query to retrieve additive elements from the fragment database.

32. The system of claim 27 wherein the search engine decodes the request and initializes a search state.

33. The system of claim 32 wherein the search state comprises:

search goals that are dependent on the search request;

search rules that regulate application of search algorithms and handling of error conditions; and search limits, which specify the extent of resources that can be expended for a search.

34. The system of claim 27 further comprising:

an evaluator interface that interfaces the search engine to the fragment database to determine whether the contents of the fragment database have satisfied the search request.

35. The system of claim 27 wherein binding rules are specified in the bindable data elements.

36. A computer based system comprising:

a fragment database, storing data fragments that are bindable together according to a binding specification that is implemented by binding rules specified in the fragments;

a sense process that reads data referred by a client process and tests the data to determine whether the data can be bound to existing data or produces new data within the fragment database according to the specified binding rules specified in the fragments and wherein the binding rules have a binding specification that includes whether the fragment allows, denies or asks permission to bind with another bindable data fragment to define a larger composite information object.

37. The system of claim 36 wherein the sense process sends a signal to the search process to sense data that a client is accessing.

38. The system of claim 37 wherein the client sends sensed data to a search process, along with instructions to cause the search process to incorporate the data by binding the new data to existing data or producing new data within a fragment database.

39. The system of claim 38 wherein the external data is native fragment data or is translated into such a form by the client.

40. The system of claim 38 wherein external data not natively formed as fragments or composed of primitives, and the existence of words, word phrases, tags, field values or other properties within the contents of the external data or its location are used by a resource parser along with particular instructions sent by the client to produce a referral to the data within the fragment database.

41. The system of claim 36 wherein binding rules are specified in the bindable data elements.

42. A method of transforming a fragment of a first form into a second, different fragment of a second form comprises:

applying a transformation function to the first fragment to produce the second, different fragment of a second form.

43. The method of claim 42 wherein the transformation function is a condition-action fragment, where the condition is that the first fragment is of a particular form specified by the condition, and the action is restructuring the first fragment into the second form.

44. The method of claim 42 wherein the first fragment form is of primitive type sequence instance-attribute-value-instance and the second fragment form is of classification-instance.

45. The method of claim 42 wherein transformation is used to loosen information structure represented by primitives and fragments to produce generalized structures for searching.

46. The method of claim 42 wherein the first fragment form is of primitive type sequence instance-attribute-value-classification and the second fragment form is of classification-subclassification.

47. A method of controlling which sources obtain results of binding bindable data elements comprises:

allowing, denying, or asking permission for bindable elements to bind with each other with binding being according to a binding specification that is implemented by binding rules specified in each of the respective elements;

storing the bound elements based on a directionality value according to the binding rules specified in the bound elements; and notifying owners of the bound elements based on notification settings according to the binding rules specified in the bound elements.

48. The method of claim 47 wherein binding directionality can be inward or outward.

49. The method of claim 47 wherein binding notification are matched in a complementary fashion.

50. A method of searching a resource for information to construct an information object comprises:

querying the resource that has information stored as individually, bindable data elements, the data elements binding in accordance with binding rules specified for and stored in the bindable data elements; and returning results from querying the resource to construct the information object through binding of the bindable data elements according to the binding rules.

51. The method of claim 50 wherein bindable, primitive elements are of type classification, instance, attribute, assigned-value, condition, action or container.

52. A method of constructing an interconnected collection of information elements comprises:

querying a resource having data elements where each element includes a binding rule that specifies a binding allowance;

evaluating binding allowances to determine how one of the data elements can connect to others of the data elements;

producing a connected collection of elements based in part on evaluating of the binding rule for the elements in each of the collection of connected elements; and returning the connected collection of elements.

53. The method of claim 52 wherein the binding allowance are allow, deny, or require asking permission to connect elements to each other.

54. The method of claim 52 wherein each element is specified as a classification, instance name, attribute, value, condition, action or container.

55. The method of claim 52 wherein an element's source or ownership is used as a criteria for connecting elements together.

56. The method of claim 52 wherein an element's lifespan which specifies the time period when the element is valid, is used as a criteria for connecting elements together.

57. The method of claim 52 wherein an element's content is used as a criterion for connecting elements together.

58. The method of claim 52 wherein an element has contents, owner, lifespan and binding specifications.

59. The method of claim 52 wherein an element's specification as being a classification, instance, attribute, value, condition, action or container, is used as a criteria for connecting elements together.

* * * * *